United States Patent
Kamon et al.

(10) Patent No.: US 8,213,063 B2
(45) Date of Patent: Jul. 3, 2012

(54) IMAGE SENSING APPARATUS, IMAGE SENSING SYSTEM, AND OPERATING PROGRAM PRODUCT FOR IMAGE SENSING SYSTEM

(75) Inventors: Koichi Kamon, Sakai (JP); Kazuchika Sato, Kobe (JP); Jun Minakuti, Sakai (JP); Tetuya Katagiri, Kyoto (JP)

(73) Assignee: Konica Minolta Holdings, Inc., Tokyo (JP)

( * ) Notice: Subject to any disclaimer, the term of this patent is extended or adjusted under 35 U.S.C. 154(b) by 982 days.

(21) Appl. No.: 11/142,037

(22) Filed: Jun. 1, 2005

(65) Prior Publication Data

US 2005/0280868 A1    Dec. 22, 2005

(30) Foreign Application Priority Data

Jun. 2, 2004    (JP) .................................. 2004-164093

(51) Int. Cl.
*H04N 1/46* (2006.01)
*H04N 1/54* (2006.01)
*H04N 1/56* (2006.01)
*H04N 1/58* (2006.01)
*H04N 1/60* (2006.01)
*H04N 9/04* (2006.01)
*H04N 5/235* (2006.01)
*H04N 5/202* (2006.01)
*G03F 3/10* (2006.01)
*G03B 7/00* (2006.01)
*G03B 7/08* (2006.01)

(52) U.S. Cl. ........ 358/521; 358/514; 358/518; 358/519; 358/520; 358/522; 358/523; 348/207.99; 348/362; 348/674; 396/213; 396/228; 396/229

(58) Field of Classification Search ................... 358/514, 358/518, 519, 520, 521, 522, 523; 348/207.99, 348/362, 674; 396/213, 228, 229
See application file for complete search history.

(56) References Cited

U.S. PATENT DOCUMENTS 5,861,621 A    1/1999    Takebe et al.
(Continued)

FOREIGN PATENT DOCUMENTS

JP    7298132 A    11/1995
(Continued)

OTHER PUBLICATIONS

Non-final Office Action dated Apr. 30, 2008 cited in related U.S. Appl. No. 11/138,247.

(Continued)

*Primary Examiner* — King Poon
*Assistant Examiner* — Beniyam Menberu
(74) *Attorney, Agent, or Firm* — Brinks Hofer Gilson & Lione

(57) ABSTRACT

An image sensing apparatus including an image sensor having a first area and a second area and a gradation converter for applying a gradation conversion to an image signal is provided with a gradation conversion LUT storage storing at least two kinds of gradation conversion information. The image sensing apparatus is also provided with a gradation conversion information rewriting section for rewriting the gradation conversion information into new gradation conversion information. There can be provided an image sensing apparatus capable of carrying out a precise gradation conversion even in the case that the inflection point between the first area and the second area of the image sensor constantly changes.

16 Claims, 35 Drawing Sheets

U.S. PATENT DOCUMENTS

| | | | |
|---|---|---|---|
| 6,160,532 A * | 12/2000 | Kaburagi et al. | 345/87 |
| 6,191,408 B1 * | 2/2001 | Shinotsuka et al. | 250/208.1 |
| 6,323,479 B1 | 11/2001 | Hynecek et al. | |
| 6,573,927 B2 * | 6/2003 | Parulski et al. | 348/32 |
| 6,836,288 B1 | 12/2004 | Lewis | |
| 7,190,402 B2 * | 3/2007 | Ban et al. | 348/362 |
| 7,256,378 B2 * | 8/2007 | Furukawa et al. | 250/208.1 |
| 7,545,412 B2 * | 6/2009 | Minakuti et al. | 348/223.1 |
| 7,714,928 B2 * | 5/2010 | Kamon et al. | 348/362 |
| 7,956,903 B2 * | 6/2011 | Takayama | 348/222.1 |
| 2002/0021121 A1 * | 2/2002 | Nakamura | 324/96 |
| 2002/0036697 A1 * | 3/2002 | Mori et al. | 348/229 |
| 2002/0054389 A1 * | 5/2002 | Takada et al. | 358/513 |
| 2003/0016214 A1 * | 1/2003 | Sukeno et al. | 345/207 |
| 2004/0046101 A1 * | 3/2004 | Nakamura et al. | 250/200 |
| 2004/0101296 A1 * | 5/2004 | Nakata et al. | 396/65 |
| 2005/0052547 A1 * | 3/2005 | Minakuti et al. | 348/224.1 |
| 2005/0052557 A1 * | 3/2005 | Kusaka et al. | 348/308 |
| 2005/0264683 A1 | 12/2005 | Kamon et al. | |
| 2005/0264684 A1 | 12/2005 | Kamon et al. | |
| 2005/0280868 A1 | 12/2005 | Kamon et al. | |
| 2006/0001748 A1 * | 1/2006 | Kamon et al. | 348/234 |
| 2006/0044436 A1 * | 3/2006 | Watanabe | 348/308 |

FOREIGN PATENT DOCUMENTS

| | | | |
|---|---|---|---|
| JP | 02001028712 | * | 1/2001 |
| JP | 2001054014 A | | 2/2001 |
| JP | 2002-077733 | * | 3/2002 |
| JP | 2002-300476 | | 10/2002 |
| JP | 2004-088312 | * | 3/2004 |
| JP | 2004088312 A | | 3/2004 |
| JP | 2004145022 A | | 5/2004 |

OTHER PUBLICATIONS

Final Office Action dated Dec. 3, 2008 cited in related U.S. Appl. No. 11/138,247.

Non-final Office Action dated Jul. 21, 2009 cited in related U.S. Appl. No. 11/138,247.

Final Office Action dated Feb. 16, 2010 cited in related U.S. Appl. No. 11/138,247.

Japanese Office Action with English translation issued in related Japanese Patent Application No. 2005-077563.

* cited by examiner

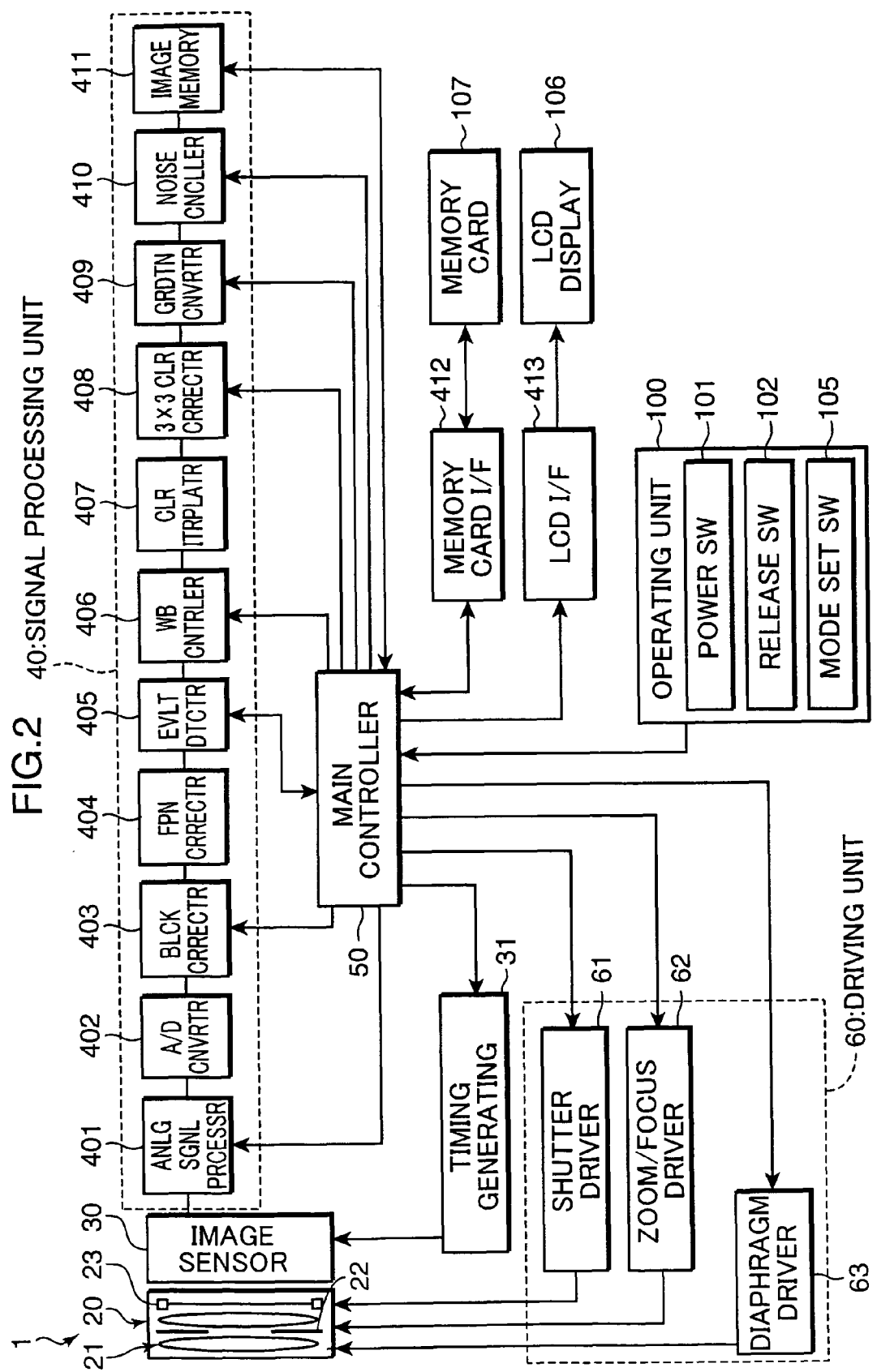

FIG.3

COLOR FILTER CONFIGURATION

| R00 | Gr10 | R20 | Gr30 |
|-----|------|-----|------|
| Gb01 | B11 | Gb21 | B31 |
| R02 | Gr12 | R22 | Gr32 |
| Gb03 | B13 | Gb23 | B33 |

G:GREEN PIXEL
R:RED PIXEL
B:BLULE PIXEL
※NUMERAL DENOTES PIXEL ADDRESS NUMBER

FIG.7

| | CONTROL FACTOR | SPECIFIC CONTROL |
|---|---|---|
| EXPOSURE CONTROL = AE CONTROL | PHOTOELECTRIC CONVERSION CHARACTERISTICS OF IMAGE SENSOR (DYNAMIC RANGE) | ○ CONTROL OF SWITCHING POINT (INFLECTION POINT) OF LINEAR CHARACTERISTIC AREA AND LOGARITHMIC CHARACTERISTIC AREA |
| | EXPOSURE AMOUNT $\begin{pmatrix}\text{TOTAL AMOUNT OF LIGHT THAT}\\\text{REACHES IMAGE SENSING SURFACE}\\\text{WHILE PHOTOELECTRIC CONVERSION}\\\text{FUNCTION IS EFFECTIVE}\end{pmatrix}$ | ○ ADJUST OF APERTURE AMOUNT<br>○ ADJUST OF INTEGRATION PERIOD SUCH AS SHUTTER SPEED |

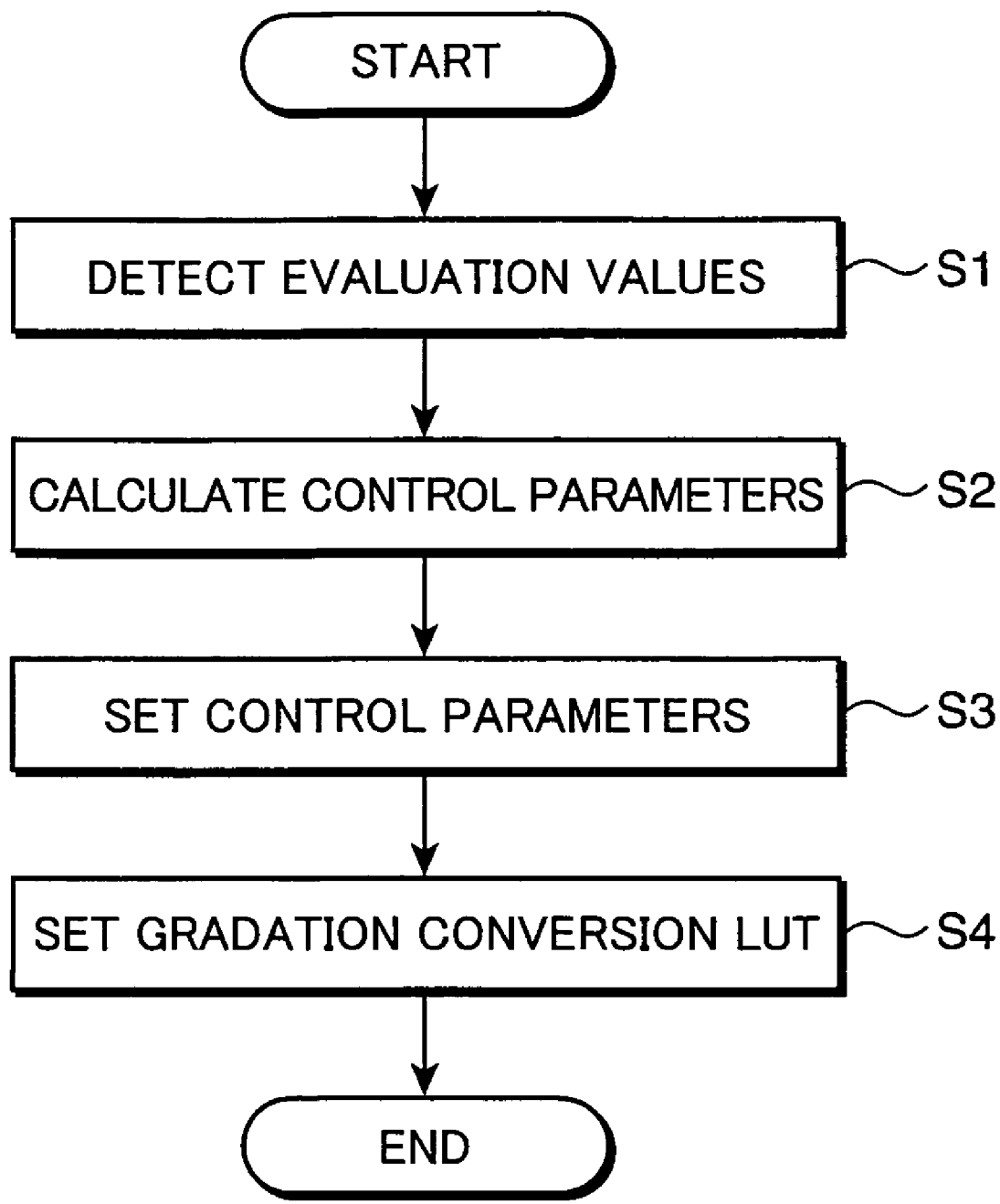

FIG.17

| 1 | 2 | 3 | 4 | 5 |
|---|---|---|---|---|
| 6 | A B C D E F | | | 7 |
| | G H I J K L | | | |
| 8 | M N O P Q R | | | 9 |
| | S T U V W X | | | |
| 10 | Y Z AA AB AC AD | | | 11 |
| | AE AF AG AH AI AJ | | | |
| 12 | 13 | 14 | 15 | 16 |

330
331
332
333

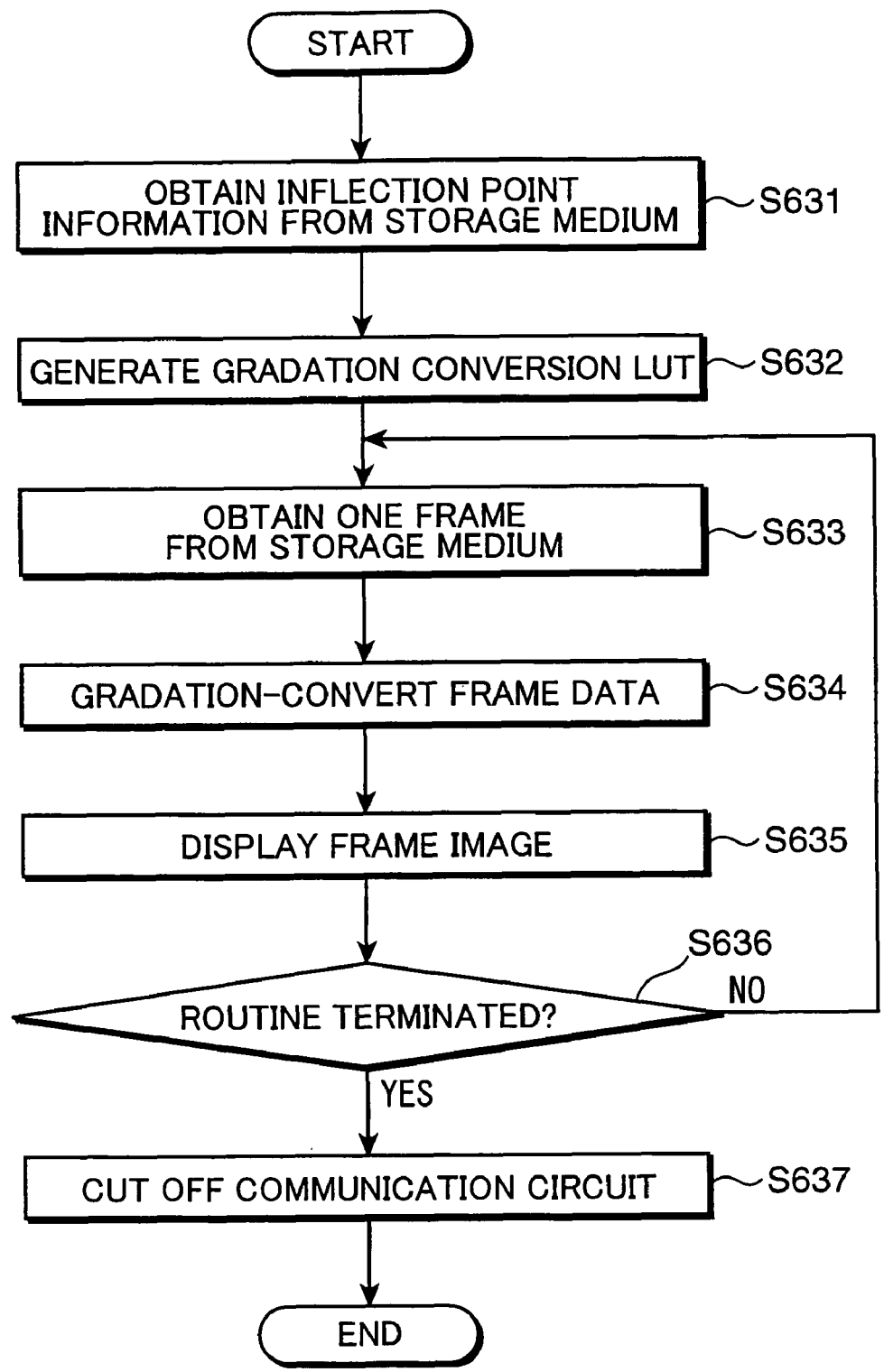

IMAGE SENSING APPARATUS, IMAGE SENSING SYSTEM, AND OPERATING PROGRAM PRODUCT FOR IMAGE SENSING SYSTEM

This application is based on patent application No. 2004-164093 filed in Japan, the contents of which are hereby incorporated by references.

BACKGROUND OF THE INVENTION

The present invention relates to an image sensing apparatus including an image sensor for generating an electrical signal corresponding to an amount of incident light and particularly to an image sensing apparatus and an image sensing system using an image sensor whose photoelectric conversion characteristic has a first area in which the electrical signal is outputted by being converted according to a first characteristic in relation to the amount of incident light and a second area in which the electrical signal is outputted by being converted according to a second characteristic different from the first characteristic in relation to the amount of incident light (e.g., operation by a linear characteristic and operation by a logarithmic characteristic can be switched), and an image sensing system operating program product.

There have been known image sensors (also called "LOG sensors") constructed by adding a logarithmically converting circuit including a MOSFET or the like to a solid-state image sensing device in which photoelectric conversion elements such as photodiodes are arrayed in matrix and adapted to set such an output characteristic of the solid-state image sensing device as to logarithmically convert the electrical signal in relation to an amount of incident light using a subthreshold characteristic of the MOSFET. Among such image sensors is known the one in which an original operative state of the solid-state image sensing device, i.e., a linear operative state where an electrical signal is outputted by being linearly converted in relation to an amount of incident light and the aforementioned logarithmic operative state can be switched to each other.

For example, Japanese Unexamined Patent Publication No. 2002-77733 discloses an image sensing apparatus constructed such that a specific reset voltage is supplied to a MOSFET to enable the automatic switch from a linear operative state to a logarithmic characteristic area and to set the equal switching points for the respective pixels. Japanese Unexamined Patent Publication No. 2002-300476 discloses an image sensing apparatus constructed such that an operative state can be automatically switched from a linear operative state to a logarithmic characteristic state and a potential state of a MOSFET is made adjustable by adjusting a resetting period of the MOSFET.

In the case of using the image sensor in the linear characteristic state, an output proportional to an amount of electric charges produced by the photoelectric conversion elements is obtained. Thus, there is an advantage that a high-contrast image signal can be obtained for a subject having a low luminance, whereas there is a disadvantage that a dynamic range is narrower. On the other hand, in the case of using the image sensor in the logarithmic characteristic state, an output natural logarithmically converted in relation to the amount of incident amount is obtained. Thus, there is an advantage that a wide dynamic range can be ensured, whereas there is a disadvantage that contract is poor since the image signal is logarithmically compressed.

Generally, in a digital image sensing apparatus, various digital signal processings including a white balance correction, a color interpolation and a gradation conversion are applied to an image signal obtained by an image sensor. Here, the gradation conversion is such that gradation characteristics ($\gamma$-curve and digital gain) of image signals of color components R, G, B are so corrected as to match the gradation characteristics of an LCD device provided in the digital image sensing apparatus, a monitor television to which the image signals are externally outputted or the like.

However, in the case of using the image sensor provided with the linear characteristic area and the logarithmic characteristic area as above, there is a problem that no gradation conversion true to a subject luminance can be carried out if the gradation is uniformly converted over the entire sensing enabling area of the image sensor. More specifically, since the electrical signal is outputted by being natural logarithmically converted in relation to the amount of incident light on the image sensor in the logarithmic characteristic area, the image is sensed while having its gradation compressed in accordance with the incident luminance, resulting in the image sensing with a gradation characteristic different from the one in the linear characteristic area. Particularly, in view of the advantages and disadvantages of the linear characteristic area and logarithmic characteristic area, it is desirable to construct the image sensor such that an image sensing operation is carried out actively making the most of the advantages of the respective operative states. For example, even in the case of carrying out an automatic exposure control, there is a possibility of carrying out an optimal automatic exposure control making the most of the advantages of the respective operative states if this control is carried out while relating the subject luminance and a switching point of the image sensor from the linear characteristic state to the logarithmic characteristic state as targets. However, in such a case, since a control unavoidably constantly changes the switching point (inflection point) between the linear characteristic area and the logarithmic characteristic area, the optimal gradation conversion in accordance with the subject luminance becomes even more difficult. The above two publications merely disclose the image sensing apparatuses capable of automatically switching the operative state of the image sensor from the linear characteristic area to the logarithmic characteristic area, but do not mention about such a gradation conversion.

SUMMARY OF THE INVENTION

Accordingly, it is an object of the present invention to provide an image sensing apparatus, an image sensing system and an image sensing system operating program product which are free from the problems residing in the prior art.

According to an aspect of the present invention, an image sensing apparatus is provided with an image sensor to generate an electrical signal corresponding to an amount of incident light. The image sensor includes a photoelectric conversion characteristic having a first area where the electrical signal is outputted after being converted according to a first characteristic in relation to the amount of the incident light and a second area where the electrical signal is outputted after being converted according to a second characteristic different from the first characteristic in relation to the amount of the incident light.

There are stored at least two kinds of pieces of gradation conversion information including a first gradation conversion characteristic as gradation conversion information for the first area and a second gradation conversion characteristic as gradation conversion information for the second area. The first and second gradation conversion characteristics have a switching point at an inflection point between the first area and the second area of the image sensor.

A gradation conversion is applied to an image signal picked up by the image sensor in accordance with the stored gradation conversion information. The gradation conversion is carried out for the first area of the image sensor using the first gradation conversion characteristic while being carried out for the second area using the second gradation conversion characteristic. Accordingly, a suitable gradation conversion corresponding to the subject luminance can be carried out by determining the first and second gradation conversion characteristics in accordance with the respective characteristic areas of the image sensor. Also, even if an inflection point between the first area and the second area constantly change, a precise gradation conversion can be accomplished.

The purposes, features, aspects and advantages of the present invention become more clear by the following detailed description and accompanying drawings.

BRIEF DESCRIPTION OF THE DRAWINGS

FIG. 2 is a block diagram showing an image sensing of the electronic camera.

FIG. 3 is a diagram showing one example of a color filter configuration of an image sensor used in the electronic camera.

FIG. 7 is a table showing definitions of terms concerning an exposure control.

FIG. 8 is a flowchart showing one example of an overall operation of the electronic camera.

FIG. 17 is a diagram showing a divided state of an image sensing area (light measuring range) upon a divided light measurement by the image sensor.

FIGS. 18A and 18B are graphs showing examples of a luminance histogram by the divided light measurement, wherein FIG. 18A shows a main subject whole luminance histogram and FIG. 18B shows a peripheral subject whole luminance histogram.

FIGS. 20A and 20B are graphs showing states where the photoelectric conversion characteristic of the image sensor are shifted in the case of carrying an AE control, wherein FIG. 20A shows a shift in the case of carrying out an exposure amount control and FIG. 20B shows a shift in the case of carrying out a dynamic range control.

FIGS. 24A and 24B are graphs showing a method for calculating the position of an inflection point of the photoelectric conversion characteristic upon calculating a dynamic range control parameter, wherein FIG. 24A is a graph in the case that the photoelectric conversion characteristic is so shifted as to obtain a specified sensor output at luminance Lmax and FIG. 24B is a graph in the case that the photoelectric conversion characteristic is modeled.

FIG. 35 is a flowchart showing further another exemplary operation of the image sensing system.

DETAILED DESCRIPTION OF THE PREFERRED EMBODIMENTS OF THE INVENTION

Hereinafter, embodiments of the present invention are described with reference to the accompanying drawings.

(Description of the External Configuration of an Image Sensing apparatus)

Figure 1A:
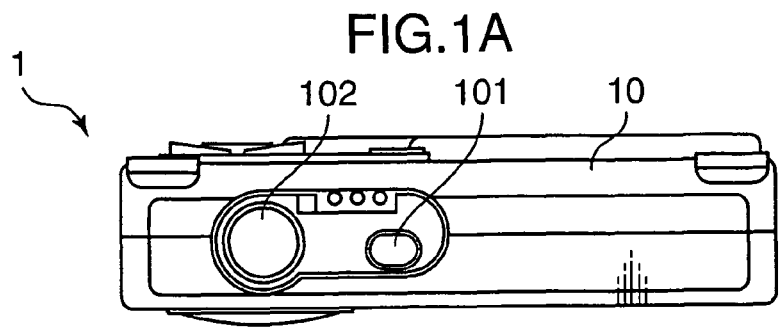
FIGS. 1A, 1B and 1C are a top view, a front view and a rear view showing an external configuration of an electronic camera to which an image sensing apparatus of one embodiment of the invention is suitably applied.
Figure 1B:
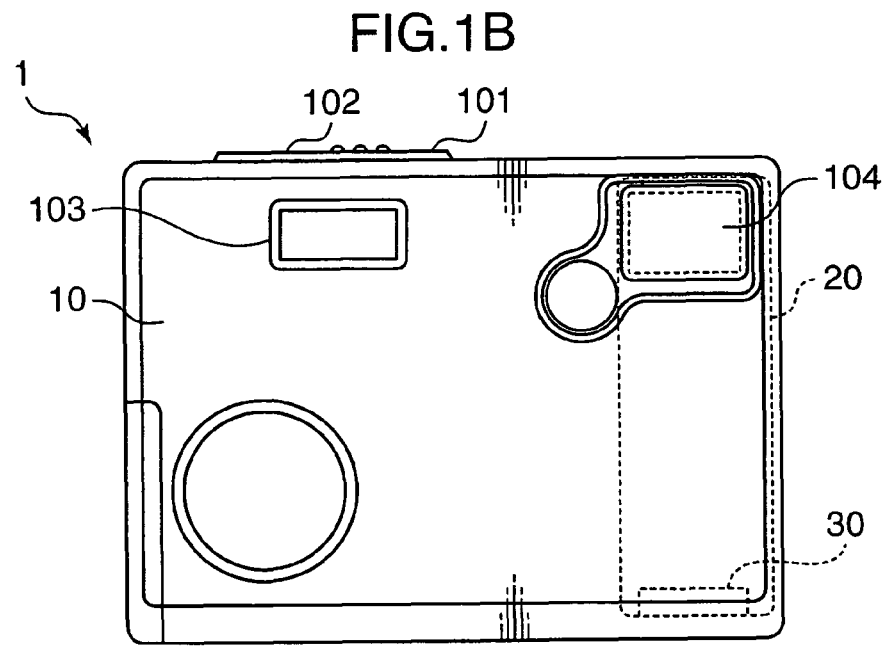
Figure 1C:
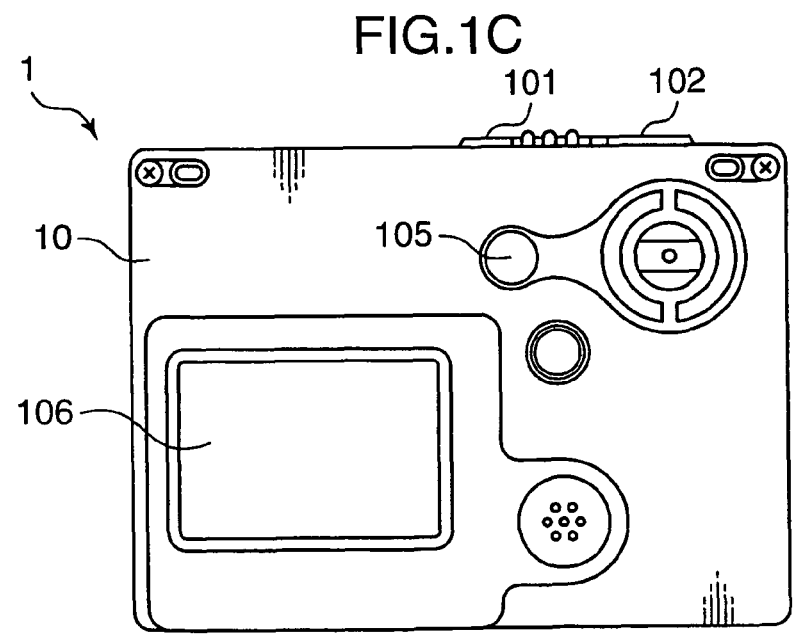

FIGS. 1A, 1B and 1C are a top view, a front view and a rear view showing the external configuration of an electronic camera 1 to which an image sensing apparatus according to an embodiment of the present invention is suitably applied. In this electronic camera (image sensing apparatus) 1, a power switch 101, a release switch 102 and the like are provided on the top surface of a camera main body 10, a flash firing device 103 and a taking lens window 104 and the like are provided on the front surface, and various operation buttons including a mode setting switch 105 and a LCD device 106 including a liquid crystal display (LCD) monitor and the like are provided on the rear surface. Various devices and a crooked barrel 20 are arranged in the main body 10.

The power switch 101 is a press down switch for turning a power supply of the camera 1 on (activate) and off (stop), and the power supply of the camera 1 is successively and repeatedly turned on and off by pressing the power switch 101. The mode setting switch 105 is for setting two modes: a still image shooting mode for shooting a still image and a moving image shooting mode for shooting moving images.

The release switch 102 is a press down switch having a "partly pressed state" reached by being pressed halfway and a "fully pressed state" reached by being further pressed from the partly pressed state. For example, when the release switch 102 is pressed halfway in the still image shooting mode, a preparatory operation (such as an automatic exposure control and an automatic focusing control to be described later) for shooting a still image of a subject is carried out. When the release switch 102 is fully pressed, a shooting operation (a series of operations including an exposure made to the image sensor, application of specified image processings to an image signal obtained by the exposure and the recording of the image signal in a memory card) is carried out. Further, in the moving image shooting mode, a specified moving image shooting operation is carried out when the release switch 102 is fully pressed, whereas the moving image shooting operation is terminated when the release switch 102 is fully pressed again.

The flash firing device 103 is fired to illuminate a subject in a state where the release switch 102 is partly pressed (still image shooting mode). The taking lens window 104 is an opening for introducing an optical image of the subject to the crooked barrel 20 arranged inside the main body 10. The display device 106 is for reproducing and displaying a recorded image in a built-in recording medium and for displaying a through image (live-view image) of the subject video-photographed during a standby state for shooting and in the moving image shooting mode. It should be noted that push switches including a zoom switch, a menu selection switch, a selection determination switch are provided in addition to the mode setting switch 105.

The crooked barrel 20 constructs a taking-lens system for picking up a subject image through the taking lens window 104 and introducing the picked-up image to an image sensor 30 arranged in the main body 10. This barrel 20 is constructed such that the length thereof does not change even during the zooming and the focusing, i.e., does not project out of the main body 10. A lens group 21 (see FIG. 2) constructing a photographing optical system including a zoom lens block and a fixed lens block arranged in series along an optical axis, and a diaphragm 22 arranged at a specified position of the lens group 21 are provided in the barrel 20. A shutter 23 is also arranged at a specified position of the lens group 21, wherein a light path of the photographing optical system is blocked or permitted by closing or opening the shutter 23. In other words, an exposure amount of the image sensor 30 is controlled by controlling an aperture area of the diaphragm 22 and controllably opening and closing the shutter 23.

(Overall Description of the Electrical Construction of the Image Sensing Apparatus)

FIG. 2 is an image sensing block diagram of the electronic camera 1 according to this embodiment. This electronic camera 1 is provided with an operating unit 100, the aforementioned crooked barrel 20, the image sensor 30, a signal processing unit 40, a main controller 50, a driving unit 60, and the like. The operating unit 100 includes the power switch 101, the release switch 102, the mode setting switch 105 and the like described above.

The image sensor 30 photoelectrically converts a subject light image focused by the lens group 21 in the barrel 20 into image signals of respective components R (red), G (green), B (blue) (signals comprised of signal strings of pixels signals produced in the respective pixels of the image sensor 30) in accordance with a light amount of the subject light image, and outputs the obtained image signals to the signal processing unit 40. In this embodiment, a solid-state image sensing device of the logarithmic conversion type for outputting pixel images (output electrical signals produced by the photoelectrical conversion) while converting them not linearly, but logarithmically in relation to an amount of incident light is used as the image sensor 30. This image sensor 30 has such a characteristic as to output the pixel images by linearly converting them if the amount of incident light is small, and is provided with an area where the photoelectric conversion characteristic thereof is linear (first area or linear characteristic area=dark time) and an area where the photoelectric conversion characteristic thereof is logarithmic (second area or logarithmic characteristic area=bright time). A switching point (inflection point) between the linear characteristic area and the logarithmic characteristic area can be arbitrarily controlled by a specified control signal (dynamic range control signal to be described later). The construction, the operation and the like of this image sensor 30 are described in detail later.

A timing generating circuit (timing generator) 31 controls the image sensing operation (storage of electric charges based on the exposure and readout of the stored electric charges) by the image sensor 30. The timing generating circuit 31 generates specified timing pulses (pixel driving signals, horizontal synchronization signals, vertical synchronization signals, horizontal scanning circuit driving signals, vertical scanning circuit driving signals, etc.) in accordance with a shooting control signal from the main controller 50, and outputs them to the image sensor 30. In the moving image shooting mode (through image display mode), the timing generating circuit 31 causes frame images to be read by every interval of, e.g., 30 sec. and to be successively outputted to the signal processing unit 40. Further, during the exposure in the still image shooting mode, the timing generating circuit 31 causes electric charges to be stored (i.e., subject light image is photoelectrically converted into the image signal) as the image sensor 30 is exposed. The timing generating circuit 31 also generates clocks for analog-to-digital (A/D) conversion used in a A/D converter 402 to be described later.

The signal processing unit 40 applies specified analog and digital signal processings to the image signals sent from the image sensor 30, wherein the signal processings are applied to the respective pixel signals of each image signal. This signal processing unit 40 is provided with an analog signal processor 401, the A/D converter 402, a black reference corrector 403, an FPN corrector 404, an evaluation value detector 405, a white balance controller 406, a color interpolator 407, a 3×3 color corrector 408, a gradation converter 409, a noise canceller 410 and an image memory section 411. As described in detail later, out of the construction of the signal processing unit 40, this embodiment is characterized in that the gradation converter 409 is caused to carry out a gradation conversion corresponding to the image sensor 30 having the linear characteristic area and the logarithmic characteristic area.

The analog signal processing unit 401 applies specified analog signal processing to the image signals (analog signal groups produced by the respective pixels of the image sensor 30) outputted from the image sensor 30, and includes a CDS (correlated double sampling) circuit for reducing a reset noise included in an analog image signal and an AGC (automatic gain control) circuit for correcting the level of the analog image signal. It should be noted that the AGC circuit also has an amplifier function of amplifying the analog image signal at a properly amplification factor to compensate for the level shortage of the photographed image so as to conform to an input voltage range of the A/D converter 402 provided behind along a signal processing flow in the case that no proper exposure was made or other cases.

The A/D converter 402 functions to convert the analog image signal outputted from the analog signal processor 401 into a digital image signal (image data) of, e.g., 12 bits. This A/D converter 402 converts the analog image signal into the digital image signal in accordance with a clock for the A/D conversion inputted from the timing generating circuit 31.

The black reference corrector 403 carries out the following calculation:

$$SD1-SD2$$

when SD1 denotes the level of the image signal inputted from the A/D converter 402 and SD2 denotes an image signal level during dark time in order to correct the black level (image signal level during dark time) of the digital image signal inputted from the A/D converter 402 to a reference value (for example, 0 at the digital signal level after the A/D conversion). Such a black reference correction is carried out in accordance with image sensing dynamic range information corresponding to the photoelectric conversion characteristic of the image sensor 30 inputted from the main controller 50. In the electronic camera 1 of this embodiment, the photoelectric conversion characteristic of the image sensor 30 is controllable and the image signal level of the digital image signal inputted from the A/D converter 402 during dark time changes as the photoelectric conversion characteristic of the image sensor 30 changes. Thus, the above information is used for a precise black reference correction following up such a change.

The FPN (fixed pattern noise) corrector 404 removes a fixed pattern noise of the image signal inputted from the black reference corrector 403. The fixed pattern noise is a noise resulting from a variation in the output values of the image signals produced by the respective pixels due to a variation in the threshold values of the FETs provided in the respective pixel circuits of the image sensor 30. The FPN corrector 404 carries out the following calculation:

$$SD3-SD4$$

when SD3 denotes the level of the image signal inputted from the black reference corrector 403 and SD4 denotes a fixed pattern component of the image signal inputted from the black reference corrector 403.

The evaluation value detector 405 detects evaluation values, which serve as base values upon carrying out the automatic exposure control (AE), the automatic focusing control (AF) or the white balance control: AE evaluation values, AF evaluation values and white balance evaluation values (hereinafter, "WB evaluation values"), from the image signal actually obtained by the image sensor 30. For example, in the case of carrying out the AE control, the following steps are generally taken:

(1) Measure the luminance level and the luminance range of the subject as a target whose image is to be picked up, (2) Calculate a necessary exposure control amount so that an output conforming to the luminance level and the luminance range can be obtained from the image sensor, and (3) Specifically adjust the exposure amount and the like based on the calculation result and proceeds to the actual shooting.

In this evaluation value detector 405, the luminance level and the luminance range of the subject are obtained from the image signal actually obtained by the image sensor 30 in order to fulfill the function of the step (1), and they are outputted to the main controller 50 as AE evaluation values to be used for the AE control processing in the later step.

Here, the definition of a concept of the "exposure control ("AE control" depending on cases)" referred to in the present invention is described with reference to FIG. 7. Different from so-called film cameras, image sensing apparatuses such as electronic cameras and electronic videos adopt a method for controlling a control factor for the AE control in conjunction with the photoelectric conversion characteristic of the image sensor (by artificially changing the photoelectric conversion characteristic) and a method for adjusting a total amount of light reaching a sensing surface of the image sensor and an integration period of a photoelectrically converted current. In this specification, the former is referred to as the "dynamic range control" and the latter is referred to as the "exposure amount control". The "dynamic range control" is executed by controlling, for example, the switching point (hereinafter, "inflection point") between the linear characteristic area and the logarithmic characteristic area of the image sensor. Further, the "exposure amount control" is executed, for example, by adjusting an aperture amount of a diaphragm or a shutter speed of a mechanical shutter or controlling an integration period of electric charges through a control to reset the image sensor.

Further, in the case of the AF control, the position of the focusing lens where the contrast of an image obtained by the sensing operation is at its maximum is obtained, for example, by alternately driving the focusing lens (lens group 21) along the direction of the optical axis and carrying out the image sensing operation by the image sensor 30 (so called hill-climbing detecting method), and is outputted to the main controller 50 as an AF evaluation value to be used for the AF control processing in the later step. The white balance control is for the purpose of correcting the color of the outputted image to the one conforming to the color of the light source for the subject. In this case, a luminance ratio and luminance differences of the respective colors R, G, B are calculated in the evaluation value detector 405 in accordance with the image signal inputted from the FPN corrector 404 provided at a preceding stage, and are outputted to the main controller 50 as WB evaluation values. Specific methods for obtaining these evaluation values are described in detail later.

The white balance controller 406 carries out such a correction as to convert the levels of the respective pixel data of the respective color components R, G, B based on the image sensing dynamic range information and the WB evaluation values given from the main controller 50, so that a color balance of the image signal becomes a specified color balance. In this embodiment, since the image sensor 30 having the linear characteristic area and the logarithmic characteristic area is used, it is desirable to obtain the WB evaluation values for each of the linear characteristic area and the logarithmic characteristic area and to carry out the white balance corrections suitable for the respective areas.

The color interpolator 407 interpolates data at pixel positions lacking the frame image for the respective color components R, G, B of the image signal inputted from the white balance controller 406. Specifically, the color filter configuration of the image sensor 30 of the logarithmic conversion type used in this embodiment adopts a so-called Bayer system in which the pixels G are in a checkerwise arrangement and the pixels R, B are in line sequential arrangements. Thus, color information is lacking and the color interpolator 407 interpolates the pixel data at a nonexisting pixel position using a plurality of existing pixel data.

Specifically, for a frame image of the color component G having pixels up to a high band, the color interpolator 407 calculates an average value of pixel data excluding those taking a maximum value and a minimum value out of the pixel data existing around the pixel position to be interpolated using a median filter after masking the image data forming the frame image by a specified filter pattern, and interpolates this average value as the pixel data at this pixel position. For the color components R, B, the color interpolator 407 calculates an average value of pixel data existing around the pixel position to be interpolated after masking the image data forming the frame image by a specified filter pattern and interpolates this average value as the pixel data at this pixel position.

FIG. 3 shows an exemplary color filter configuration of the image sensor 30. In such a color filter configuration, the image signals of the color components R, G, B at the respective pixels are generated, for example, as follows by the above color interpolation.

(A) Color interpolation equation for address 11 (B11)

$$R11=(R00+R20+R02+R22)/4$$

$$G11=(Gr10+Gb01+Gb21+Gr12)/4$$

$$B11=B11$$

(B) Color interpolation equation for address 12 (Gr12)

$$R12=(R02+R22)/2$$

$$G12=Gr12$$

$$B12=(B11+B13)/2$$

(C) Color interpolation equation for address 21 (Gb21)

$$R21=(R20+R22)/2$$

$$G21=Gb12$$

$$B21=(B11+B31)/2$$

(D) Color interpolation equation for address 22 (R22)

$$R22=R22$$

$$G22=(Gb21+Gr12+Gr32+Gb23)/4$$

$$B22=(B11+B31+B13+B33)/4$$

The 3×3 color corrector 408 corrects the saturation (tint) of the image signals of the color components R, G, B inputted from the color interpolator 407. The 3×3 color corrector 408 has three kinds of conversion coefficients for converting the level ratio of the image signals of the color components R, G, B, and corrects the saturation of the image data by converting the image ratio using a conversion coefficient conforming to a shooting scene. For example, the 3×3 color corrector 408 linearly converts the image signal as follows using a total of nine conversion coefficients a1 to c3.

$$R'=a1*R+a2*G+a3*B$$

$$G'=b1*R+b2*G+b3*B$$

$$B'=c1*R+c2*G+c3*B$$

The gradation converter 409 nonlinearly converts and offset-adjusts the level of the image signal for each color component using a specified gamma characteristic so that the image signals of the color components R, G, B inputted from the 3×3 color corrector 408 take suitable output levels. Specifically, the gradation converter 409 basically corrects the gradation characteristic (γ-curve and digital gain) of the image signals having the white balance thereof adjusted and the color thereof corrected to a gradation characteristic of the LCD device 106 or an externally connected monitor television or the like. The gradation converter 409 changes the gradation characteristic of the image signal based on the dynamic range information inputted from the main controller 50 and the AE evaluation values and the like detected in the evaluation value detector 405.

The gradation converter 409 of this embodiment is provided with a gradation conversion information storage device for storing at least two kinds of gradation conversion information including a first gradation conversion characteristic that is gradation conversion information for the linear characteristic area and a second gradation conversion characteristic that is gradation conversion information for the logarithmic characteristic area, the two gradation conversion characteristics having a switching point at an inflection point between the linear characteristic area and the logarithmic characteristic area of the image sensor 30; a gradation converter for applying a gradation conversion to the image signal inputted from the 3×3 color corrector 408 in accordance with the gradation conversion information stored in the gradation conversion information storage device; and a gradation conversion information rewriter for rewriting the gradation conversion information stored in the gradation conversion information storage device to new gradation conversion information having a switching point changed in conformity with the inflection point after a change in the case that the inflection point is changed. The specific construction, operation and the like of the gradation converter 409 are described in detail later.

The noise canceller 410 removes a noise component of the image signal inputted from the gradation converter 409 and corrects the sharpness of the image to a satisfactory one by extracting and intensifying only edge components. The noise canceller 410 makes a suitable correction by changing a coring factor (factor used for removing only the noise components of the image signal and extracting and intensifying the edge components) in accordance with the dynamic range information inputted from the main controller 50.

The image memory section 411 includes a memory such as a ROM or a RAM for temporarily saving the image data finished with the signal processings in the signal processing unit 40, and has such a capacity capable of saving, for example, one frame of image data.

A memory card interface 412 is an interface for outputting the image data produced in the signal processing unit 40 for the storage in a memory card 107 to the memory card 107 to be stored therein. The memory card 107 is for saving image data such as still images and moving images, and is detachably mountable into the electronic camera 1, so that the image data can be exchanged with an external recording medium. An LCD interface 413 is an interface for outputting the image data produced in the signal processing unit 40 for the display on the LCD to the LCD device 106 by converting it into an image signal of, e.g., the NTSC system or PAL system.

The main controller 50 includes a CPU (central processing unit) for centrally controlling the shooting operation of the electronic camera 1. Specifically, the main controller 50 calculates and sends operation information such as parameters required by the respective sections of the signal processing unit 40 in accordance with the information (aforementioned AE evaluation values, the AF evaluation values, WB evaluation values, etc.) sent from the respective sections of the signal processing unit 40, the operation mode of the electronic camera 1 and the like, thereby controlling the operations of the respective processing sections. In addition, the main controller 50 controls the timing generating circuit 31 for the shooting operation, drives the lens group 21 for zooming and focusing, controls the driving unit 60 to drive the diaphragm 22 and the shutter 23, and controls the output of the image signal.

Figure 4:
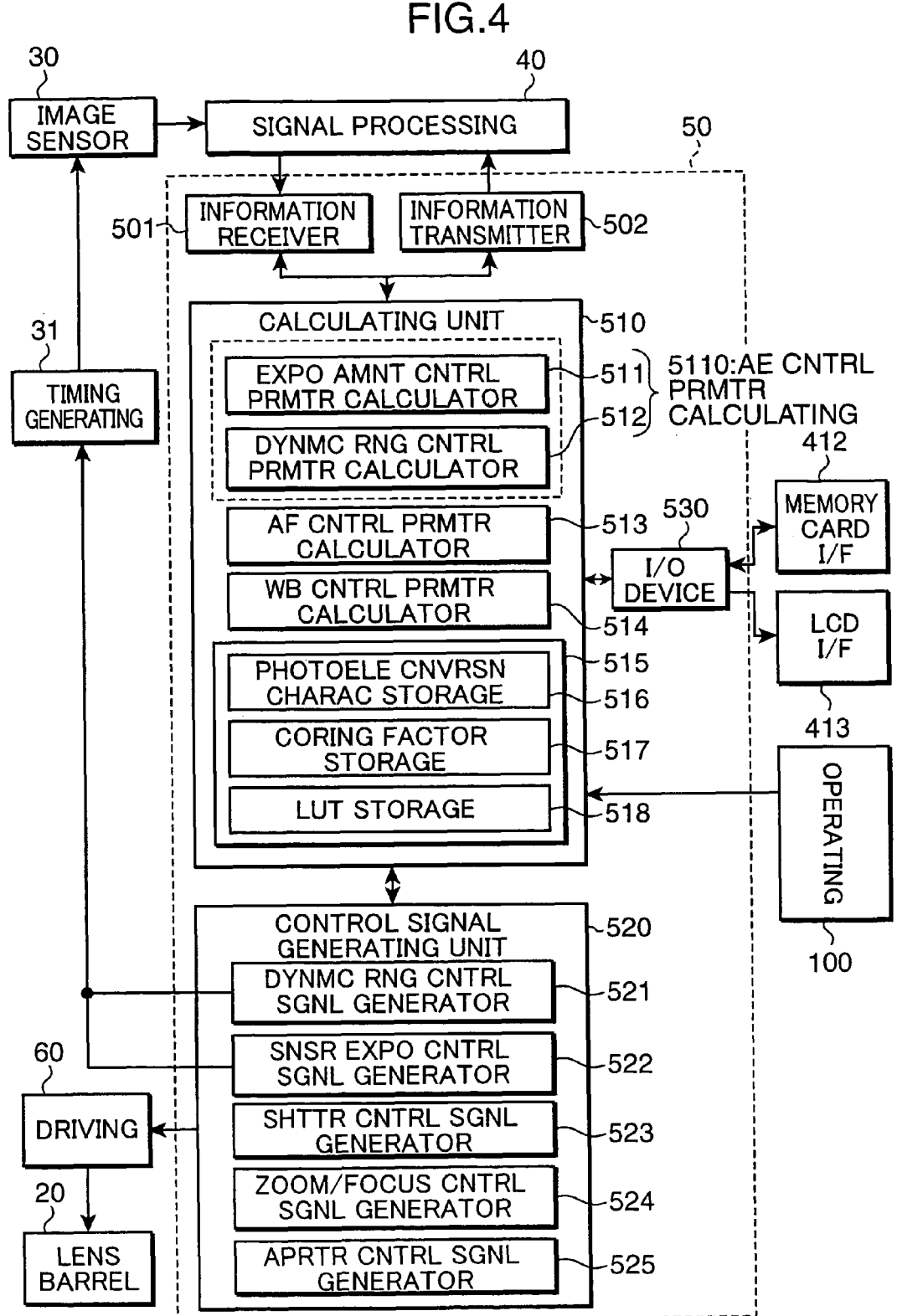
FIG. 4 is a function block diagram showing functions of a main controller provided in the electronic camera.

FIG. 4 is a function block diagram showing the functions of the main controller 50. The main controller 50 is provided with an information receiver 501, an information transmitter 502, a calculating unit 510 including a memory section 515, a control signal generating unit 520 and an input/output device 530.

The information receiver 501 obtains the AE evaluation values, the AF evaluation values and the WB evaluation values detected in the evaluation value detector 405 of the signal processing unit 40, and distributes them to parameter calculators of the calculating unit 510. On the other hand, the information transmitter 502 suitably reads the information (dynamic range information and coring factor) required in the signal processing unit 40 from the memory section 515, and suitably distributes it to the respective processing sections of the signal processing unit 40.

The calculating unit 510 is for calculating control parameters in accordance with the evaluation values given from the information receiver 501 and includes an AE control parameter calculator 5110 having an exposure amount control parameter calculator 511 and a dynamic range control parameter calculator 512, an AF control parameter calculator 513, a white balance control parameter calculator 514 and the memory section 515.

Figure 12:
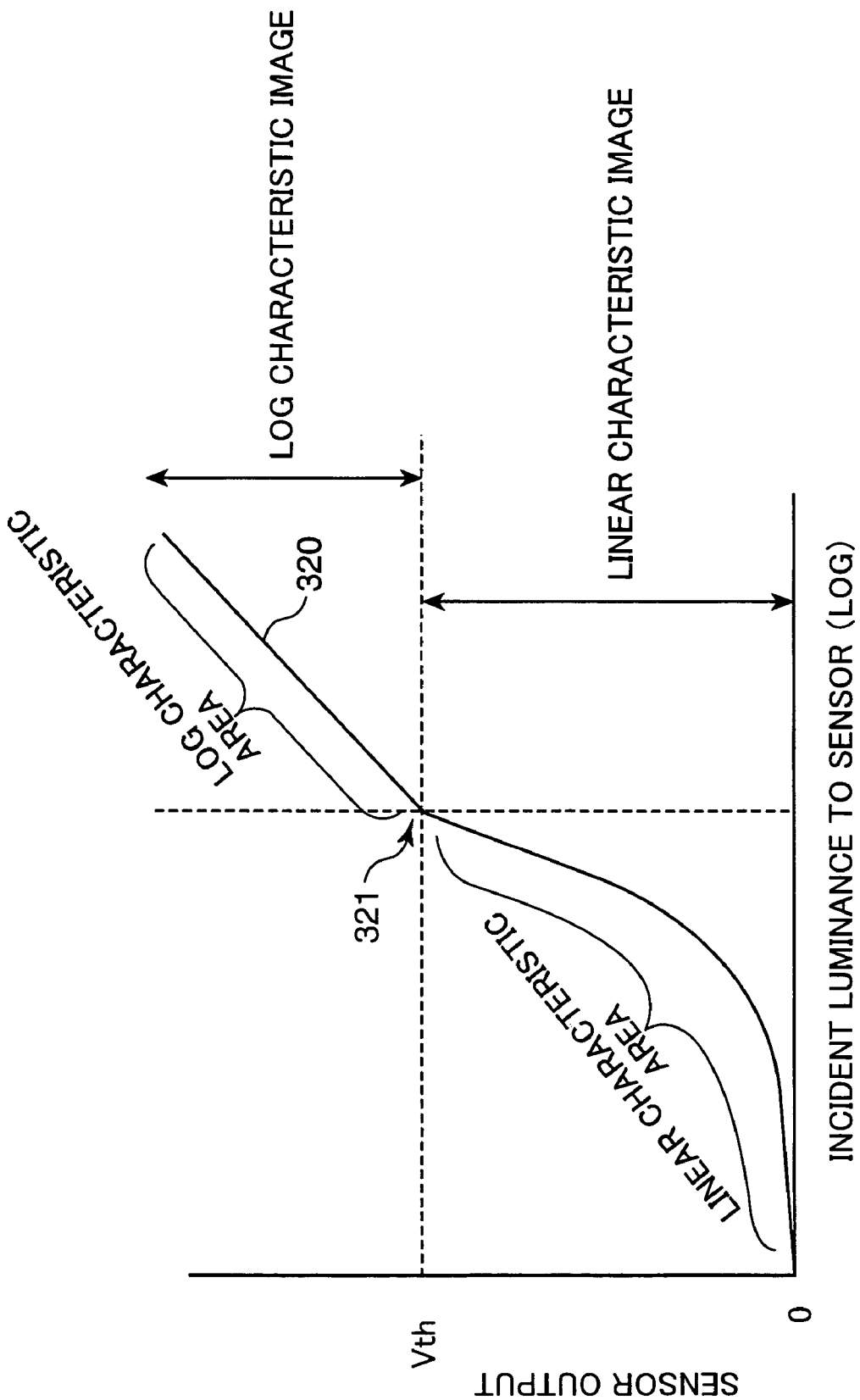
FIG. 12 is a graph showing a photoelectric conversion characteristic of the image sensor.

The memory section 515 includes a ROM or a RAM and is comprised of a photoelectric conversion characteristic information storage 516 for storing the dynamic range information of the image sensor 30, i.e., set values of the photoelectric conversion characteristic; a coring factor storage 517 for storing a set value of the coring factor used in the noise canceller 410; and a LUT storage 518 for storing LUTs (look-up tables) for the mutual conversion of data obtained in the linear characteristic area and the logarithmic characteristic area of the image sensor 30. The photoelectric conversion characteristic information storage 516 may be so constructed as to store the photoelectric conversion characteristic itself (photoelectric conversion characteristic curve as shown in FIG. 12 to be described later). The LUT storage 518 stores, in addition to the above LUTs, a LUT for the data conversion of an exposure period and a value of an aperture area of the diaphragm to be described later into an exposure period set value and an aperture set value; a LUT for the data conversion of the value of the inflection point of the photoelectric conversion characteristic (output level) into a photoelectric conversion characteristic set value; a LUT for the data conversion from the number of saturated pixels into an inflection point variation value; a LUT for outputting a photoelectric conversion set value from a maximum luminance level or a LUT for outputting a variation of the photoelectric conversion set value from a variation of the maximum luminance level; and various other LUTs for the data conversion. As described above, data value stored in the photoelectric conversion characteristic information storage 516, the coring factor storage 517 and the LUT storage 518 are sent to the suitable sections of the signal processing unit 40 from the information transmitter 502.

The AE control parameter calculator 5110 calculates control parameters for setting an optimal exposure amount and an optimal photoelectric conversion characteristic of the image sensor 30 during the shooting in order to carry out an exposure control (AE control) in conformity with the luminance of the subject. Specifically, the exposure amount control parameter calculator 511 of the AE control parameter calculator 5110 is for calculating control parameters for optimizing the exposure period and the aperture value. This exposure amount control parameter calculator 511 calculates an exposure period set value and an aperture set value in conformity with the subject luminance based on the AE evaluation values detected in the evaluation value detector 405 and the dynamic range information (photoelectric conversion characteristic) of the image sensor 30 when the AE evaluation values saved in the photoelectric conversion characteristic information storage 516 were obtained.

The dynamic range control parameter calculator 512 is for calculating a control parameter for optimizing the photoelectric conversion characteristic of the image sensor 30 in conformity with the subject luminance. The dynamic range control parameter calculator 512 calculates such a photoelectric conversion characteristic set value that the subject luminance for setting the dynamic range becomes, for example, a desired saturated output level in the image sensor 30. Upon this calculation as well, the dynamic range information of the image sensor 30 when the AE evaluation values saved in the photoelectric conversion characteristic information storage 516 were obtained is referred to. The operation and the like of this AE control parameter calculator 5110 are described in detail later.

The AF control parameter calculator 513 calculates control parameters for setting an optimal focal length upon shooting the subject in accordance with the AF evaluation values detected in the evaluation value detector 405. Upon calculating these control parameters, it is preferable to obtain the AF evaluation values to be referred to from the logarithmic characteristic area and the linear characteristic area of the image sensor 30 and to calculate control parameters for rough distance measurement (AF evaluation values obtained from the logarithmic characteristic area) and those for detailed distance measurement (AF evaluation values obtained from the linear characteristic area), making the most of the features of the respective characteristic areas.

The white balance control parameter calculator 514 calculates control parameters for setting the color balance of the image signal to a specified color balance in accordance with the WB evaluation values detected in the evaluation value detector 405. Upon calculating these control parameters, it is similarly preferable to obtain the WB evaluation values to be referred to from the logarithmic characteristic area and the linear characteristic area of the image sensor 30 and to calculate control parameters corresponding to the respective characteristic areas.

The control signal generating unit 520 is for generating control signals for driving the respective controllable elements in accordance with various control parameters calculated in the calculating unit 510, and includes a dynamic range control signal generator 521, a sensor exposure period control signal generator 522, a shutter control signal generator 523, a zooming/focusing control signal generator 524 and a diaphragm control signal generator 525.

The dynamic range control signal generator 521 generates such a drive signal for the image sensor 30 as to adjust an output level point (inflection point) for switching the photoelectric conversion characteristic from the linear characteristic area to the logarithmic characteristic area in accordance with the photoelectric conversion characteristic set value of the image sensor 30 calculated in the dynamic range control parameter calculator 512, and sends it to the timing generating circuit 31. The timing generating circuit 31 generates a timing signal for controlling the dynamic range of the image sensor 30 in accordance with the received drive signal, thereby driving the image sensor 30. Specifically, the inflection point of the photoelectric conversion characteristic of the image sensor 30 shifts by controlling a signal ΦVPS (intensity of voltage VPH or the duration of time ΔT in ΦVPS) to be sent to the image sensor 30 as described later. Thus, the dynamic range control signal generator 521 controls the drive signal to be sent to the timing generating circuit 31 for controlling the signal ΦVPS in accordance with the photoelectric conversion characteristic set value, thereby controlling the dynamic range of the image sensor 30 so as to conform to the luminance of the subject.

The sensor exposure period control signal generator 522 is for generating a control signal for controlling the exposure period (integration period) of the image sensor 30 by a controlling operation of an electronic circuit without depending on the mechanical operation of the diaphragm 22, the shutter 23, etc. The sensor exposure period control signal generator 522 generates such a drive signal (specifically, a signal for controlling a time AS during which the signal ΦVPS to be sent to the image sensor 30 takes a medium potential M as described later) for the image sensor 30 as to ensure a desired exposure period, and sends it to the timing generating circuit 31. The timing generating circuit 31 generates a timing signal for controlling the exposure period of the image sensor 30 in accordance with the received drive signal, thereby driving the image sensor 30.

The shutter control signal generator 523 similarly generates a control signal for setting the shutter speed of the shutter 23 in conformity with the exposure period based on the optimal exposure amount calculated in the exposure amount control parameter calculator 511. Further, the zooming/focusing control signal generator 524 generates a control signal for driving the lens group 21 in accordance with the optimal focal length calculated in the AF control parameter calculator 513. Furthermore, the diaphragm control signal generator 525 generates a control signal for setting the aperture area of the diaphragm 22 in accordance with the optimal exposure amount calculated in the exposure amount control parameter calculator 511. The control signals generated in these shutter control signal generator 523, zooming/focusing control signal generator 524 and diaphragm control signal generator 525 are sent to the corresponding sections of the driving unit 60.

The input/output device 530 is connected with the memory card interface 412 and the LCD interface 413 for causing a photographed image signal to be recorded in the memory card 107, to be displayed on the LCD device 106 after specified image processings were applied to the photographed image or conversely for causing an image signal to be read from the memory card 107 in accordance with a command signal or the like from the operating unit 100.

Referring back to FIG. 2, the driving unit 60 causes mechanically drivable portions of the electronic camera 1 to actually drive in accordance with the control signals generated in the control signal generating unit 520 and is provided with a shutter driver 61, a zooming/focusing driver 62 and a diaphragm driver 63.

The shutter driver 61 opens and closes the shutter 23 in accordance with the control signal given from the shutter control signal generator 523 so that the shutter 23 is open for a specified period. The zooming/focusing driver 62 activates a motor or the like for moving the zoom lens block or the focusing lens block of the lens group 21 in accordance with the control signal given from the zooming/focusing control signal generator 524, thereby moving the lens block to a focus position. Further, the diaphragm driver 63 drives the diaphragm 22 in accordance with the control signal given from the diaphragm control signal generator 525, thereby setting the diaphragm 22 to have a specified opening.

(Detailed Description of the Gradation Converter 409)

Figure 5:
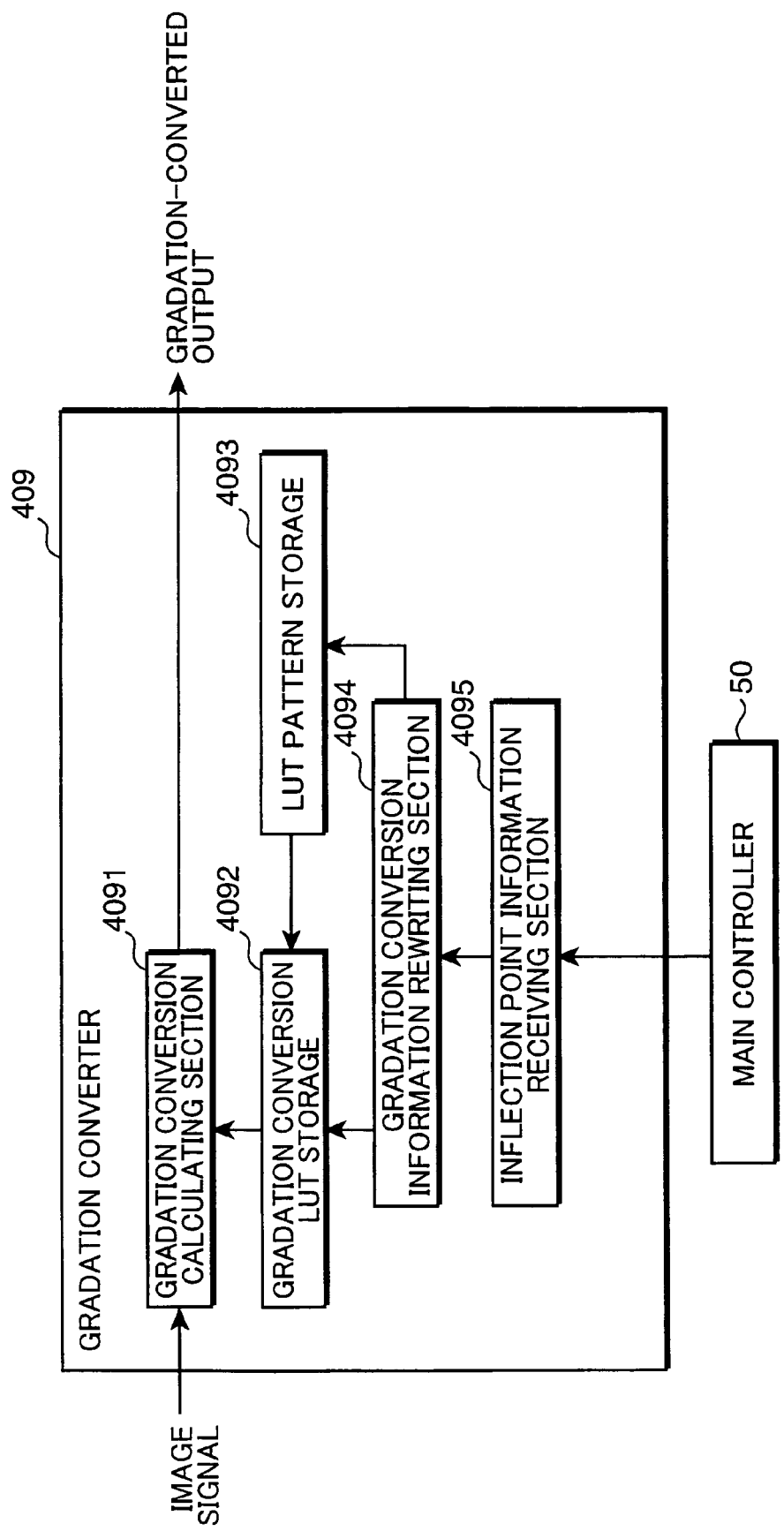
FIG. 5 is a function block diagram showing functions of a gradation converter as an essential element of this embodiment.

Next, the gradation converter 409 as a feature of this embodiment is described in detail. FIG. 5 is a function block showing the functions of the gradation converter 409. The gradation converter 409 includes a gradation conversion calculator 4091, a gradation conversion LUT storage (gradation conversion information storage device) 4092, a LUT pattern storage 4093, a gradation conversion information rewriting section (gradation conversion information rewriter) 4094 and an inflection point change information receiver 4095.

The gradation conversion calculator 4091 carries out a calculation for such a gradation conversion as to match the gradation conversions of the image signals (image signals of the color components R, G, B inputted from the 3×3 color corrector 408) to those of the display device (such as the LCD device 106 or the monitor television for the external output) for displaying an image based on these image signals. Upon such a calculation, a gradation conversion LUT stored in the gradation conversion LUT storage 4092 is referred to.

The gradation conversion LUT storage 4092 includes a ROM or RAM for storing the gradation conversion LUT used for the gradation conversion calculation as described above. The gradation conversion LUT here is a LUT having at least two gradation conversion characteristics including the first gradation conversion characteristic that is the gradation conversion information for the linear characteristic area and the second gradation conversion characteristic that is the gradation conversion information for the logarithmic characteristic area, the two gradation conversion characteristics having the switching point at the inflection point between the linear characteristic area and the logarithmic characteristic area of the image sensor 30. For example, if the gradation conversion characteristic is linear, it is such that two kinds of linear curves having different inclinations are coupled to each other with the inflection point at a boundary point, the one serving as the first gradation conversion characteristic while the other serving as the second gradation conversion characteristic.

The gradation conversion LUT is desirably constructed such that the second gradation conversion characteristic as the gradation conversion information for the logarithmic characteristic area has a higher degree of gradation conversion than the first gradation conversion characteristic as the gradation conversion information for the linear characteristic area. Specifically, since the image is picked up while having the gradation thereof more compressed in the logarithmic characteristic area than in the linear characteristic area, the image signal in the logarithmic characteristic area can be outputted while having the gradation thereof more expanded by setting the higher degree of gradation conversion for the second gradation conversion characteristic. In this way, the compressed gradation can be restored.

Figure 6:
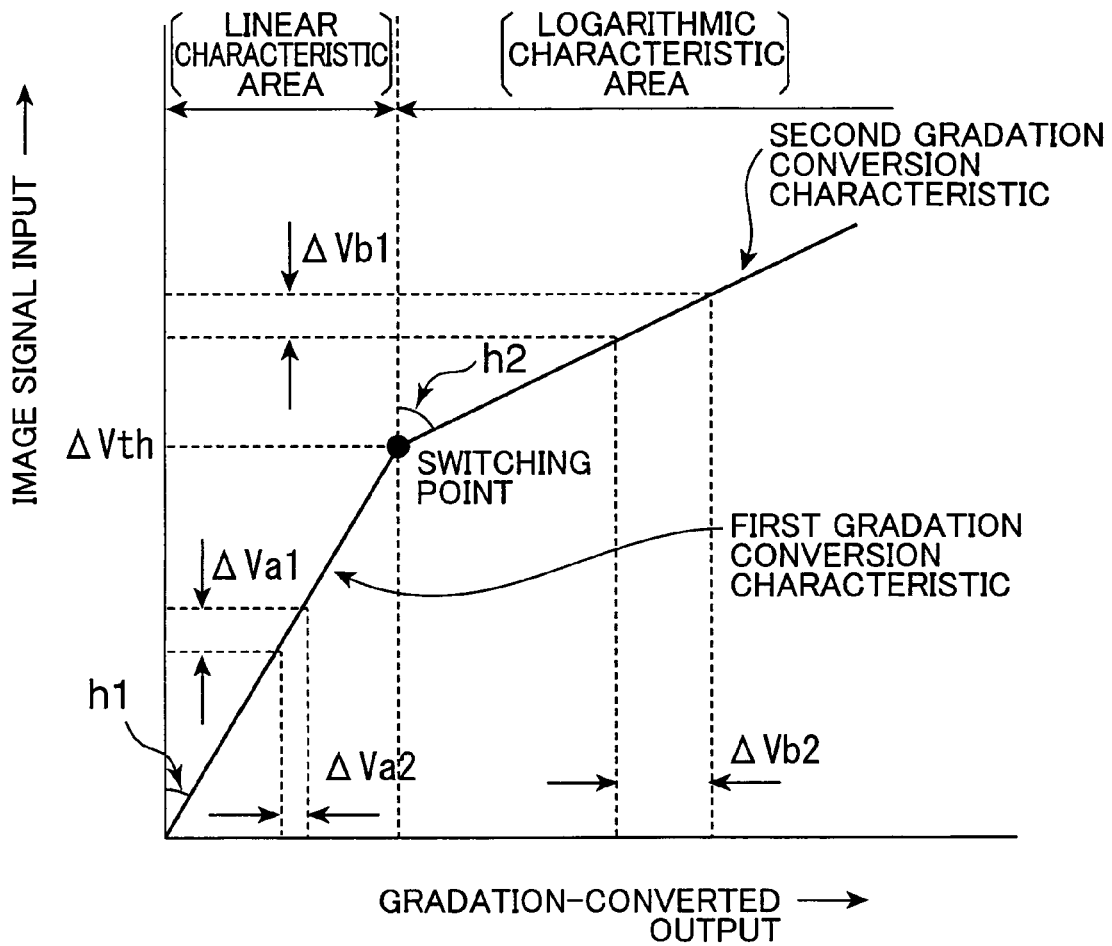
FIG. 6 is a graph showing an exemplary gradation conversion LUT used in the gradation converter.

This point is described with reference to FIG. 6 that is a graph showing one exemplary gradation conversion LUT. The first gradation conversion characteristic as the gradation conversion information for the linear characteristic area is a linear photoelectric conversion characteristic having an inclination h1, whereas the second gradation conversion characteristic as the gradation conversion information for the logarithmic characteristic area is a linear gradation conversion characteristic having an inclination h2 larger than the inclination h1. A switching point P between the first and second gradation conversion characteristics is set at an output level (image signal input level) Vth corresponding to the inflection point between the linear characteristic area and the logarithmic characteristic area of the image sensor 30. Accordingly, the gradation conversion is carried out using the first photoelectric conversion characteristic if the image signal input level is Vth or below while being carried out using the second gradation conversion characteristic if it is above Vth. In this way, a gradation-converted output can be generated.

Here, since the inclination h1 of the first gradation conversion characteristic part is relatively small, a gradation-converted output $\Delta Va2$ having a relatively low degree of gradation conversion when an output level $\Delta Va1$ corresponding to a specific luminance range is considered. Contrary to this, since the inclination h2 of the second gradation conversion part is relatively large, a gradation-converted output $\Delta Vb2$ having a relatively high degree of gradation conversion is generated when an output level $\Delta Vb1$ corresponding to a specific luminance range is similarly considered. Thus, a gradation-converted output can be generated with the gradation of the image signal in the logarithmic characteristic area expanded.

The LUT pattern storage 4093 includes a ROM, a RAM or the like and stores a plurality of gradation conversion LUT patterns, for example, those used for the first gradation conversion characteristic and the second gradation conversion characteristic. It is desirable to store a plurality of kinds of gradation conversion LUT patterns for the first and second gradation conversion characteristics. It is also desirable to store gradation conversion LUT patterns for a third gradation conversion characteristic to be described later and other gradation conversion characteristics. These gradation conversion LUT patterns may be linear LUT patterns having different inclinations as shown in FIG. 6 or may be nonlinear LUT patterns.

The gradation conversion information rewriting section 4094 rewrites the gradation conversion LUT stored in the gradation conversion LUT storage 4092 to a new gradation conversion LUT corresponding to an inflection point after a change resulting from a change in the photoelectric conversion characteristic of the image sensor 30. For example, if it is assumed that the gradation conversion LUT pattern for the first gradation conversion characteristic having the inclination h1 and the gradation conversion LUT pattern for the second gradation conversion characteristic having the inclination h2 as shown in FIG. 6 are stored in the LUT pattern storage 4093, the gradation conversion information rewriting section 4094 generates a new gradation conversion LUT whose switching point P between the first and second gradation conversion characteristics is so changed as to correspond to the inflection point after the change when obtaining the change information of the inflection point, and replaces the gradation conversion LUT stored in the gradation conversion LUT storage 4092 by the newly generated gradation conversion LUT.

The inflection point change information receiver 4095 receives renewal information of the photoelectric conversion characteristic (change information of the inflection point), for example, from the photoelectric conversion characteristic information storage 516 of the main controller 50 and inputs this change information to the gradation conversion information rewriting section 4094. The gradation conversion information rewriting section 4094 is so constructed as to rewrite the gradation conversion LUT as above upon the input of the change information from the inflection point change information receiver 4095. It should be noted that the photoelectric conversion characteristic information storage 516, the LUT pattern storage 4093 and the like may be provided in the memory section 515 of the main controller 50.

(Description of an Overall Flow of Operations)

An overall flow of the operations of the thus constructed electronic camera 1 according to this embodiment is first described. FIG. 8 is a flowchart showing one example of an overall operation of the electronic camera 1 according to this embodiment. As shown in FIG. 8, the overall operation can be roughly divided into an evaluation value detecting step (Step S1) where the AE evaluation values, the AF evaluation values, the WB evaluation values and other evaluation values are detected, a control parameter calculating step (Step S2) where various parameters are calculated based on the obtained evaluation values, a control parameter setting step (Step S3) where the calculated various control parameters are set in the corresponding parts of the electronic camera 1 to drive the respective parts of the electronic camera 1, thereby attaining a shooting state corresponding to the set control parameters, and a gradation conversion LUT setting step (Step S4) where the gradation conversion LUTs are set in accordance with the set control parameters.

In this embodiment, such an operation flow is characterized in that the control parameters for various controls are calculated in Step S2 based on the various evaluation values such as the AE evaluation values detected in Step S1, then the sensing control parameters are set in Step S3 and the first and second gradation conversion characteristics corresponding to the linear characteristic area and the logarithmic characteristic area of the image sensor 30 are set in the gradation converter 409, particularly characterized in that the switching point between the first and second photoelectric conversion characteristics is so controlled as to change as the inflection point of the photoelectric conversion characteristic changes as a result of the AE control and the like. The respective Steps S1 to S4 are successively described below while such a characterizing point is suitably emphasized.

The following processings are specifically carried out in the respective Steps S1 to S4.

First, in the evaluation value detecting step S1, evaluation value information as bases of the various controls is obtained and the evaluation values are calculated based on the evaluation value information. In the case of the AE control, the luminance level of the subject as a target whose image is to be picked up is measured (detected), and the AE evaluation values are calculated from this measurement value. The luminance level and the luminance range can be detected as follows since it is rational to detect them from an image actually picked up by the image sensor 30 and the image sensor 30 can pick up both still images and moving images.

In Step S1-1: Detection from a Still Image:
An image used to detect the evaluation values is obtained as a still image picked up by the image sensor 30 before the actual shooting, and the luminance level and the luminance range are measured.

In Step S1-2: Measurement from Moving Images:
Images used to detect the evaluation values are obtained as moving images picked up by the image sensor 30 before the actual shooting, and the luminance level and the luminance range are measured. These two steps of obtaining the luminance information can be raised as examples and, thereafter, Step S1-3 follows.

In Step S1-3: Calculation of Evaluation Values:
Various evaluation values including the AE evaluation values are calculated based on the obtained luminance information of the image by the evaluation value detector 405.

Next, in Step S2, various parameters are calculated based on the evaluation values. In the case of the AE control, the exposure amount or the dynamic range is a factor of the AE control. Thus, these control parameters are calculated based on the AE evaluation values. Specifically, the following two parameter calculating steps can be raised as examples of Step S2.

In Step S2-1: Calculation of the Exposure Amount Control Parameters:
The main controller 50 calculates the exposure amount control parameters based on the AE evaluation values.

In Step S2-2: Calculation of the Dynamic Range Control Parameter:
The main controller 50 calculates the dynamic range control parameter based on the AE evaluation values.

In Step S3, the control parameters used to drive the respective parts of the digital camera 1 are set. In the case of the AE control, the control parameters are set based on Step S2-1 or Step S2-2. The following two steps of setting the parameter can be raised as examples of Step S3.

In Step S3-1: Setting of the Exposure Amount Control Parameters:
The calculated exposure amount control parameters are set in the memory section 515, the control signal generating unit 520 and the like, thereby causing the timing generating circuit 31 and the driving unit 60 to operate.

In Step S3-2: Setting of the Dynamic Range Control Parameter:
The calculated dynamic range control parameter is set in the memory section 515, the control signal generating unit 520 and the like, thereby causing the timing generating circuit 31 to operate.

These two parameter setting steps are carried out in combination or independently.

Finally in this embodiment, the gradation conversion LUT setting step (Step S4) is carried out to set the gradation conversion LUT corresponding to the set control parameters.

(Basic Characteristics of the Image Sensor Used in This Embodiment)

The aforementioned steps are described in detail one by one below. This embodiment premises the use of the image sensor 30 having, as its photoelectric conversion characteristics, the linear characteristic area where the electrical signal is outputted after being linearly converted in relation to the incident light amount and the logarithmic characteristic area where the electrical signal is outputted after being logarithmically converted in relation to the incident light amount. Thus, specific examples of the basic characteristics of the image sensor 30 are first described in detail.

Figure 9:
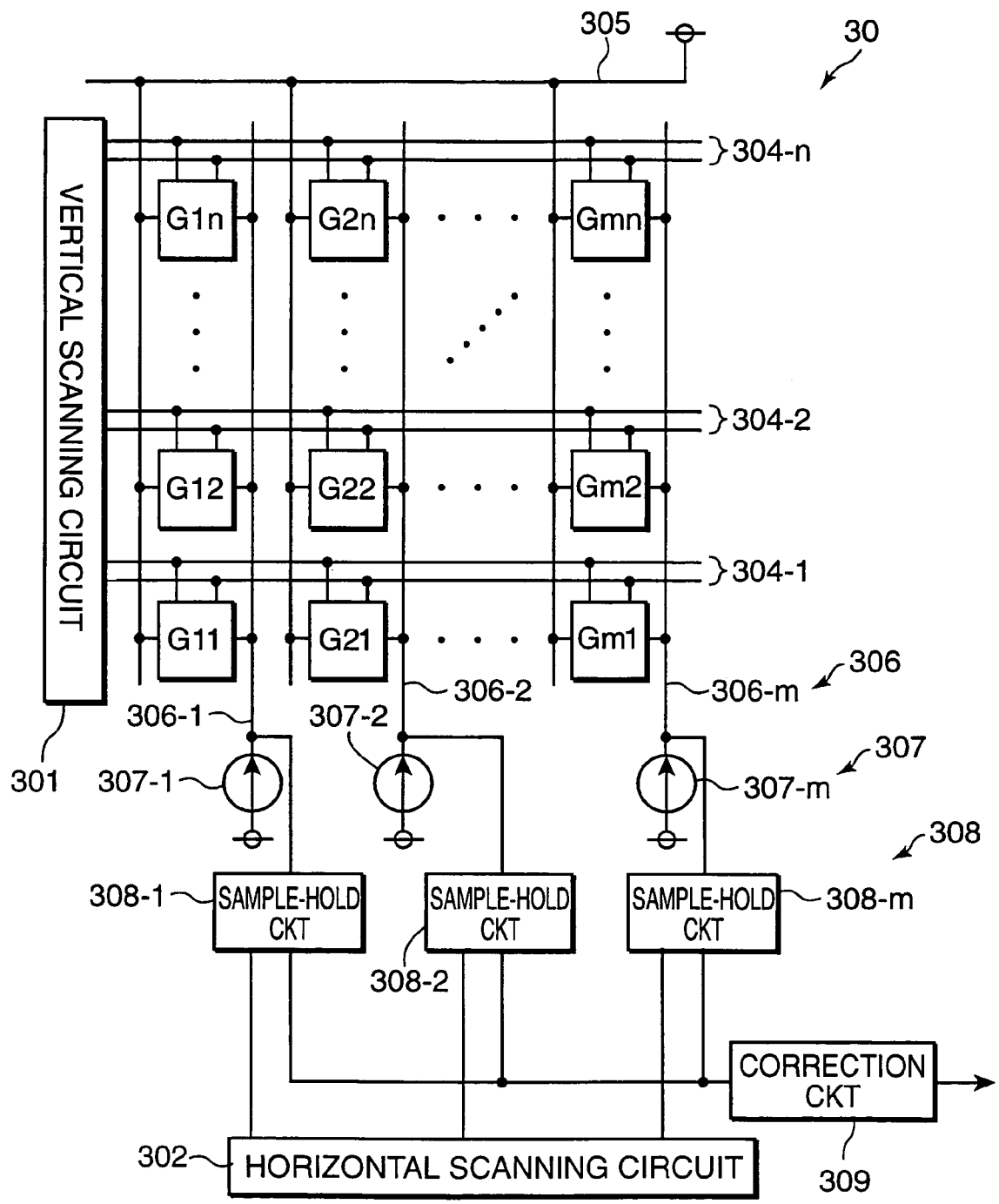
FIG. 9 is a schematic construction diagram showing a two-dimensional MOS solid-state image sensing apparatus as one example of the image sensor.

FIG. 9 is a schematic construction diagram of a two-dimensional MOS solid-state image sensing device which is one example of the image sensor 30. In FIG. 9, G11 to Gmn denote pixels arranged in matrix. A vertical scanning circuit 301 and a horizontal scanning circuit 302 are arranged near the outer periphery of a pixel section comprised of these pixels G11 to Gmn. The vertical scanning circuit 301 successively scans row lines (signal lines) 304-1, 304-2, ... 304-$n$ (these are collectively called row lines 304). The horizontal scanning circuit 302 successively reads out photoelectrically converted signals introduced from the respective pixels to output signal lines 306-1, 306-2, ... 306-$m$ (these are collectively called output signal lines 306) in horizontal direction pixel by pixel. Power is supplied to the respective pixels by a power-supply line 305. Although the respective pixels are connected with not only the row lines and the output signal signals, but also other lines (e.g., clock lines), the other lines are not shown in FIG. 9.

The output signal lines 306-1, 306-2, ... , 306-$m$ are provided with constant-current supplies 307-1, 307-2, ... , 307-$m$ (these are collectively called constant-current supplies 307) which are paired with transistors T5 to construct amplifying circuits. Instead of the constant-current supplies 307, resistors or transistors (MOS transistors) may be provided as the amplifying circuits. Image data of the respective pixels at the time of sensing which are outputted via the output signal lines 306 and correction data at the time of resetting are successively outputted to selecting circuits (sample-hold circuits) 308-1, 308-2, ... , 308-$m$ (these are collectively called selecting circuits 308). The image data and the correction data are outputted row by row to the selecting circuits 308 to be sample-held. The sample-held image data and correction data are outputted column by column to a correction circuit 309, where the image data are corrected based on the correction data so as to remove noise components due to a sensitivity variation. The image data having the sensitivity variation of the respective pixels corrected are serially outputted pixel by pixel from the correction circuit 309.

Figure 10:
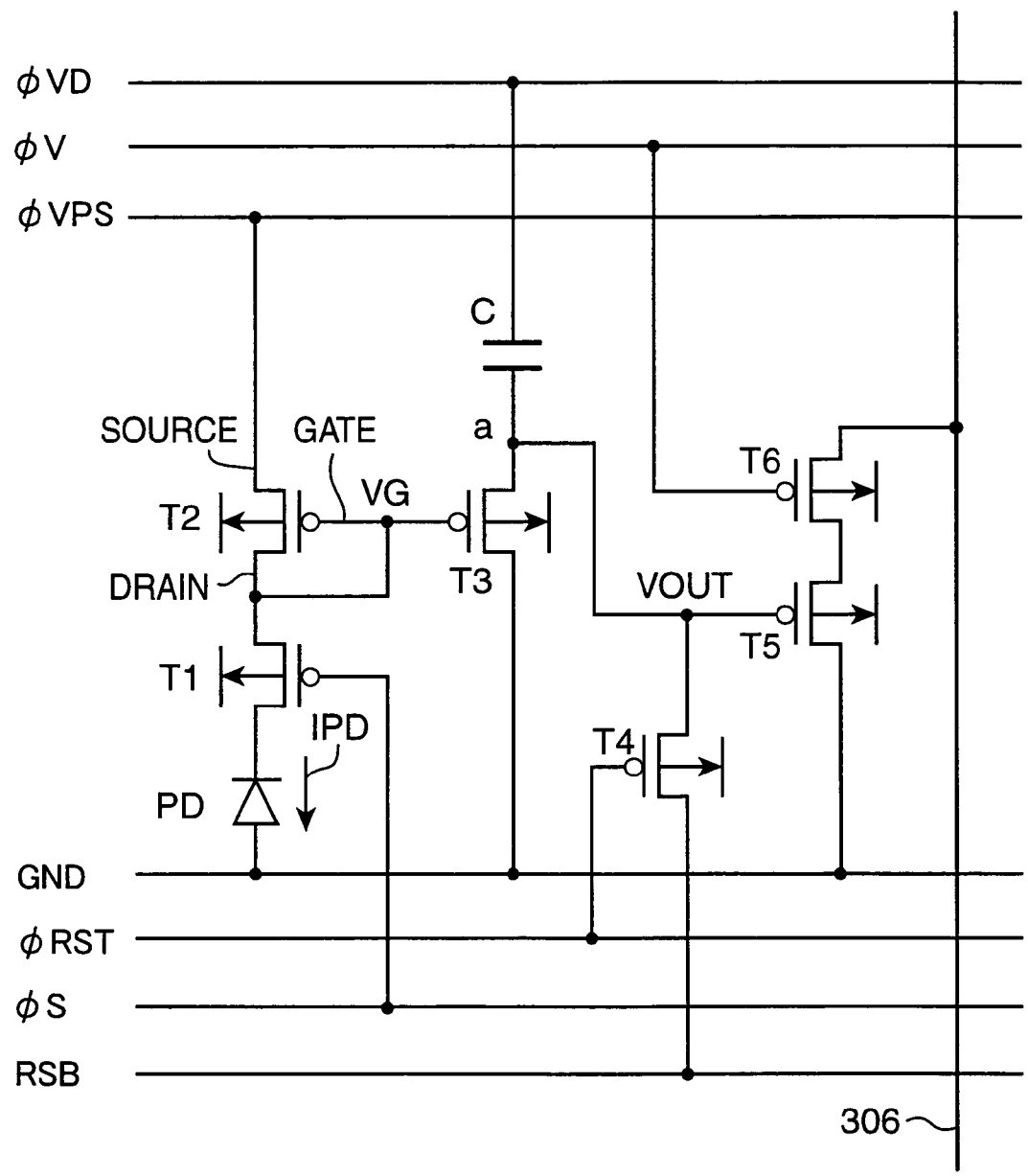
FIG. 10 is a circuit diagram showing a construction example of pixels G11 to Gmn shown in FIG. 9.

FIG. 10 is a circuit diagram showing a circuit construction example of each pixel G11 to Gmn shown in FIG. 9. As shown in FIG. 10, one pixel is comprised of a photodiode PD, transistors T1 to T6 as MOSFETs (metal oxide semiconductor field effect transistors), and a capacitor C for integration. Here, P-channel MOSFETs are used as the transistors T1 to T6. φVD, φV, φVPS, φRST, φS and RSB denote signals (voltages) to be given to the respective transistors and the capacitor C, and GND denotes a ground.

The photodiode PD is a photosensitive device (photoelectric converting device) and outputs an electrical signal (light current inflection point D) corresponding to an amount of incident light from a subject. The transistor T5 is paired with the constant-current supply 307 shown in FIG. 9 to construct the amplifying circuit (source-follower amplifier) for amplifying a source follower, and amplifies (current amplification) a voltage VOUT to be described later. The transistor T6 operates as a switch turned on and off in accordance with a voltage applied to a gate and is adapted to read a signal. In other words, a source of the transistor T6 is connected with the output signal line 306 shown in FIG. 9 and, when the transistor T6 is turned on, a current amplified by the transistor T5 is outputted to the output signal line 306 as an output current.

The transistor T2 generates, at a gate thereof, a voltage linearly or logarithmically converted in relation to the light current inflection point D. A minute current called subthreshold current flows in the MOSFET when a gate voltage is equal to or below a threshold value. The transistor T2 carries out the linear or logarithmic conversion taking advantage of this subthreshold characteristic.

Specifically, in the case that the luminance of a subject whose image is to be picked up is low (subject is dark), i.e., a small amount of light is incident on the photodiode PD, the gate voltage of the transistor T2 is higher than a source voltage of the transistor T2, wherein the transistor T2 is in a so-called cut-off state. Thus, no subthreshold current flows in the transistor T2 (transistor T2 does not operate in a subthreshold area) and a light current generated in the photodiode PD flows into a parasitic capacitance of the photodiode PD, thereby storing electric charges, with the result that a voltage corresponding to the stored amount of electric charges is generated. Since the transistor T1 is on at this time, the voltage corresponding to the amount of the electric charges stored in the parasitic capacitance is generated as a voltage VG at the gates of the transistors T2 and T3. This voltage VG causes a current to flow in the transistor T3, and an amount of electric charges proportional to this voltage VG are stored in the capacitor C (the transistor T3 and the capacitor C construct an integrating circuit). A voltage linearly proportional to an integrated value of the light current inflection point D appears at a connection node "a" of the transistor T3 and the capacitor C, i.e., output VOUT. At this time, the transistor T4 is off. When the transistor T6 is turned on, the electric charges stored in the capacitor C are drawn out to the output signal line 306 as an output current via the transistor T5. This output current takes a value obtained by linearly converting the integrated value of the light current inflection point D. The above is the operation of the image sensor 30 in the linear characteristic area.

On the other hand, in the case that the luminance of a subject whose image is to be picked up is high (subject is bright), i.e., a large amount of light is incident on the photodiode PD, the gate voltage of the transistor T2 is equal to or below the source voltage of the transistor T2, wherein the subthreshold current flows in the transistor T2 (transistor T2 operates in the subthreshold area) and a voltage VG taking a value obtained by natural-logarithmically converting the light current inflection point D is generated at the gates of the transistors T2, T3. This voltage VG causes a current to flow in the transistor T3, and an amount of electric charges equal to a value obtained by natural-logarithmically converting the integrated value of the light current inflection point D are stored in the capacitor C. In this way, a voltage proportional to the value obtained by natural-logarithmically converting the integrated value of the light current inflection point D is generated at the connection node "a" of the transistor T3 and the capacitor C (output VOUT). At this time, the transistor T4 is off. When the transistor T6 is turned on, the electric charges stored in the capacitor C are drawn out to the output signal line 306 as an output current via the transistor T5. This output current takes the value obtained by natural-logarithmically converting the integrated value of the light current inflection point D. The above is the operation of the image sensor 30 in the logarithmic characteristic area. In the above way, voltages linearly or natural-logarithmically proportional to the incident light amount (subject luminance) are outputted from the respective pixels.

The transistor T1 is a switch used to take out the noise data (noise signal created due to a variation in the production of the transistors T2) at the time of resetting. The transistor T1 is kept on except at the time of resetting, so that the light current inflection point D flows between (a drain of) the transistor T2 and the photodiode PD. At the time of resetting, the transistor T1 is kept off to shut off the light current inflection point D of the photodiode PD, and only the variation component is taken out. This variation component (noise signal) taken out is subtracted from a video signal to be described later.

The transistor T4 operates as a switch turned on and off in accordance with a voltage applied to a gate thereof and is for resetting the capacitor C. When the transistor T4 is turned on, a reset voltage (voltage of the signal RSB) is applied, whereby electric charges (amount of electric charges) stored in the capacitor C are reset to an initial state, i.e., state before the start of the integration.

Figure 11:
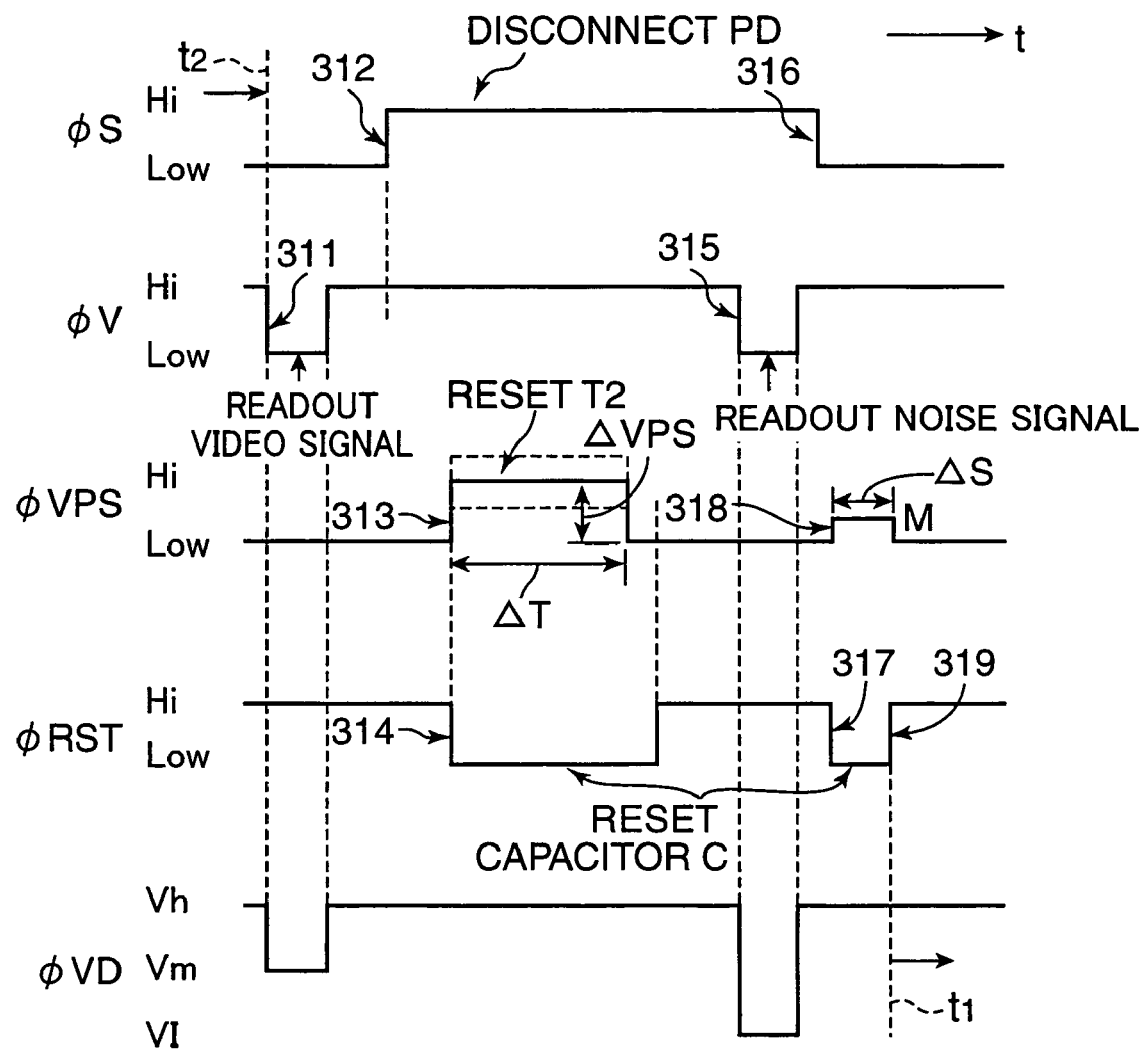
FIG. 11 is a chart relationship between of timings concerning image sensing operations of the image sensor.

FIG. 11 is a timing chart showing an exemplary sensing operation of the image sensor 30 (pixel). Here, due to its polarity, the P-channel MOSFET is turned off at Hi (high) while being turned on at Low (low) as below. First, the signal $\phi$V falls to Low at position 311, whereby the transistor T6 is turned on to read out a video signal, i.e., to draw out the electric charges stored in the capacitor C to the output signal line 306 as an output current (video signal). Subsequently, the signal $\phi$S rises to Hi at position 312, whereby the transistor T1 is turned off to separate the photodiode PD. Then, the signal $\phi$VPS rises to Hi at position 313 to reset the transistor T2. Simultaneously with the resetting of the transistor T2, the signal $\phi$RST falls to Low at position 314, whereby the transistor T4 is turned on and a reset voltage by the signal RSB is applied to the capacitor C (connection node "a") (potential at the connection node "a" becomes a potential (VRSB) of the signal RSB), thereby resetting the capacitor C (electric charges). After the transistor T2 and the capacitor C are reset in this way, the signal $\phi$V falls to Low again at position 315, whereby the transistor T6 is turned on to draw out a noise signal to the output signal line 306.

Subsequently, the signal $\phi$S falls to Low at position 316 (transistor T1 is turned on), thereby canceling the separation of the photodiode PD. Then, the signal $\phi$VPS takes the medium potential M at position 318, thereby resetting the parasitic capacitance of the photodiode PD in order to reduce an afterimage. Further, in order to make an integration starting voltage for the next frame constant, the signal $\phi$RST falls to Low again at position 317 to turn the transistor T4 on, whereby the capacitor C is reset again.

Thereafter, the signal $\phi$VPS falls to Low at position 319, thereby ending the resetting of the parasitic capacitance of the photodiode PD. Simultaneously, the signal $\phi$RST rises to Hi, thereby ending the resetting of the capacitor C. The integration of the capacitor C is started at this time t1 and continues up to position 311 of the signal $\phi$V, i.e., till time t2 when the readout of the video signal in the next frame is started. A period between time t1 and time t2 is an integration period of the capacitor C, i.e., an exposure period in the image pickup operation. The exposure period is controlled by controlling a period $\Delta$S (duration) during which the signal $\phi$VPS, which takes the medium potential M, is given. This period $\Delta$S is controlled by the sensor exposure period control signal generator 522 via the timing generating circuit 31.

The signal $\phi$VD is used to maneuver the potential in order to conform to the operation range of the amplifying circuit (source-follower amplifier) or to adjust offsets created in the video signal and the noise signal. Vh, Vm and Vl of the signal $\phi$VD denote high potential, medium potential and low potential, respectively.

The image sensor 30 can obtain an output signal linearly or logarithmically converted in relation to the subject luminance as described above, and has a photoelectric conversion characteristic 320 as shown in FIG. 12. As shown in FIG. 12, the photoelectric conversion characteristic 320 is divided into a linear characteristic area and a logarithmic characteristic area with an inflection point 321 as a boundary. This inflection point 321 is a point where the linear characteristic area is switched to the logarithmic characteristic area, and Vth denotes a value of a sensor output at this inflection point 321. Generally, in the linear characteristic area, the gradation of the entire image can be made high (high contrast can be attained) although a subject having a wide luminance range cannot be photographed (dynamic range is narrow), and a high-quality image having a high gradation can be obtained even for a dark subject (e.g., subject in a cloudy weather or in shadow). On the other hand, in the logarithmic characteristic area, a subject having a wide luminance range can be photographed (dynamic range is wide) although gradation at high luminance is poor, and a high-quality image having a depth can be obtained even for a bright subject (e.g., subject illuminated by direct sunlight or having direct sunlight located behind) including a dark part.

Figure 13:
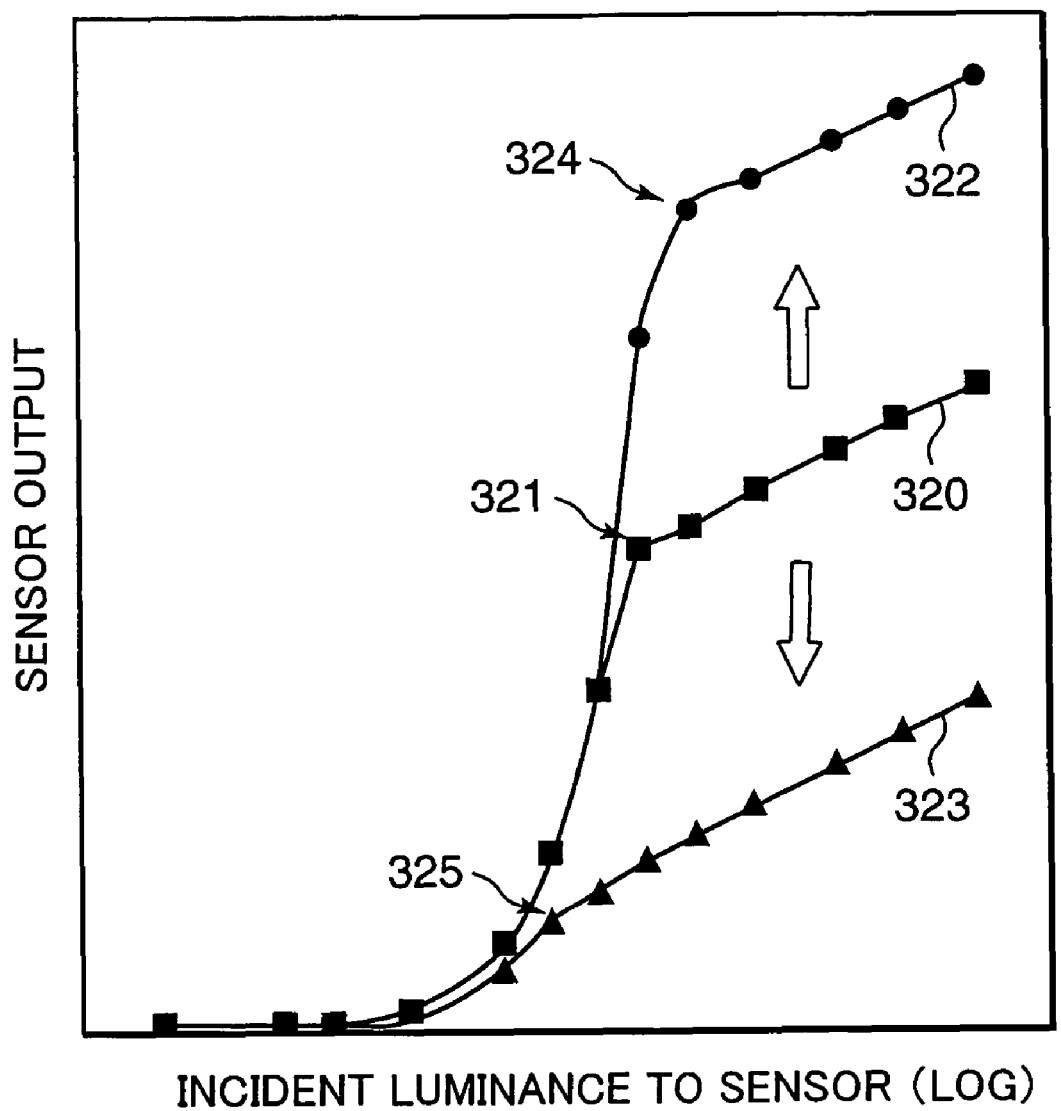
FIG. 13 is a graph showing shifts of the photoelectric conversion characteristic.

The photoelectric conversion characteristic 320 (inflection point 321) can be changed (shifted) by changing a difference between HIGH- and LOW-voltages of the signal $\phi$VPS inputted to the source of the transistor T2. Specifically, if VPH, VPL denote voltages when the signal φVPS is high and low, respectively, the photoelectric conversion characteristic 320 (inflection point 321) can be arbitrarily changed to a photoelectric conversion characteristic 322 (inflection point 324) or a photoelectric conversion characteristic 323 (inflection point 325) as shown in FIG. 13 by changing a voltage difference ΔVPS (=VPH−VPL) (see FIG. 11). By changing the photoelectric conversion characteristic in this way, a ratio of the linear characteristic area to the logarithmic characteristic area changes, whereby a photoelectric conversion characteristic having a large ratio of the linear characteristic area as given by the photoelectric conversion characteristic 322 or a photoelectric conversion characteristic having a large ratio of the logarithmic characteristic area as given by the photoelectric conversion characteristic 323 can be obtained. In this case, a change may be made such that the entire photoelectric conversion characteristic is represented by the linear or logarithmic characteristic area.

In this embodiment, ΔVPS is changed by changing the voltage VPH, whereby the photoelectric conversion characteristic of the image sensor 30 is changed. In FIG. 13, the higher VPH (the larger ΔVPS), the larger the ratio of the linear characteristic area, and the photoelectric conversion characteristic changes toward the photoelectric conversion characteristic 322. The lower VPH (the smaller ΔVPS), the larger the ratio of the logarithmic characteristic area, and the photoelectric conversion characteristic changes toward the photoelectric conversion characteristic 323. This voltage VPH is controlled by the dynamic range control signal generator 521 via the timing generating circuit 31.

In order to change the photoelectric conversion characteristic as described above, the period ΔT during which the signal φVPS whose voltage becomes VPH is given may be changed. In such a case, the longer the period ΔT, the larger the ratio of the linear characteristic area, and the shorter the period ΔT, the larger the ratio of the logarithmic characteristic area. In FIG. 13, a case where the period ΔT is long corresponds to the photoelectric conversion characteristic 322, and a case where the period ΔT is short corresponds to the photoelectric conversion characteristic 323.

(Evaluation Value Detecting Step S1)

Next, specific methods for obtaining the evaluation values such as the AE evaluation values in the evaluation value detector 405 of the signal processing unit 40 are described.

Figure 14:
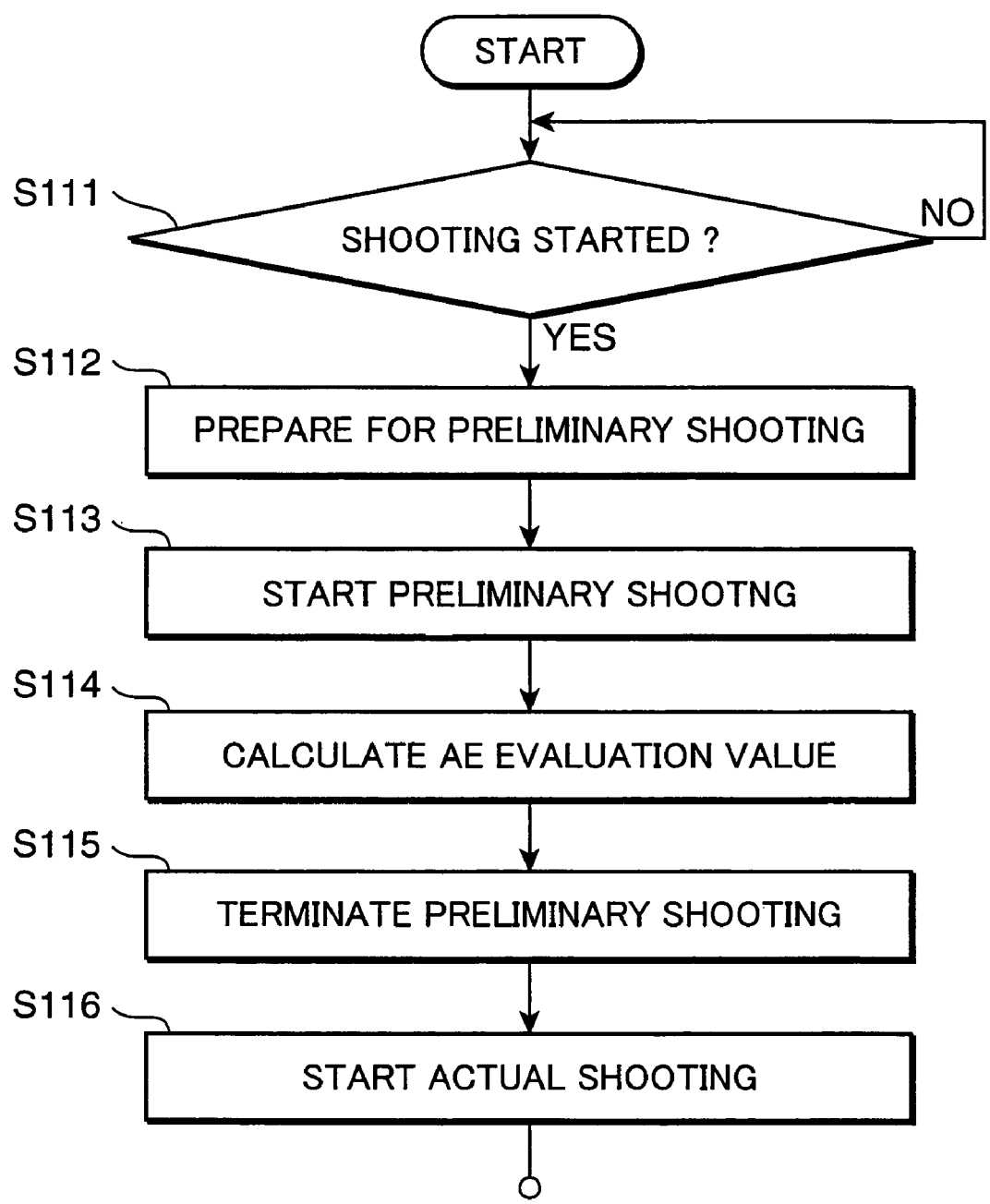
FIG. 14 is a flowchart showing an operation example in the case of detecting AE evaluation values and the like of a subject from a still image actually picked up by the image sensor.

In Step S1-1: Example of Detecting Evaluation Values from a Still Image:

FIG. 14 is a flowchart showing an exemplary operation in the case of detecting AE evaluation values of a subject from a still image actually picked up by the aforementioned image sensor 30. Specifically, in the case of shooting a still image (actual shooting) using the electronic camera 1 of this embodiment, a still image used to obtain the AE evaluation values is picked up (preliminary shooting) prior to the actual shooting, and the AE evaluation values are calculated based on this preliminarily picked-up image. FIG. 14 shows this flow. This evaluation value detecting technique is suitable for a digital single-lens reflex camera or the like image sensing apparatus of the type that a subject light image is incident on an optical viewfinder, but not on the image sensor 30 during the shooting preparation.

First, after the power switch 101 of the electronic camera 1 is pressed down to turn the electric camera 1 on, it is judged whether or not an operation for starting the shooting has been made (Step S111). When the release switch 102 is operated (e.g., pressed halfway) (YES in Step S111), an operation for preparing the preliminary shooting is started (Step S112).

In Step S112, the dynamic range control for the preliminary shooting is carried out upon performing the preliminary shooting to calculate the AE evaluation values. Here, the dynamic range control is executed such that the image sensor 30 has a maximum dynamic range so as to be able to sense the luminance of a subject in a wide range. In other words, since there is only one chance of the preliminary shooting before the actual shooting in a digital single-lens reflex camera or the like, a wide dynamic range is set so that the luminance of any subject can be securely detected.

To this end, the operative state of the image sensor 30 is controlled such that the image sensor 30 logarithmically converts its output in the entire area. Specifically, when the release switch 102 is pressed halfway, an instruction to transit to a preliminary shooting mode is sent to the respective parts from the main controller 50 and, upon receiving such an instruction, the dynamic range control signal generator 521 generates a signal for changing, e.g., a difference between the HIGH- and LOW-voltages of the signal φVPS inputted to the source of the transistor T2 shown in FIG. 10 (in this case, the aforementioned ΔVPS is made smaller: see FIG. 11), thereby executing such a control as to increase the ratio of the logarithmic characteristic area of the image sensor 30. Although it is desirable to set the entire area as the logarithmic characteristic area in order to ensure a wide dynamic range, the entire area may not be necessarily set as the logarithmic characteristic area, and the linear characteristic area may be left to a certain extent.

Subsequently, an exposure control for the preliminary shooting is carried out to perform the preliminary shooting (Step S113). Specifically, the sensor exposure period control signal generator 522, for example, generates a drive signal for setting the duration of the period ΔS during which the signal φVPS takes the medium potential M in conformity with a specified exposure period, and sends it to the timing generating circuit 31, whereby the exposure control (exposure amount control) for preliminary shooting of the image sensor 30 is carried out. In addition, the exposure control is carried out by adjusting the shutter speed of the shutter 23 by means of the shutter driver 61 in accordance with a control signal generated by the shutter control signal generator 523 and by adjusting the diaphragm 22 by means of the diaphragm driver 63 in accordance with a control signal generated by the diaphragm control signal generator 525. After such an exposure control is made, a still image is preliminarily picked up. Then, the evaluation value detector 405 calculates the AE evaluation values based on the preliminarily picked-up image (Step S114). This AE evaluation value calculating step is described in detail later. The preliminary shooting ends (Step S115) upon calculating the AE evaluation values, and the actual shooting is started (Step S116) after the exposure control is carried out based on the AE evaluation values. Although the above description is given with respect to the case of obtaining the AE evaluation values, the AF evaluation values and the WB evaluation values can be similarly obtained.

Figure 15:
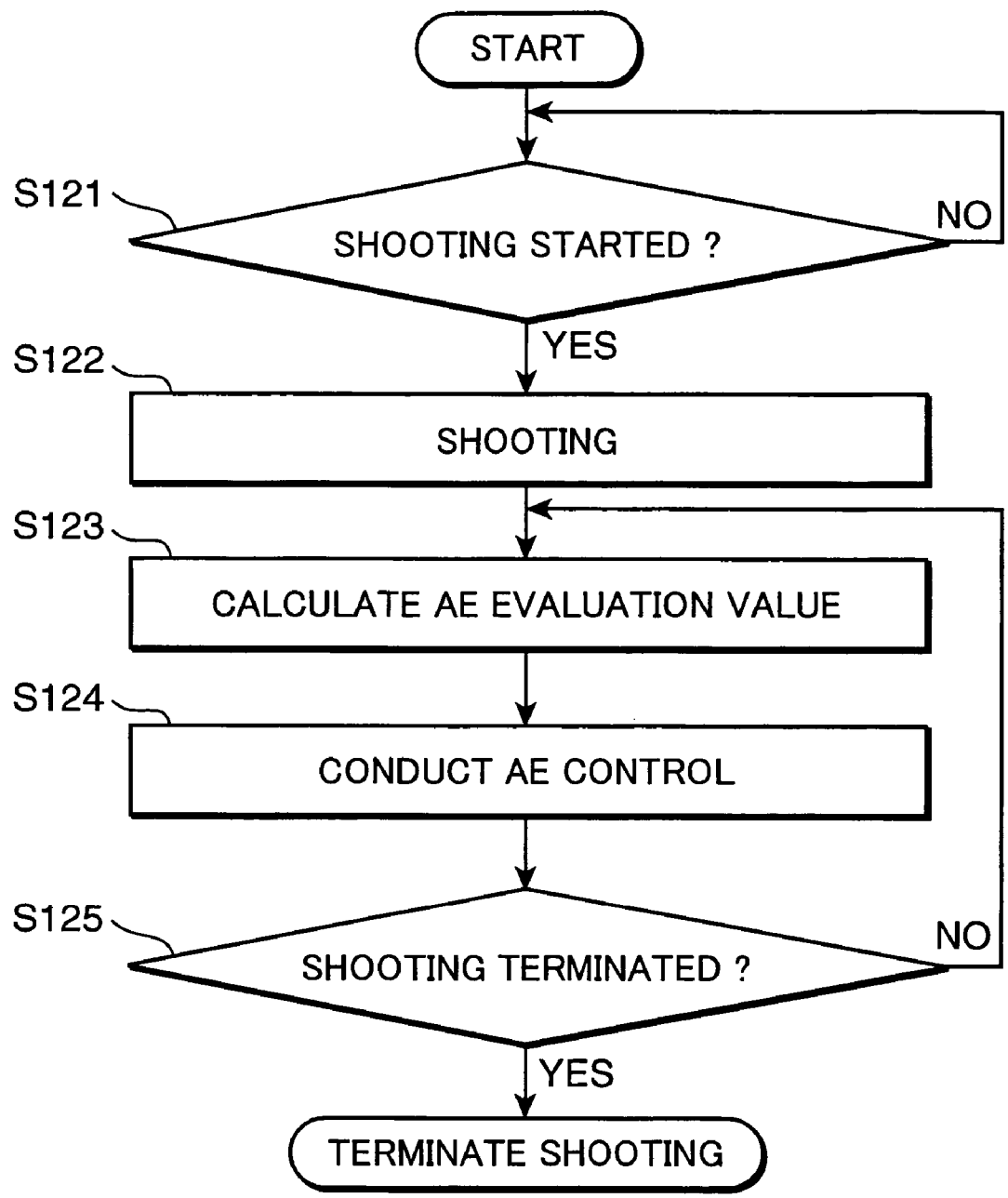
FIG. 15 is a flowchart showing an operation example in the case of detecting AE evaluation values and the like of the subject from moving images successively picked up by the image sensor.

In Step S1-2: Example of Detecting Evaluation Values from Moving Images:

FIG. 15 is a flowchart showing an exemplary operation in the case of detecting the AE evaluation values and the like of a subject from moving images successively picked up by the image sensor 30. Specifically, in the case that the electronic camera 1 waits on standby for the shooting or in the moving-picture shooting mode or the image sensing apparatus of this embodiment is applied to a digital movie, the AE evaluation values are calculated using all the frame images picked up by the image sensor 30. FIG. 15 shows this flow.

First, it is judged whether or not an operation for starting the shooting has been made (Step S121). When the mode setting switch 105 is, for example, operated to enter the moving-image shooting mode and the start of the shooting is confirmed (YES in Step S121), the shooting of moving images is started (Step S122). The respective control values such as the image sensing dynamic range, exposure period and aperture value at the time of starting the shooting are set to initial values.

Subsequently, the evaluation value detector 405 calculates the AE evaluation values based on the images picked up in Step S122 (Step S123). Based on the detected AE evaluation values, the dynamic range control signal generator 521 changes the setting of the signal ϕVPS to control the dynamic range, and the shutter 23 and the diaphragm 22 are controlled by control signals generated by the shutter control signal generator 523 and the diaphragm control signal generator 525, whereby a specified AE control is conducted (Step S124).

It is then judged whether or not the shooting has terminated (Step S125). In the case of receiving no instruction to terminate the shooting (NO in Step S125), this routine returns to Step S123 to repeat the similar calculation of the AE evaluation values and the AE control in Step S124. In other words, when moving images are photographed, all the picked-up images are used as evaluation images for detecting the AE evaluation values, and the AE control for the next shooting is carried out based on the obtained AE evaluation values. This cycle is repeated. Instead of using all the picked-up images as evaluation images, some of the picked-up images (e.g., one out of several frames of picked-up images) may be used as evaluation images and the AE evaluation values may be obtained from these evaluation images.

Figure 16:
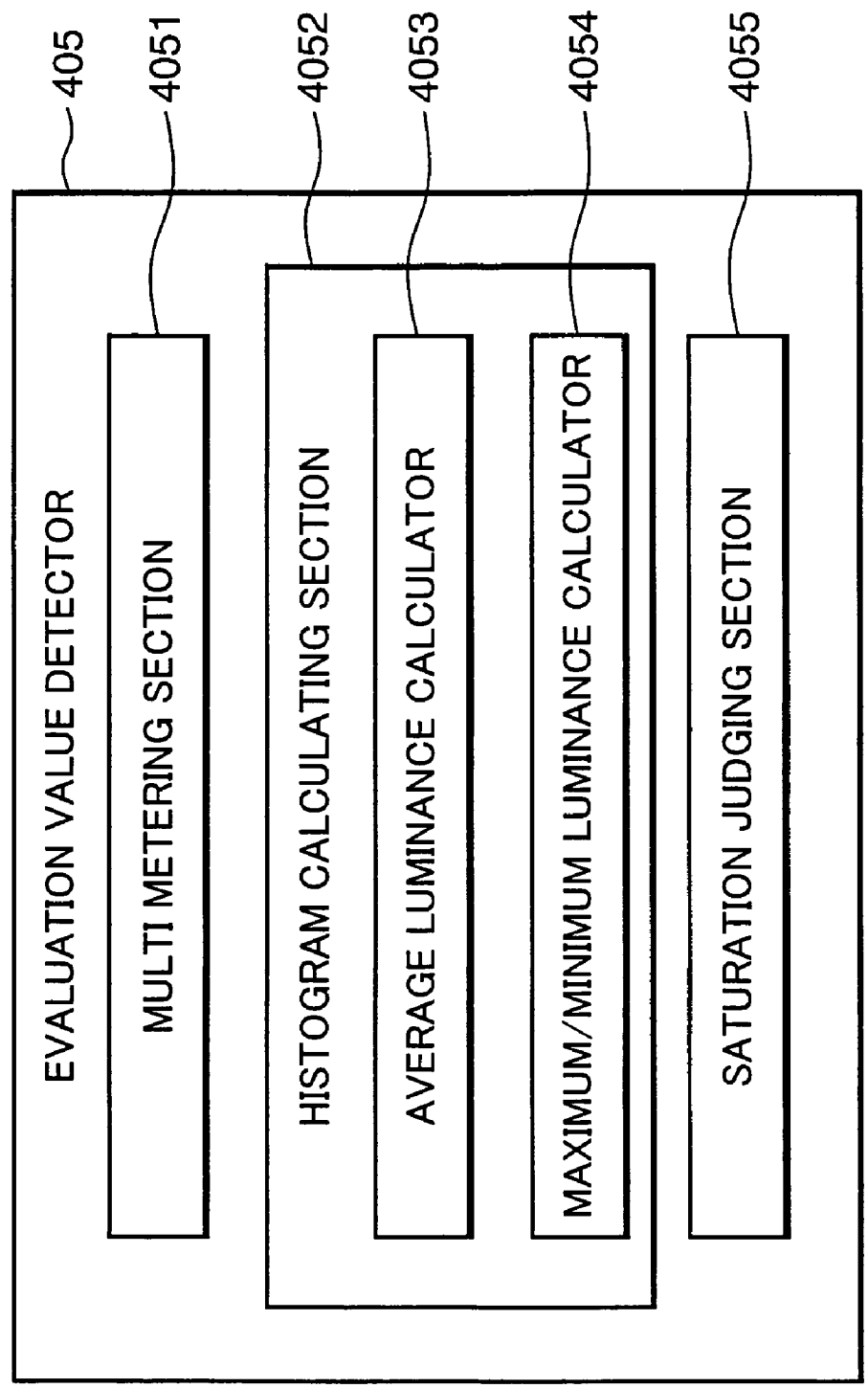
FIG. 16 is a function block diagram showing functions of an evaluation value detector.

In Step S1-3: Calculation of Evaluation Values:
Next, the evaluation value calculating steps (Steps S114, S123) in the above flows are described in detail. FIG. 16 is a block diagram showing the evaluation value detector 405. The evaluation value detector 405 includes a multi metering section 4051, a histogram calculating section 4052, and a saturation judging section 4055.

Figure 17:
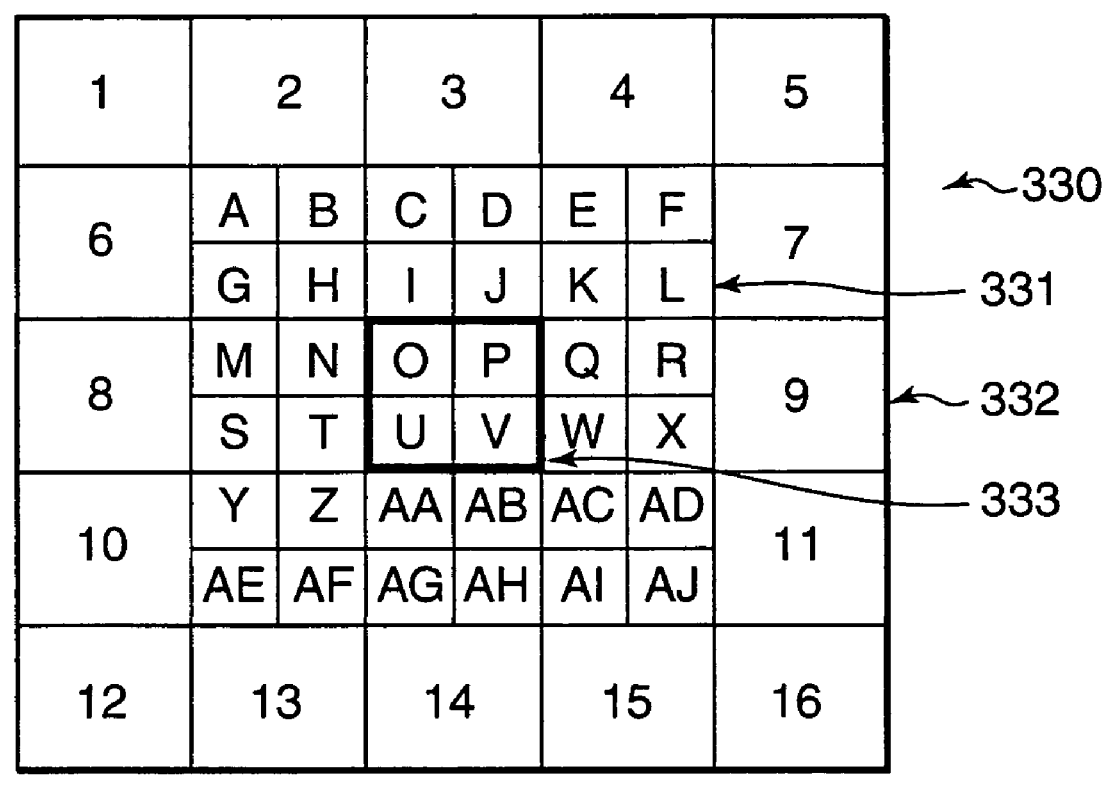

The multi metering section 4051 performs a light measurement for a subject using a divided light measuring (multi-pattern light measuring) system. Specifically, the multi metering section 4051 divides the picked-up image obtained by the image sensor 30 into a specified number of areas (sections), and detects luminance in this picked-up image (respective areas or sections) from an image signal (image data). FIG. 17 is a diagram showing a divided state of a sensing area (light measurement range) in a divided light measurement. Identified by 330 is a sensing area (image sensing area 330) obtained by the image sensor 30, and a subject is picked up (sensed) in this sensing area 330. A multitude of pieces of pixel information, i.e., subject luminance information corresponding to image sensing elements forming the image sensor 30 are contained in this sensing area 330. The image sensing area 330 is, for example, divided into a center area located in the center of the sensing area 330 and a peripheral area around this center area, and the center area and the peripheral area are divided into specified numbers of detection blocks (detection sections), respectively. The center area is, for example, divided into 36 detection blocks of A, B, C, Z, AA, AB, . . . AJ (A to AJ blocks), and the peripheral area is divided into 16 detection blocks of first to sixteenth blocks. In this embodiment, a subject sensed in this center area is called a main subject (hereinafter, the center area is referred to as a main subject area 331), and a subject sensed in the peripheral area is called a peripheral subject (hereinafter, the peripheral area is referred to as a peripheral subject area 332).

An area formed by the blocks O, P, U and V in the central part of the main subject area 331 serves as an AF area (AF area 333) where the AF evaluation values are detected for focusing control. Luminance (of the picked-up image) in the main subject area 331 is referred to as a main subject luminance, whereas the one in the peripheral subject area 332 is referred to as a peripheral subject luminance.

Figure 18A:
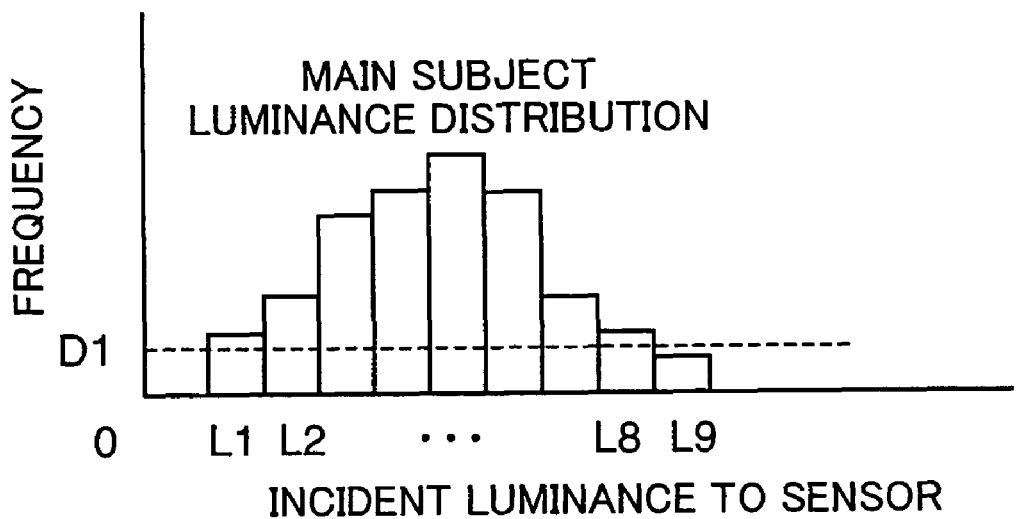
Figure 18B:
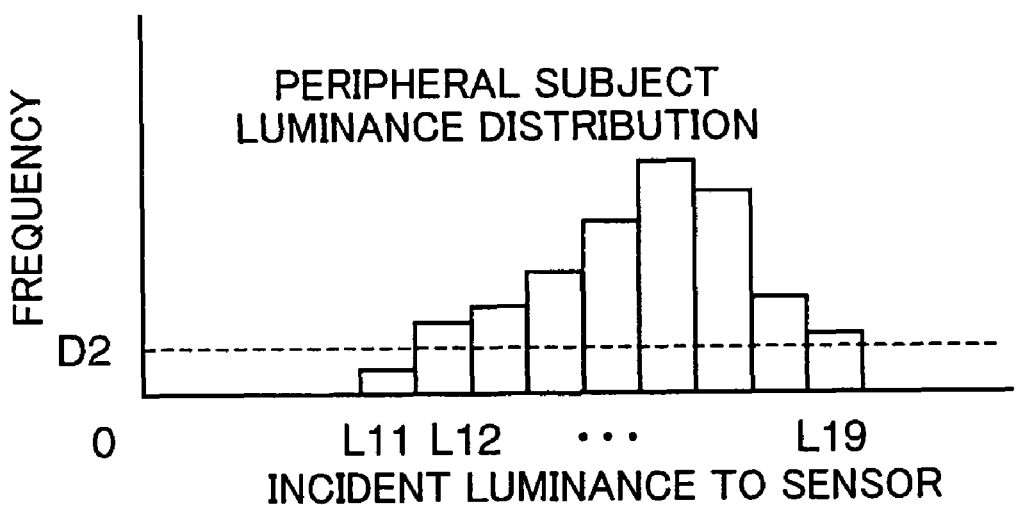

The histogram calculating section 4052 calculates a main subject luminance histogram (distribution) for each block A to AJ, and calculates a main subject whole luminance histogram in the entire main subject area 331 as shown in FIG. 18A using the main subject luminance histograms of the blocks A to AJ. The histogram calculating section 4052 also calculates a peripheral subject luminance histogram for each of the first to the sixteenth blocks, and calculates a peripheral subject whole luminance histogram in the entire peripheral subject area 332 as shown in FIG. 18B using the peripheral subject luminance histograms of the first to sixteenth blocks.

The histogram calculating section 4052 also calculates a luminance range of the entire main subject and a luminance range of the entire peripheral subject using the calculated main subject whole luminance histogram and peripheral subject whole luminance histogram. Upon this calculation, Gaussian pruning is applied using a specified threshold value. Specifically, for the main subject, the luminance data is cut back at a threshold value D1 as shown in FIG. 18A, and a range defined by a minimum value L1 and a maximum value L8 of luminances having frequencies equal to or above D1 is set as a main subject entire luminance range. Similarly, for the peripheral subject, the luminance data is cut back at a threshold value D2 as shown in FIG. 18B, and a range defined by a minimum value L12 and a maximum value L19 of luminances having frequencies equal to or above D2 is set as a peripheral subject entire luminance range. This Gaussian pruning using the threshold values is for reducing errors caused by noise or the like. Although the luminances (image (luminance) data) of the respective luminance histograms shown in FIGS. 18A and 18B are identified by L1 to L19 here for the sake of convenience, they are actually expressed in 256 stages (gradations) and can be identified by L1 to L256, for example, in the case of handling an image data of eight bits.

The histogram calculating section 4052 includes an average luminance calculator 4053 and a maximum/minimum luminance calculator 4054. The average luminance calculator 4053 calculates an average luminance of the main subject in each block A to AJ and an average luminance of the peripheral subject in each of the first to sixteenth blocks. This average luminance is calculated for each of the colors R, G, B. In the calculation of the average luminances, the main subject luminance histograms and the peripheral subject luminance histograms are calculated for the blocks A to AJ and for the first to sixteenth blocks, and the luminance data are cut back using specified threshold values in a manner similar to the above, and each average luminance is obtained by averaging the respective luminance values after this Gaussian pruning.

The maximum/minimum luminance calculator 4054 calculates the maximum/minimum luminances of the main subject for the respective blocks A to AJ and maximum/minimum luminances of the peripheral subject for the respective first to sixteenth blocks. In this case as well, the luminance data of the main subject luminance histogram and peripheral subject luminance histogram calculated for the respective blocks are cut back at the specified threshold values, and the maximum or minimum luminance is calculated based on the respective luminance values (luminance range) after the Gaussian pruning.

The histogram calculating section 4052 calculates an entire-area luminance histogram in the entire image sensing area (image sensing area 330), which is a sum of the main subject area 331 and the peripheral subject area 323, from the main subject whole luminance histograms and the peripheral subject whole luminance histograms in order to be used for the saturation judgment by the saturation judging section 4055 to be described later. The saturation judging section 4055 judges whether or not an output of the image sensor 30 is saturated at the time of detecting the AE (AF, WB) evaluation values based on the entire-area luminance histogram calculated by the histogram calculating section 4052.

Figure 19:
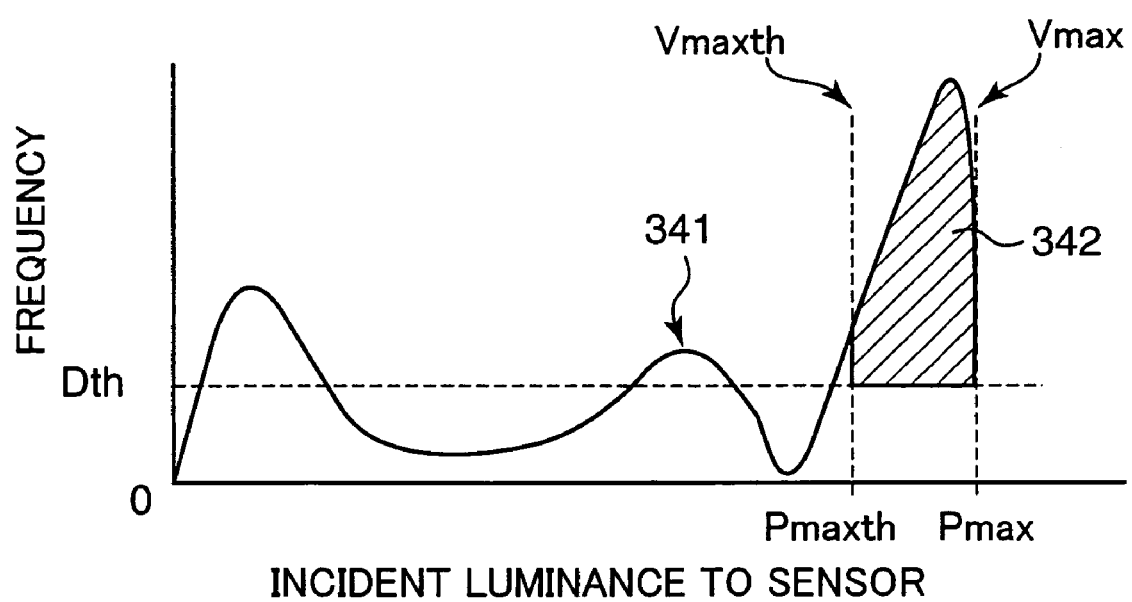
FIG. 19 is a graph showing one example of an entire-area luminance histogram when an output of the image sensor is saturated.

FIG. 19 is a graph showing an exemplary entire-area luminance histogram when the output of the image sensor 30 is saturated. Pmax in FIG. 19 denotes a sensor incident luminance (saturation luminance) when the image sensor 30 is at a saturated output level Vmax (physical maximum value of the output level of the image sensor 30), and Pmaxth denotes a sensor incident luminance (luminance threshold value) at a sensor output Vmaxth set as a specified threshold value for judging whether the output of the image sensor 30 is saturated or not. Further, Dth denotes a frequency (frequency threshold value) set as a threshold value beforehand for the same purpose of judging whether or not the output of the image sensor 30 is saturated or not.

The saturation judging section 4055 calculates, in the entire-area luminance histogram 341, a total frequency, i.e., a total number of pixels (a total number of pixels in the saturation area is referred to as a saturated pixel number) in a hatched area (saturation area 342) identified by 342 in FIG. 19, where the luminance data are equal to or above the luminance threshold value Pmaxth and equal to or above the frequency threshold value Dth. If the saturated pixel number is equal to or above a specified number, the output level of the image sensor 30 is judged to be saturated (it is judged not to be saturated if the saturated pixel number is below the specified number). The judgment as to whether or not the output level is saturated may be made using only the frequency (pixel number) at the saturation luminance Pmax.

The evaluation value detector 405 detects information including the average luminances, maximum/minimum luminances, luminance histograms or luminance ranges as the AE (AF, WB) evaluation values from the luminance information (image data) in the respective detection blocks of the main subject area and the peripheral subject area by carrying out the divided light measurement as described above. This evaluation value data is outputted via the information receiver 501 to the parameter calculators of the calculating unit 510 corresponding to the various evaluation values such as the AE control parameter calculator 5110 in the case of the AE evaluation values, the AF control parameter calculator 513 in the case of the AF evaluation values, and the WB control parameter calculator 514 in the case of the WB evaluation values, and various control parameters are calculated based on the evaluation values in the respective calculators.

(AE Control Parameter Calculating Step S2)

Next, the AE control by the exposure amount control and the dynamic range control based on the photoelectric conversion characteristic of the image sensor 30 in this embodiment is described in detail below.

Figure 20A:
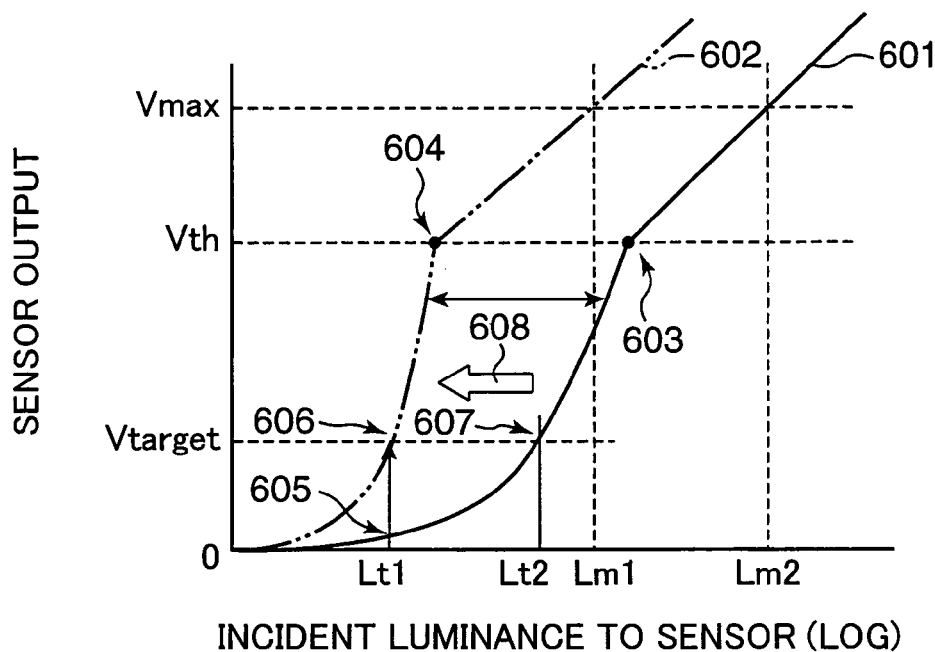
Figure 20B:
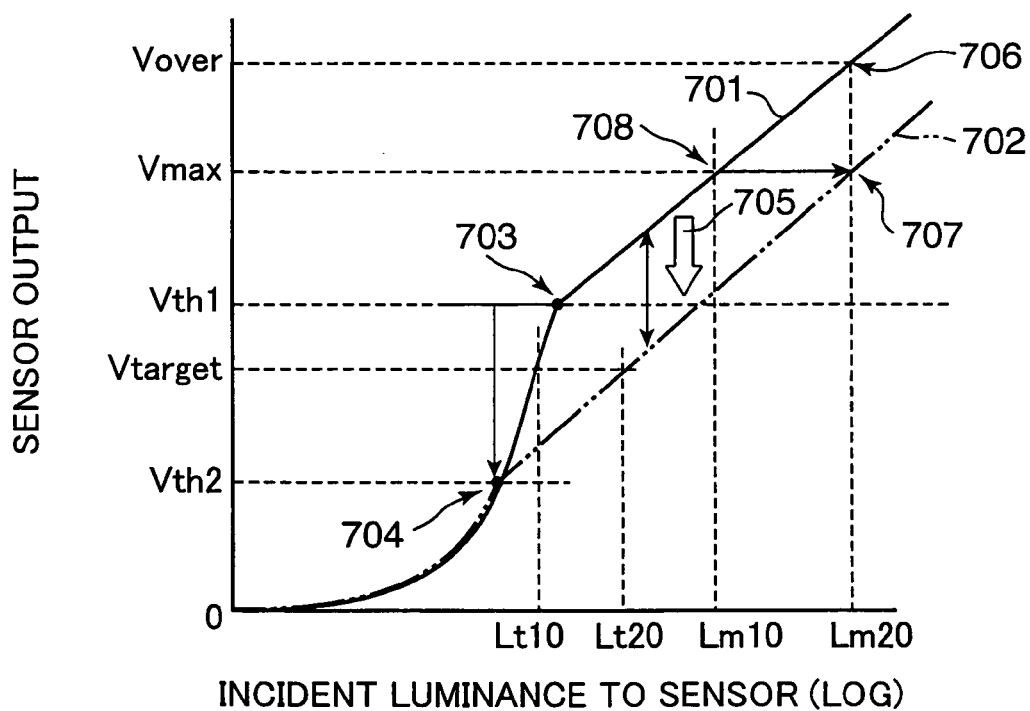

FIGS. 20A and 20B are graphs showing changed states of the photoelectric conversion characteristic of the image sensor 30 in the case of carrying out the AE control, wherein FIG. 20A shows a change in the case of executing the exposure amount control and FIG. 20B shows a change in the case of executing the dynamic range control. In FIGS. 20A, 20B, horizontal axis represents sensor incident luminance and vertical axis represents sensor output, wherein the horizontal axis is a logarithmic axis (logarithmic values of the sensor incident luminances). It should be noted that the sensor incident luminance is the luminance of the subject incident on the image sensor 30 and is referred to merely as luminance hereinafter.

The AE control according to this embodiment is carried out by the exposure amount control in accordance with the photoelectric conversion characteristic and the dynamic range control in accordance with the photoelectric conversion characteristic. Specifically, the AE control is carried out by the following controls (A) and (B).

(A) The exposure amount control by controlling the exposure period in the shutter 23 and/or the image sensor 30, i.e., the opening period of the shutter 23 and/or the integration period of the image sensor 30, and/or the aperture area of the diaphragm 22.

(B) The dynamic range control by controlling the photoelectric conversion characteristic of the image sensor 30 (specifically, controlling the position of the inflection point of the photoelectric conversion characteristic; see FIG. 24).

In Step S2-1: Calculation of the Exposure Amount Control Parameters:

First, the exposure amount control in the case (A) is described with reference to FIG. 20A. A photoelectric conversion characteristic 601 is a photoelectric conversion characteristic of the image sensor 30 saved in the photoelectric conversion characteristic information storage 516 at the time of obtaining the AE evaluation values. The photoelectric conversion characteristic 601 is divided into a linear characteristic area and a logarithmic characteristic area with an inflection point 603 (sensor output at this time is Vth) as a boundary. The exposure amount control parameter calculator 511 calculates an exposure amount control parameter (exposure amount set value) for obtaining an exposure amount which causes this photoelectric conversion characteristic 601 to change to a photoelectric conversion characteristic 602 with which a specified sensor output can be obtained in relation to a specified luminance for setting the exposure amount (exposure amount setting luminance), i.e., the exposure period set value for controlling the exposure period and the aperture set value for controlling the aperture area of the diaphragm. In other words, the exposure amount control parameters are calculated on the basis of the subject luminance for setting the exposure based on the AE evaluation values and the photoelectric conversion characteristic 601 saved in the photoelectric conversion characteristic information storage 516.

Here is calculated such a photoelectric conversion characteristic 602 that a value of the sensor output (sensor output at point 605 in the logarithmic characteristic area) corresponding to a specified luminance Lt1 (corresponding to the exposure amount setting luminance) in the linear characteristic area of the photoelectric conversion characteristic 601 takes Vtarget (sensor output at point 606 in the linear characteristic area). In other words, the photoelectric conversion characteristic 601 is changed (shifted) in a direction of arrow identified by 608 (arrow direction 608) to the photoelectric conversion characteristic 602 passing point 606 (at this time, the inflection point 603 is shifted in parallel to an inflection point 604 and the value of the sensor output Vth does not change). When this is graphically represented, the new photoelectric conversion characteristic 602 is so calculated that the sensor output (point 605) at the luminance lt1 intersecting in the logarithmic characteristic area with the photoelectric conversion characteristic 601 intersects in the linear characteristic area (this intersection is point 606). Vtarget is a target output, which is a certain target of the sensor output, and is a preset value. Vtarget is saved in the exposure amount control parameter calculator 511 or the like.

In this case, there are calculated the exposure period set value and the aperture set value capable of increasing the exposure amount so that the sensor output at luminance Lt1 increases from the one at point 605 of the photoelectric conversion characteristic 601 to the sensor output (Vtarget) at point 606 of the photoelectric conversion characteristic 602, i.e., the sensor output corresponding to the same luminance increases. Seen differently, the exposure amount control parameter calculator 511 calculates such exposure period set value and aperture set value that the luminance corresponding to Vtarget changes from Lt2 (luminance at point 607) to Lt1, i.e., Lt1 lower than Lt2 is sufficient to obtain the sensor output at Vtarget. At this time, a control is carried out based on the exposure period set value and the aperture set value, such that the opening period of the shutter 23 or the integration period of the image sensor 30 is increased, and the aperture area of the diaphragm 22 is increased.

In the case of changing from the photoelectric conversion characteristic 601 to the photoelectric conversion characteristic 602, luminance at Vmax changes (decreases) from Lm2 to Lm1 and the dynamic range is reduced. Vmax is a maximum value of the sensor output of the image sensor 30, i.e., a saturated output level. However, Vmax may be a saturated output level as a physically maximum output level or an arbitrarily set saturated output level (e.g., as an output level slightly lower than the physically maximum output level).

Although the photoelectric conversion characteristic is changed in the arrow direction 608 in order to obtain Vtarget in relation to the exposure amount setting luminance (Lt1) in the case of FIG. 20A, it may be changed (shifted) in a direction (rightward direction) opposite from the arrow direction 608. The photoelectric conversion characteristic is not changed (shifted) if Vtarget can be already obtained in relation to the exposure amount setting luminance as described above with the photoelectric conversion characteristic at the time of obtaining the AE evaluation values. However, in such a case, even if the exposure period set value and the aperture set value take the same values as those when the AE evaluation values were obtained last time, the exposure period set value and the aperture set value may be calculated this time.

In Step S2-2: Calculation of Dynamic range Control Parameter:

Next, the dynamic range control in the case (B) is described with reference to FIG. 20B. A photoelectric conversion characteristic 701 is a photoelectric conversion characteristic of the image sensor 30 saved in the photoelectric conversion characteristic information storage 516 at the time of obtaining the AE evaluation values. The photoelectric conversion characteristic 701 is divided into a linear characteristic area and a logarithmic characteristic area with an inflection point 703 (sensor output at this time is Vth1) as a boundary. The dynamic range control parameter (photoelectric conversion characteristic set value) is calculated as such a control value for the photoelectric conversion characteristic that the photoelectric conversion characteristic 701 changes to a photoelectric conversion characteristic 702 with which a specified sensor output can be obtained in relation to a specified luminance for setting the dynamic range (dynamic range setting luminance), specifically as a set value concerning the position of an inflection point (inflection point 704) of the photoelectric conversion characteristic (702) after the change. This photoelectric conversion characteristic set value is calculated by the dynamic range control parameter calculator 512.

Here, luminance Lm20 set as a maximum luminance in the dynamic range is assumed to be the dynamic range setting luminance, and the photoelectric conversion characteristic 702 is calculated such that a value of the sensor output corresponding to the luminance Lm20 takes Vmax as a saturated output level of the image sensor 30 (similar to Vmax shown in FIG. 20A). In other words, the photoelectric conversion characteristic 701 is changed in a direction of arrow identified by 705 (arrow direction 705) to the photoelectric conversion characteristic 702 passing the point 704. At this time, the inflection point 703 is shifted to the inflection point 704, and the sensor output at the inflection point is also changed from Vth1 to Vth2.

In this case, there is calculated such a photoelectric conversion characteristic set value that the sensor output at luminance Lm20 decreases from a sensor output at point 706 (Vover: sensor output value exceeding Vmax) to a sensor output at point 707 (Vmax). Seen differently, the dynamic range control parameter calculator 512 calculates such a photoelectric conversion characteristic set value that a maximum luminance capable of obtaining the sensor output Vmax increases from Lm10 (luminance at point 708.) to Lm20 (to widen the dynamic range).

In the case of changing from the photoelectric conversion characteristic 701 to the photoelectric conversion characteristic 702, luminance at Vtarget changes (increases) from Lt10 to Lt20 and the exposure amount decreases. Vtarget shown in FIG. 20B is set to describe a change of the exposure amount and may differ from Vtarget shown in FIG. 20A.

Although the photoelectric conversion characteristic is shifted in the arrow direction 705 in order to obtain Vmax in relation to the dynamic range setting luminance (Lm20) in FIG. 20B, it may be shifted in a direction (upward direction) opposite from the arrow direction 705. The photoelectric conversion characteristic is not changed (shifted) if Vmax can be obtained in relation to the dynamic range setting luminance as described above with the photoelectric conversion characteristic at the time of obtaining the AE evaluation values. However, in such a case, even if the exposure period set value and the aperture set value take the same values as those when the AE evaluation values were obtained last time, the exposure period set value and the aperture set value may be calculated this time.

By the AE control comprised of the exposure amount control in (A) and the dynamic range control in (B), shooting can be performed such that the exposure amount setting luminance is located in the linear characteristic area of the photoelectric conversion characteristic, the sensor output is of the specified level, and the sensor output at the dynamic range setting luminance (here, maximum luminance of the subject; maximum luminance in the dynamic range) is equal to or below the saturated sensor output level.

(Detailed Description of the Method for Calculating the Exposure Amount Control Parameters)

Here, the calculation of the exposure amount control parameters (exposure period set value and aperture set value) by the exposure amount control parameter calculator 511 based on the AE evaluation values detected by the evaluation value detector 405 in the case of the exposure amount control of FIG. 20A is more specifically described.

Figure 21:
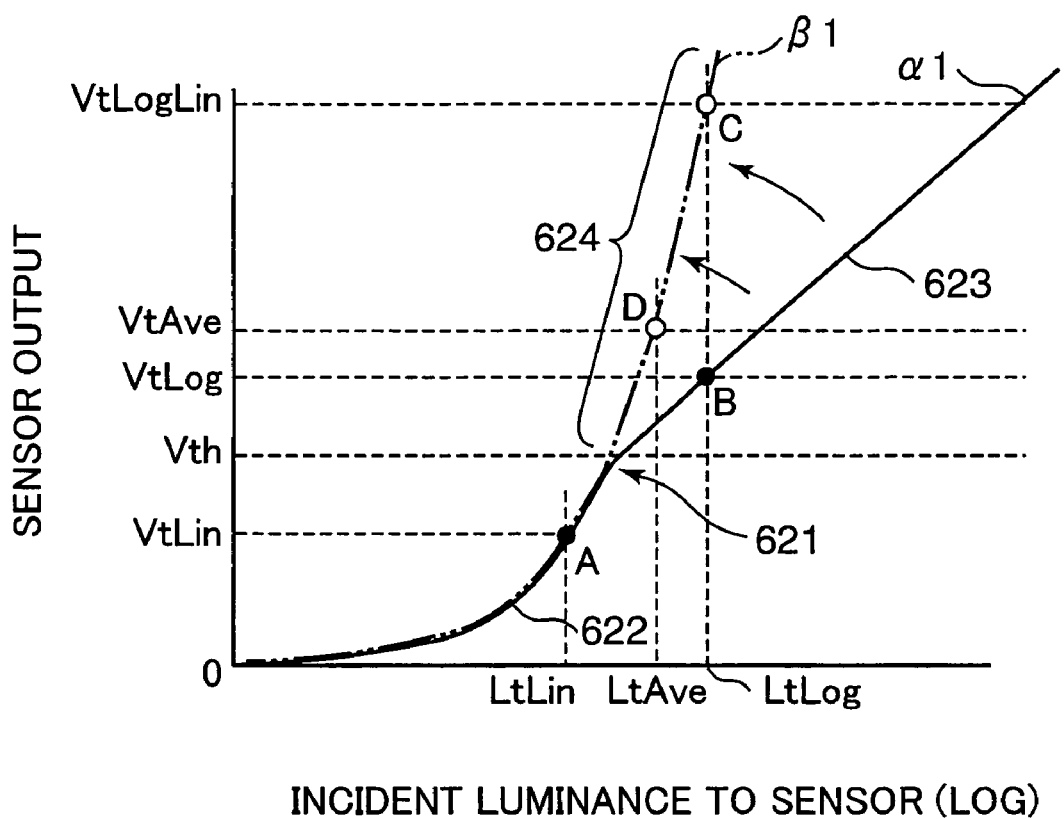
FIG. 21 is a graph showing a linear conversion process upon calculating exposure amount control parameters.

FIG. 21 is a graph showing such an exemplary calculating method that a value of the sensor output at luminance Lt1 (exposure amount setting luminance) in FIG. 20A takes Vtarget. A photoelectric conversion characteristic α1 in FIG. 21 is a photoelectric conversion characteristic at the time of obtaining the AE evaluation values and is divided into a linear characteristic area 622 and a logarithmic characteristic area 623 with an inflection point 621 (corresponding sensor output is Vth) as a boundary. A photoelectric conversion characteristic β1 is a photoelectric conversion characteristic obtained by converting the logarithmic characteristic area 623 of the photoelectric conversion characteristic α1 into a linear characteristic (linear characteristic area 624), i.e., a photoelectric conversion characteristic whose characteristic area is entirely the linear characteristic area.

LtLin at point A shown in FIG. 20 is an average luminance (linear characteristic area average luminance) in the linear characteristic area 622 of the photoelectric conversion characteristic α1, and a sensor output corresponding to this luminance LtLin is VtLin. LtLog at point B is an average luminance (logarithmic characteristic area average luminance) in the logarithmic characteristic area 623 of the photoelectric conversion characteristic α1 and a sensor output corresponding to this luminance LtLog is VtLog. Data conversion is performed such that point B corresponding to LtLog in the logarithmic characteristic area 623 of the photoelectric conversion characteristic α1 is shifted to point C in the linear characteristic area 624, i.e., a value (VtLog) of the sensor output corresponding to LtLog in the logarithmic characteristic area 623 takes a value (VtLogLin) in the linear characteristic area 624 (whereby the respective data in the photoelectric conversion characteristic α1 can be handled while being standardized into data in the linear characteristic area). The data conversion from the logarithmic characteristic area 623 (photoelectric conversion characteristic α1) to the linear characteristic area 624 (photoelectric conversion characteristic β1) is performed using the LUT saved in the LUT storage 518. A sensor output VtAve at point D is calculated from VtLin at point A and VtLogLin at point C by the following equation. Luminance LtAve corresponding to VtAve corresponds to Lt1 as the exposure amount setting luminance shown in FIG. 20A.

$$VtAve=(VtLin*k1)+(VtLogLin*(1-k1))$$

where $k1=m/(m+n)$, m: total number of pixels used upon calculating luminance LtLin at point A, n: total number of pixels used upon calculating luminance LtLog at point B.

In this way, values VtLin and VtLogLin are calculated from values LtLin and LtLog, and VtAve is calculated from the values VtLin and VtLogLin.

Figure 22:
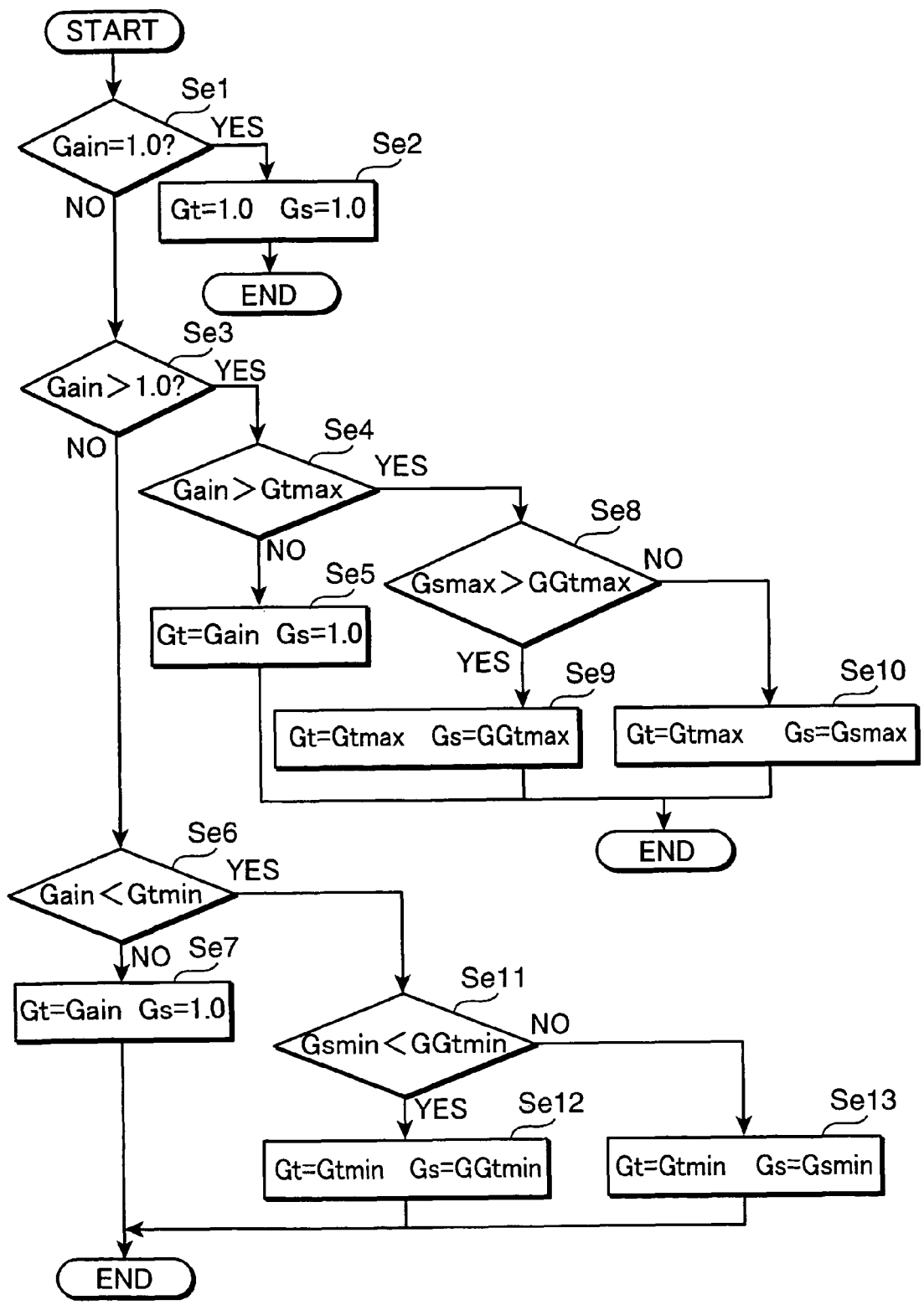
FIG. 22 is a flowchart showing one exemplary flow of calculating the exposure amount control parameters.

Next, such an amplification factor Gain of the exposure amount that VtAve becomes Vtarget shown in FIG. 20A, an amplification factor Gt of the exposure period and an amplification factor Gs of the aperture value based on the amplification factor Gain of the exposure amount, and an exposure period T2 and an aperture area S2 of the diaphragm 22 based on the amplification factors Gt, Gs are calculated by the following equations.

$$Gain=Vtarget/VtAve$$

$$Gt*Gs=Gain$$

where the calculation of the values Gt, Gs using the respective equations is determined by the case division by a flowchart shown in FIG. 22.

<Equations for Calculating the Amplification Factors of the Exposure Period>

$Tmax/T1=Gtmax$ (maximum amplification factor of the exposure period)

$Tmin/T1=Gtmin$ (minimum amplification factor of the exposure period)

$Gain/Gtmax=GGtmax$ (amplification factor for compensating for insufficiency at the maximum amplification factor)

$Gain/Gtmin=GGtmin$ (amplification factor for compensating for insufficiency at the minimum amplification factor)

$T2=T1*Gt$ where T1: exposure period at the time of detecting the AE evaluation values T2: exposure period after the AE correction Tmax: maximum exposure period of the image sensor 30

Tmin: minimum exposure period of the image sensor 30

<Equations for Calculating the Amplification Factors of the Aperture Value>

$Smax/S1=Gsmax$ (maximum amplification factor of the aperture value)

$Smin/S1=Gsmin$ (minimum amplification factor of the aperture value)

$Gain/Gsmax=GGsmax$ (amplification factor for compensating for insufficiency at the maximum amplification factor)

$Gain/Gsmin=GGsmin$ (amplification factor for compensating for insufficiency at the minimum amplification factor)

$S2=S1*Gs$ where S1: aperture area of the diaphragm at the time of detecting the AE evaluation values S2: aperture area of the diaphragm after the AE correction Smax: maximum aperture ratio of the diaphragm 22

Smin: minimum aperture ratio of the diaphragm 22

As shown in the flowchart of FIG. 22, if VtAve=Vtarget, i.e., the amplification factor Gain of the exposure amount=1.0 and it is not necessary to execute the exposure amount control (to change the exposure amount control parameters) (YES in Step Se1), the amplification factor Gt of the exposure period and the amplification factor Gs of the aperture value are both set at 1.0 (Step Se2), and neither the exposure period nor the aperture area of the diaphragm 22 is changed. If Gain≠1.0 (NO in Step Se1), Gain>1.0 (YES in Step Se3) and Gain≦Gtmax (NO in Step Se4), i.e., if Gain>1.0, the exposure amount control is necessary and the amplification factor Gain of the exposure amount can be dealt with by the amplification factor Gt of the exposure period (amplification factor Gt equal to or below the maximum amplification factor Gtmax), Gt=Gain and Gs=1.0 (Step Se5).

If Gain≦1.0 in Step S13 (NO in Step Se3) and Gain≧Gtmin (NO in Step Se6), the exposure amount control is necessary since Gain≦1.0 similar to the case of Step Se5, and the amplification factor Gain of the exposure amount can be dealt with by the amplification factor Gt of the exposure period (amplification factor Gt equal to or above the minimum amplification factor Gtmin). Thus, Gt=Gain and Gs=1.0 (Step Se7).

If Gain>Gtmax in step S14 (Yes in Step Se4) and Gsmax>GGtmax (YES in Step Se8), Gt=Gtmax and Gs=GGtmax (Step Se9). In Step Se9, the amplification factor Gain of the exposure amount takes a value larger than the maximum amplification factor Gtmax of the exposure period, and cannot be dealt with only by the amplification factor Gt of the exposure period without changing the amplification factor Gs of the aperture value (Gs=1.0). Thus, an insufficiency of Gt with respect to Gain is dealt with (compensated) by changing the amplification factor Gs of the aperture value. The amplification factor GGtmax for compensating for insufficiency at the maximum amplification factor Gtmax of the exposure period is used as the value of the amplification factor Gs of the aperture value. Since the amplification factor GGtmax takes a value smaller than the maximum amplification factor Gsmax of the aperture value (without needing the use of the amplification factor Gsmax of the aperture value), the amplification factor GGtmax concerning the exposure period is used. Thus, time to calculate a value (amplification factor) for controlling the diaphragm 22 using the equations for calculating the amplification factors concerning the diaphragm can be saved.

If Gain<Gtmin in Step Se6 (YES in Step Se6) and Gsmin<GGtmin (YES in Step Se11), Gt=Gtmin and Gs=GGtmin (Step Se12). In this case, similar to Step Se9, the amplification factor Gain of the exposure amount takes a value smaller than the minimum amplification factor Gtmin of the exposure period and cannot be dealt with only by the amplification factor Gt of the exposure period without changing the amplification factor Gs of the aperture value (Gs=1.0). Thus, insufficiency of Gt with respect to Gain is dealt with by changing the amplification factor Gs of the aperture value. The amplification factor GGtmin for compensating for insufficiency at the minimum amplification factor Gtmin of the exposure period is used as the value of the amplification factor Gs of the aperture value. Since the amplification factor GGtmin takes a value smaller than the minimum amplification factor Gsmin of the aperture value (without needing the use of the amplification factor Gsmin of the aperture value), the amplification factor GGtmin concerning the exposure period is used. In this case as well, time to calculate a value (amplification factor) for controlling the diaphragm using the equations for calculating the amplification factors concerning the diaphragm can be saved.

If Gsmax≦GGtmax in Step Se8 (NO in Step Se8), Gt=Gtmax and Gs=Gsmax (Step Se10). If Gsmin≧GGtmin in Step Se11 (NO in Step Se11), Gt=Gtmin and Gs=Gsmin (Step Se13). In Step Se10, if the amplification factor GGtmax takes a value equal to or above the maximum amplification factor Gsmax of the aperture value, the maximum amplification factor Gsmax is used as the value of the amplification factor Gs of the aperture value. Likewise, in Step Se13, if the amplification factor GGtmin takes a value equal to or below the maximum amplification factor Gsmin of the aperture value, the minimum Gsmin is used as the value of the amplification factor Gs of the aperture value.

In this embodiment, as shown in the flowchart of FIG. 22, the amplification factor Gt of the exposure period is prioritized (exposure period control is prioritized) upon selecting the control parameter for obtaining the amplification factor Gain of the exposure amount. However, the amplification factor Gs of the aperture value may be prioritized (aperture value control may be prioritized). Further, although the amplification factors Gt and Gs are calculated for one exposure amount setting luminance (Lt1) in this embodiment, a similar calculation may be made for two or more exposure amount setting luminances. In such a case, an average value or a maximum value or a minimum value of the calculated amplification factors (Gt, Gs) may be used for the respective luminances.

In this way, the amplification factors Gt, Gs are calculated, and the exposure period T2 after the AE correction and the aperture area S2 of the diaphragm 22 after the AE correction are calculated based thereon. Then, the set value for the image sensor 30 and the shutter 23 (exposure period set value) or the set value for the diaphragm 22 (aperture set value) corresponding to these values T2 and S2 are calculated by the data conversion using the corresponding LUTs. The exposure period set value and the aperture set value obtained by the data conversion are saved in the photoelectric conversion characteristic information storage 516 (or the exposure period set value and the aperture set value obtained when the AE evaluation values were obtained last time may be renewed by the newly obtained set values. This applies also to the photoelectric conversion characteristic set values described below).

It should be noted that, based on the exposure period set value and the aperture set value calculated in the exposure amount control parameter calculator 511, the shutter control signal generator 523 and the diaphragm control signal generator 525 generate such control signals to be sent to the shutter driver 61 and the diaphragm driver 63 that the exposure period (integration period) by the image sensor 30 and the shutter 23 becomes T2 or the aperture area of the diaphragm 22 becomes S2.

Next, specific methods for calculating the sensor output level VtLin corresponding to the linear characteristic area average luminance LtLin and the sensor output level LtVog corresponding to the logarithmic characteristic area average luminance LtLog shown in FIG. 21 are described. First, the methods for calculating the sensor output level VtLin corresponding to the linear characteristic area average luminance LtLin and the logarithmic characteristic area average luminance LtLog are described. An average luminance (hereinafter, "block linear average luminance") in the linear characteristic area for each detection block (each of A to AJ blocks) in the main subject area 331 shown in FIG. 17 is calculated based on the luminance information of the subject detected by each detection block. This block linear average luminance is calculated using average values of the linear characteristic areas of the three colors R, G and B (hereinafter, "color linear average values). Specifically, color linear average values of R obtained from the A to AJ blocks are calculated as AveRA, AveRB, . . . , AveRAJ. Likewise, color linear average values of G and those of B are calculated as AveGA, AveGB, . . . , AveGAJ and AveBA, AveBB, . . . , AveBAJ, respectively. The block linear average luminance for each of the A to AJ blocks is calculated by an equation for the following color space conversion using the color linear average values of the respective colors R, G and B. For example, if AveYA denotes the block linear average luminance corresponding to the A block, AveYA can be obtained by the following equation.

$$AveYA = AveRA*K1 + AveGA*K2 + AveBA*K3$$

where K1, K2, K3 are coefficients used for the color space conversion from RGB to YCbCr and, for example, K1=0.2989, K2=0.5866 and K3=0.1145.

Similar calculations are made for the other B to AJ blocks, thereby calculating the block linear average luminances AveYA, AveYB, AveYAJ for the respective A to AJ blocks. Further, an average of these block linear average luminances AveYA, AveYB, . . . , AveYAJ is calculated. If MainY denotes this average value, MainY is the sensor output level VtLin corresponding to the linear characteristic area average luminance LtLin.

The sensor output level VtLog corresponding to the logarithmic characteristic area average luminance LtLog is calculated similar to the case of VtLin. Specifically, an average luminance in the logarithmic characteristic area of each detection block (hereinafter, "block logarithmic average luminance") is calculated based on the luminance information of the subject detected by the A to AJ blocks in the main subject area 331 shown in FIG. 17. This block logarithmic average luminance is calculated using average values of the logarithmic characteristic areas of the three colors R, G and B (hereinafter, "color logarithmic average values"). The color logarithmic average values of R obtained from the A to AJ blocks are calculated as AveRLogA, AveRLogB, ..., AveRLogAJ. Likewise, the color logarithmic average values of G and B are calculated as AveGLogA, AveGLogB, ..., AveGLogAJ and as AveBLogA, AveBLogB, ..., AveBLogAJ, respectively.

The color logarithmic average values of the respective colors R, G, and B in the logarithmic characteristic area are temporarily converted into linear data taking values in the linear characteristic area using the LUT saved in the LUT storage 518, and the block logarithmic average luminances AveYLogA, AveYLogB, AveYLogAJ of the A to AJ blocks are similarly calculated in accordance with the color space converting equations using the values converted into the linear data. Further, an average value of the block logarithmic average luminances AveYLogA, AveYLogB, ..., AveYLogAJ is calculated. If MainYLog denotes this average value, MainYLog is the sensor output level VtLogLin corresponding to the logarithmic characteristic area average luminance LtLog. The color linear average values (color logarithmic average values) of the respective colors in the A to AJ blocks may be calculated by calculating luminance histograms in the linear characteristic areas (logarithmic characteristic areas) of the respective A to AJ blocks, applying "Gaussian pruning" to the luminance histograms and averaging the respective luminance values after Gaussian pruning.

The specific method for calculating the amplification factor Gain (exposure amount control parameter) described with reference to FIGS. 21 and 22 may be as follows. First, a maximum value of the luminances of each color R, G, B in each of the A to AJ blocks of the main subject area 331 (hereinafter, "color maximum value") is calculated. Specifically, maximum values of R are calculated as MaxRA, MaxRB, ..., MaxRAJ. Likewise, maximum values of G and those of B are calculated as MaxGA, MaxGB, ..., MaxGAJ and as MaxBA, MaxBB, ..., MaxBAJ, respectively. Block maximum luminances of the respective A to AJ blocks are calculated by an equation for the following color space conversion, using the maximum values of the luminances of the respective colors. For example, if MaxYA denotes the block maximum luminance corresponding to the A block, it can be calculated by the following equation.

$$MaxYA = MaxRA*K1 + MaxGA*K2 + MaxBA*K3$$

where K1, K2, K3 are respectively 0.2989, 0.5866, 0.1145 similar to the above.

Similar calculations are made for the other B to AJ blocks, thereby calculating the block maximum luminances MaxYA, MaxYB, MaxYAJ of the respective A to AJ blocks. Further, a maximum value (maximum luminance value in the main subject area 331) of these block maximum luminances MaxYA, MaxYB, ..., MaxYAJ is calculated. If MaxY denotes this maximum luminance value, MaxY is a sensor output level VtAve2 corresponding to luminance Ltmax shown in FIG. 23.

Similarly, minimum values of the luminances of the respective colors R, G and B in the respective A to AJ blocks (color minimum values) are calculated as MinRA, MinRB, ..., MinRAJ, as MinGA, MinGB, ..., MinGAJ and as MinBA, MinBB, ..., MinBAJ. Block minimum luminances MinYA, MinYB, ..., MinYAJ of the respective A to AJ blocks are calculated by a similar equation for the color space conversion, using these minimum values. Further, a minimum value (minimum luminance value in the main subject area 331) of these block minimum luminances MinYA, MinYB, ..., MinYAJ is calculated. If MinY denotes this minimum luminance value, MinY is a sensor output level VtAve1 corresponding to luminance Ltmin shown in FIG. 23.

It should be noted that the color space conversion is performed after the color maximum values and color minimum values located in the logarithmic characteristic area are similarly converted into values in the linear characteristic area using the LUT. The color maximum values and the color minimum values of the respective colors in the A to AJ blocks may be calculated as follows. Luminance histograms for the respective A to AJ blocks are first calculated and then Gaussian pruning is applied thereto. The color maximum and minimum values are calculated from the respective luminance values after Gaussian pruning.

Figure 23:
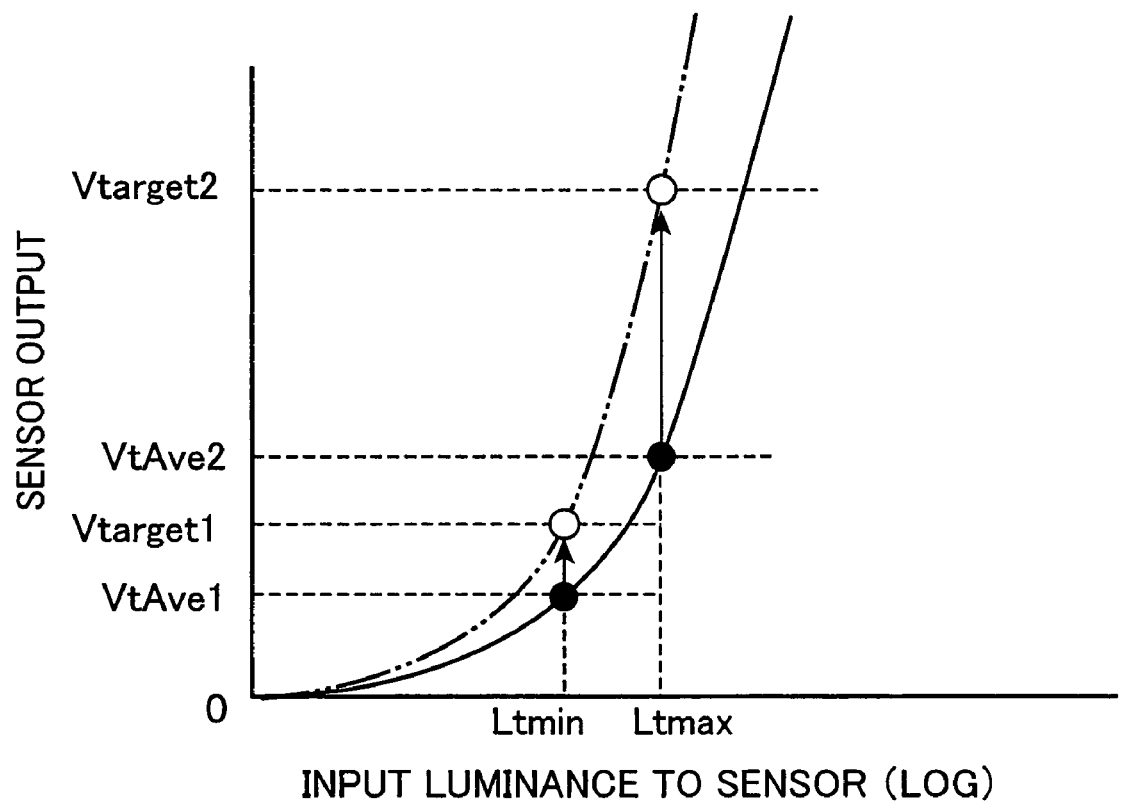
FIG. 23 is a graph showing a process upon calculating the exposure amount control parameters.

Then, as shown in FIG. 23, there are calculated such an amplification factor (Vtarget1/VtAve1: first amplification factor) that the sensor output value VtAve1 corresponding to luminance Ltmin becomes Vtarget1 which is a preset target output value, and such an amplification factor (Vtarget2/VtAve2: second amplification factor) that the sensor output value VtAve2 corresponding to luminance Ltmax becomes Vtarget2 which is a preset target output value. A smaller one of these two amplification factors is selected, and the case division as shown in FIG. 22 is carried out using the selected amplification factor as the amplification factor Gain of the exposure amount, thereby calculating the amplification factor Gt of the exposure period and the amplification factor Gs of the aperture value.

A larger one of the first and second amplification factors may be selected or only the first or second amplification factor may be calculated and used instead of selecting one of the first and second amplification factors after comparison. Alternatively, an average of the first and second amplification factors may be used. The above values Vtarget1 and Vtarget2 are saved in the exposure amount control parameter calculator 511 or the like.

The minimum and maximum luminance values MinY, MaxY may be calculated from a whole luminance histogram of the entire A to AJ blocks which is a sum of the luminance histograms of the A to AJ blocks. In this case, a luminance range of the whole luminance histogram is calculated by similarly applying "Gaussian pruning", and the minimum and maximum luminance values MinY and MaxY are calculated from this luminance range. At the time of calculation, one of the minimum and maximum luminance values may be calculated from the other value and the luminance range. For example, minimum luminance value MinY=maximum luminance value MaxY−luminance range or maximum luminance value MaxY=minimum luminance value MinY+luminance range.

(Detailed Description of the Method for Calculating the Dynamic Range Control Parameter)

Next, the calculation of the dynamic range control parameter (photoelectric conversion characteristic set value) by the dynamic range control parameter calculator 512 based on the AE evaluation values detected by the evaluation value detector 405 in the case of the exposure amount control of FIG. 20B is specifically described.

Figure 24A:
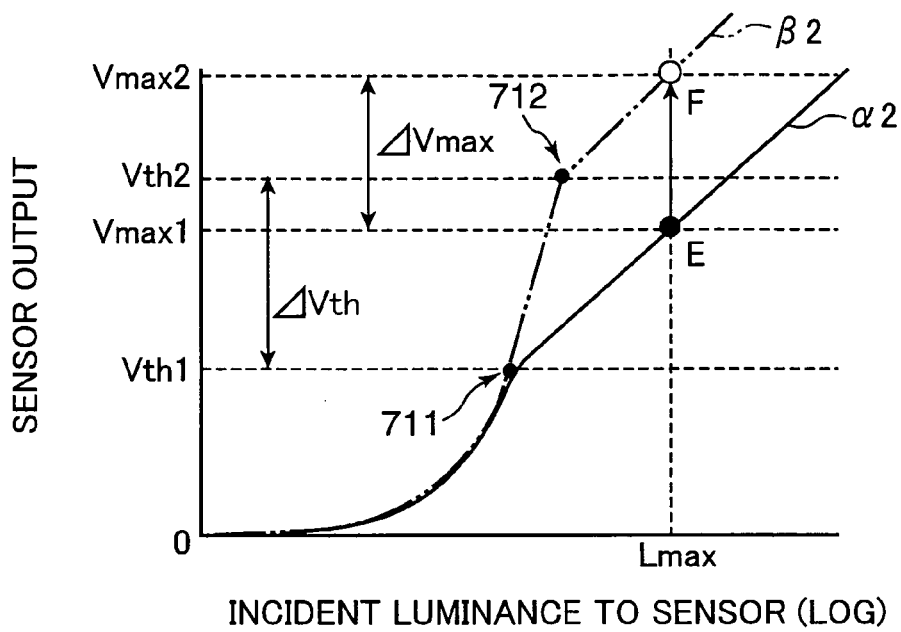
Figure 24B:
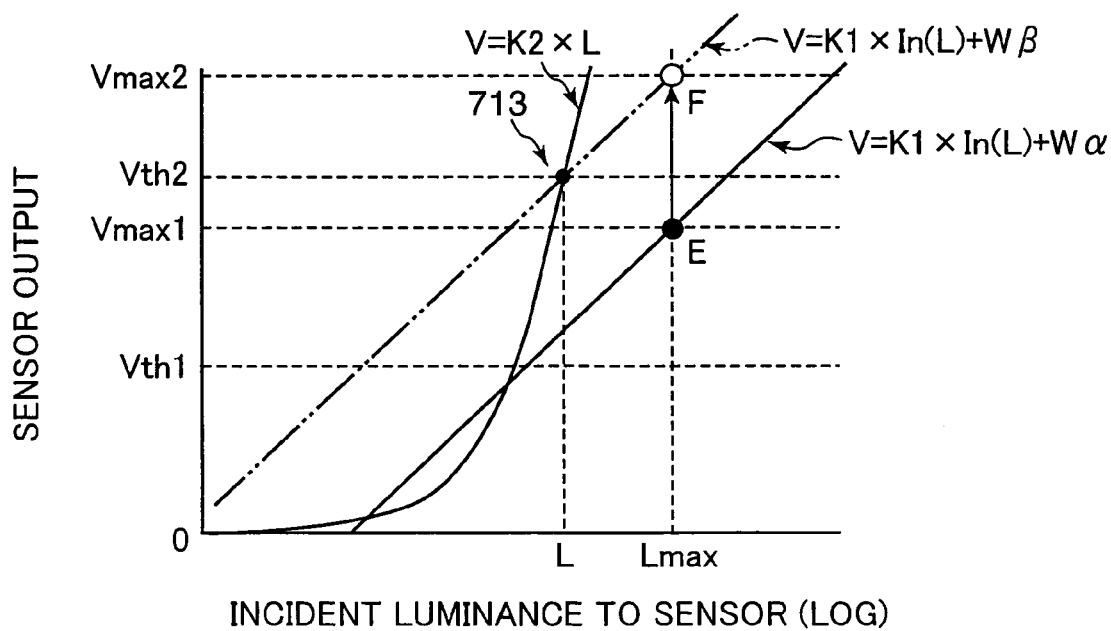

FIGS. 24A and 24B are graphs showing a method for calculating the position of an inflection point of a photoelectric conversion characteristic after a change, wherein FIG. 24A shows a case where the photoelectric conversion characteristic is so changed as to have a specified sensor output in relation to luminance Lmax and FIG. 24B shows a case where the photoelectric conversion characteristic is modeled. First, in FIG. 24A, luminance Lmax is a dynamic range setting luminance and corresponds, for example, to Lm20 shown in FIG. 20B. A photoelectric conversion characteristic a2 is a photoelectric conversion characteristic before the change having an inflection point 711, whereas a photoelectric conversion characteristic β2 is a photoelectric conversion characteristic after the change having an inflection point 712. Vmax2 denotes a saturated output level (maximum output level) of the image sensor 30. The photoelectric conversion characteristic is changed such that a value of the sensor output corresponding to luminance Lmax shifts from Vmax1 at point E on the photoelectric conversion characteristic α2 to Vmax2 at point F on the photoelectric conversion characteristic β2. In this case, the photoelectric conversion characteristic α2 changes to a state of the photoelectric conversion characteristic β2 in accordance with a changed amount ΔVth between a sensor output Vth1 at the inflection point 711 and a sensor output Vth2 at the inflection point 712.

Vth2 is calculated from a sensor output ΔVmax (=Vmax2−Vmax1) between the points E and F. This is described below. As shown in FIG. 24B, if the linear characteristic areas and logarithmic characteristic areas of the photoelectric conversion characteristics α2, β2 are respectively modeled (represented by graphs), they can be expressed by functions (mathematical equations) as follows.

Function modeling the linear characteristic area:

$V=K2*L$ (common for the photoelectric conversion characteristics α2, β2)

Function modeling the logarithmic characteristic area:

$V=K1*ln(L)+W\beta$ (photoelectric conversion characteristic α2)

$V=K1*ln(L)+W1$ (photoelectric conversion characteristic β2)

where K1, K2 denote constants; L an sensor incident luminance (coordinate on horizontal axis in FIG. 24); and Wα and Wβ intercepts.

Here, since ΔVmax is expressed by ΔVmax=Wβ−Wa, the above equation $V=K1*ln(L)+W\beta$ is expressed by $V=K1*ln(L)+Wa+\Delta Vmax$. Vth2 is a sensor output value at an intersection 713 of this equation and the equation $V=K2*L$. Accordingly, the sensor output Vth2 corresponding to luminance L can be calculated by calculating the value of "L" satisfying the simultaneous equations of these two equations, $K1*ln(L)+Wa+\Delta Vmax=K2*L$ for calculating the intersection 713 (coordinates), i.e., by calculating the luminance L shown in FIG. 24B. If the calculated output level Vth2 is larger than the saturated output level Vmax2, the image sensor 30 possesses such a photoelectric conversion characteristic having only the linear characteristic area without having the logarithmic characteristic area.

Then, a set value for the image sensor 30 corresponding to the thus calculated Vth2, i.e., a set value (photoelectric conversion characteristic set value) for changing the photoelectric conversion characteristic such that the inflection point of the photoelectric conversion characteristic comes to be located at the position of Vth2 is calculated by the data conversion of the inflection point Vth2 using the LUT. The photoelectric conversion characteristic set value corresponding to the inflection point Vth2 obtained by the data conversion is saved in the photoelectric conversion characteristic information storage 516. Based on the photoelectric conversion characteristic set value calculated in the dynamic range control parameter calculator 512, the dynamic range control signal generator 521 generates such a control signal to be sent to the timing generating circuit 31 that the photoelectric conversion characteristic (position of the inflection point) of the image sensor 30 changes as above.

A specific method for calculating the sensor output level Vmax1 corresponding to the luminance Lmax as a dynamic range setting luminance shown in FIG. 24 is as follows. First, similar to the calculation of the sensor output level VtLog corresponding to the logarithmic characteristic area average luminance LtLog in FIG. 21, the logarithmic characteristic area average luminance in the main subject area 331 (A to AJ blocks) shown in FIG. 17 is calculated, and a logarithmic characteristic area average luminance in the peripheral subject area 332 (first to sixteenth blocks) is calculated as in the case of the main subject area 331. A larger one of the logarithmic characteristic area average luminances calculated in the main subject area 331 and in the peripheral subject area 332 is selected by a comparison, and a sensor output level corresponding to the selected logarithmic characteristic area average luminance is set as Vmax1.

Not only the sensor outputs corresponding to the logarithmic characteristic area average luminances in the main and peripheral subject areas 331, 332, but also those corresponding to the linear characteristic area average luminances similar to the linear characteristic area average luminance LtLin in FIG. 21 may also be calculated; a whole characteristic area average luminance averaging the linear characteristic area average luminance and the logarithmic characteristic area average luminance may be calculated for each of the main subject area 331 and the peripheral subject area 332; and a larger one of the whole characteristic area average luminances of the respective areas may be set as the sensor output corresponding to luminance Lmax. If these whole characteristic area average luminances are equal to each other, either luminance value may be set as the sensor output corresponding to the luminance Lmax (and so forth).

Alternatively, the sensor output corresponding to the luminance Lmax may be obtained from the logarithmic characteristic area average luminance (or whole characteristic area average luminance as a sum of the logarithmic characteristic area average luminance and the linear characteristic area average luminance) only in the main subject area 331, or the sensor output corresponding to the luminance Lmax may be obtained from the logarithmic characteristic area average luminance (or whole characteristic area average luminance as a sum of the logarithmic characteristic area average luminance and the linear characteristic area average luminance) only in the peripheral subject area 332.

The specific method for calculating the sensor output corresponding to the luminance Lmax may be as follows. First, similar to the calculation of the sensor output value corresponding to the maximum luminance value Ltmax (MaxY) in FIG. 23, the maximum luminance value in the main subject area 331 is calculated and the maximum luminance value in the peripheral subject area 332 is calculated similar to the case of the main subject area 331. A larger one of the maximum luminance values calculated in the main subject area 331 and the peripheral subject area 332 is selected by a comparison; a sensor output level corresponding to the selected maximum luminance value is calculated; and luminance corresponding to this output level is set as the luminance Lmax. The sensor output corresponding to the luminance Lmax may be obtained from the maximum luminance value only in the main subject area 331, or it may be obtained from the maximum luminance value only in the peripheral subject area 332.

Figure 25A:
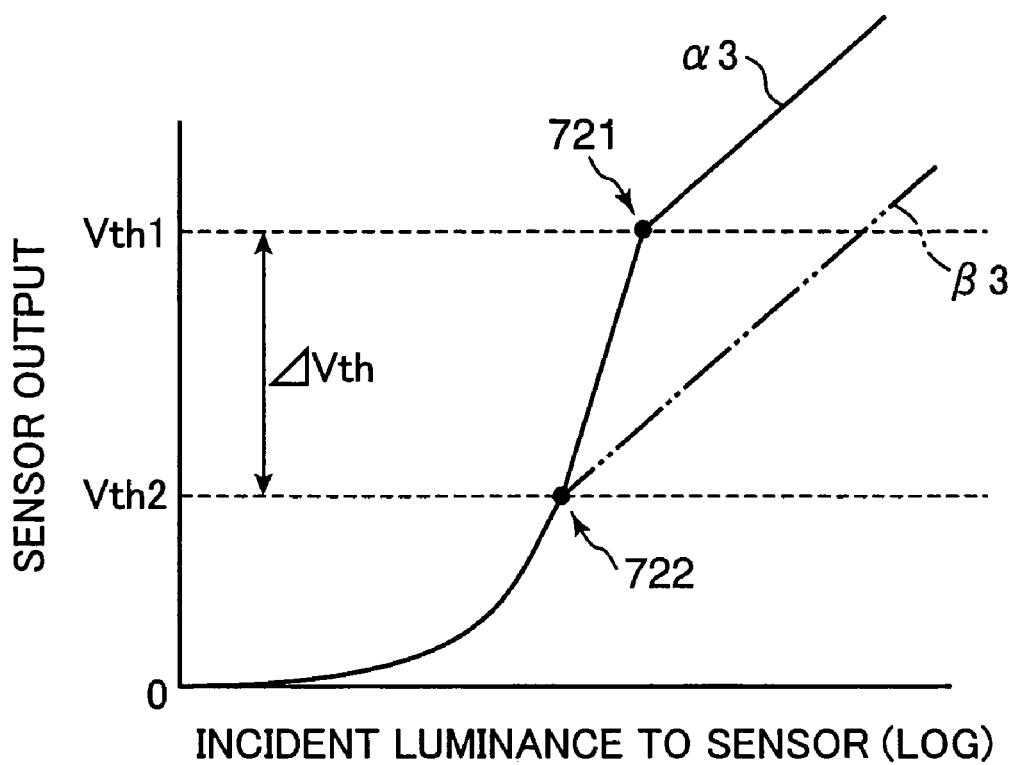
FIGS. 25A and 25B are graphs showing a process upon calculating the dynamic range control parameter.
Figure 25B:
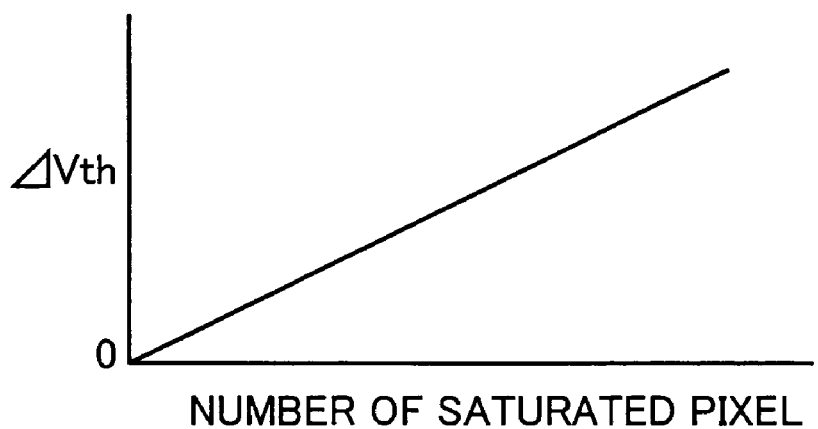

The control of the photoelectric conversion characteristic (position of the inflection point) based on the photoelectric conversion characteristic set value as shown in FIGS. 24A and 24B is actually carried out if the saturation judging section 4055 (see FIG. 16) judges that the output level of the image sensor 30 is not saturated as described with reference to FIG. 19. If the output level is judged to be saturated, the photoelectric conversion characteristic is changed in accordance with the number of saturated pixels such that the output level at the inflection point is reduced by ΔVth as shown in FIG. 25A, i.e., the dynamic range is widened to enable the shooting by the image sensor 30 at a high-luminance side. Here, the photoelectric conversion characteristic is changed from a photoelectric conversion characteristic α3 to a photoelectric conversion characteristic β3. The value of ΔVth is so set as to increase as the number of saturated pixels increases as shown in FIG. 25B, and ΔVth corresponding to the number of saturated pixels is calculated by the data conversion by means of an LUT. Then, an output level Vth2 at the inflection point 722 of the photoelectric conversion characteristic β3 after the change (characteristic having a wider dynamic range as compared to the photoelectric conversion characteristic α3) can be obtained by subtracting the calculated ΔVth from the output level Vth1 at the inflection point 721 of the photoelectric conversion characteristic α3 at the time of calculating the AE evaluation values. A set value (photoelectric conversion characteristic set value) for the image sensor 30 corresponding to the obtained Vth2 is calculated by the data conversion by means of the LUT. The photoelectric conversion characteristic set value corresponding to the output level Vth2 obtained by this data conversion is saved in the photoelectric conversion characteristic information storage 516.

(Step S3-1) Setting of the Exposure Amount Control Parameters:

When the exposure amount control parameters for the AE control are calculated by the methods as described in Step S2-1, the AE control is carried out based on the exposure amount control parameters. Specifically, in the case of picking up a still image, the actual shooting is performed after the AE control based on the AE evaluation values obtained from the preliminarily picked-up image. In the case of picking up moving images, moving images are successively photographed after the AE control based on the AE evaluation values obtained, for example, from an image picked up immediately before.

Specifically, the exposure amount control parameters calculated in the exposure amount control parameter calculator 511 of the main controller 50 are inputted to the control signal generating unit 520, whereby control signals for operating the timing generating circuit 31 and the driving unit 60 for generating drive signals to carry out an actual exposure amount control are generated in the respective sections of the control signal generating unit 520. The sensor exposure period control signal generator 522 of the control signal generating unit 520 generates a control signal for the image sensor 30 so that a predetermined exposure period can be ensured in accordance with the exposure amount control parameters, and sends it to the timing generating circuit 31. The control signal here is a signal for setting, for example, the period ΔS, during which the signal φVPS to be sent to the image sensor 30 takes the medium potential M in the timing chart shown in FIG. 11, at a suitable period in accordance with the exposure amount control parameters (signal for setting the integration period between time t1 when the resetting of the parasitic capacitance of the photodiode PD ends and time t2 when the readout of the video signal of the next frame is started at a suitable period). The timing generating circuit 31 generates a timing signal for controlling the exposure period of the image sensor 30 in accordance with the inputted drive signal, thereby driving the image sensor 30.

Likewise, based on the exposure amount control parameters, the shutter control signal generator 523 generates a control signal for setting the shutter speed (shutter opening period) of the shutter 23 in conformity with the exposure period. This control signal is sent to the shutter driver 61 of the driving unit 60, and the shutter driver 61 generates a drive signal for the shutter 23 in accordance with the received control signal to cause the shutter 23 to open in accordance with the exposure amount control parameters.

The diaphragm control signal generator 525 likewise generates a control signal for setting the aperture area of the diaphragm 22 in accordance with the exposure amount control parameters. This control signal is sent to the diaphragm driver 63, which generates a drive signal for the diaphragm 22 in accordance with the received control signal, whereby the aperture area of the diaphragm 22 corresponding to the exposure amount control parameters is set.

As described above, the exposure amount control (control of the integration period) can be carried out by the drive control of the image sensor 30 by the timing generating circuit 31, the shutter speed control and the aperture control. These three controls may be all carried out but, in view of attaining a high-speed control, it is desirable to prioritize the exposure amount control by the timing generating circuit 31 using the electronic circuitry as described with reference to the flowchart of FIG. 22.

In Step S3-2: Setting of the Dynamic Range Control Parameter:

On the other hand, if the dynamic range control parameters for the AE control are calculated by the technique described in Step S2-2, the dynamic range control is carried out based on the dynamic range control parameters. Specifically, the dynamic range control parameters calculated in the dynamic range control parameter calculator 512 of the main controller 50 are inputted to the control signal generating unit 520, and a control signal for an actual dynamic range control is generated in the dynamic range control signal generator 521.

In accordance with the photoelectric conversion characteristic set value for the image sensor 30 calculated in the dynamic range control parameter calculator 512, the dynamic range control signal generator 521 generates a control signal to be sent to the image sensor 30 for adjusting the output level point (inflection point) where the photoelectric conversion characteristic is switched from the linear characteristic area to the logarithmic characteristic area, and sends it to the timing generating circuit 31. The control signal here is, for example, the control signal for suitably setting the signal φVPS to be sent to the image sensor 30 in accordance with the calculated dynamic range control parameters in the timing chart of FIG. 11.

Specifically, since the inflection point is changed by controlling the intensity of the voltage VPH in the signal φVPS or the duration of the period ΔT, the dynamic range control signal generator 521 generates a control signal for controlling the signal φVPS in accordance with the dynamic range control parameter and sends it to the timing generating circuit 31. The timing generating circuit 31 then generates a timing signal for controlling the dynamic range of the image sensor 30 in accordance with the received control signal, thereby actually driving the image sensor 30 in a state of a specified photoelectric conversion characteristic.

Although the above description is centered on the AE control, the AF control, the WB control and the like are also carried out in the actual electronic camera 1. The AF control can be similarly carried out based on the AF evaluation value obtained from an image picked up by the image sensor 30. For example, the AF evaluation values can be calculated by a so-called "hill-climbing detecting method" for obtaining a point, where the contrast to the luminance at an adjacent point is at its maximum, in the evaluation value detector 405, making the most of the luminance histograms detected from the blocks O, P, U and V of the main subject area 331 shown in FIG. 17. In such a case, it is desirable to detect the AF evaluation values from the linear characteristic area and the logarithmic characteristic area of the image sensor 30 and, for example, use the AF evaluation values obtained from the logarithmic characteristic area for a rough distance measurement upon the AF control while using those obtained from the linear characteristic area for a detailed distance measurement.

The AF evaluation values detected in the evaluation value detector 405 in this way are sent to the AF control parameter calculator 513 of the main controller 50. The AF control parameter calculator 513 calculates the AF control parameter corresponding to the AF evaluation values and sends it to the zooming/focusing control signal generator 523, in which a control signal corresponding to the received AF control parameter is generated and sent to the zooming/focusing driver 62. The zooming/focusing driver 62 generates a drive signal corresponding to the control signal, and the lens group 21 of the barrel 20 is driven to attain a focusing condition in accordance with this drive signal.

The WB control can be also carried out based on the WB evaluation values obtained from an image picked up by the image sensor 30. In this case as well, it is desirable to detect the WB evaluation values from the respective linear characteristic area and logarithmic characteristic area of the image sensor 30. Specifically, it is desirable to assume that the WB evaluation values are detected from neutral images based on the picked up image, and to detect the respective RGB levels (R-Log, G-Log, B-Log, R-Lin, G-Lin, B-Lin) based on two kinds of images in the linear characteristic area and logarithmic characteristic area as the neutral images. The evaluation value detector 405 detects such WB evaluation values and sends them to the WB controller 406, which conducts such a WB correction as to have a suitable color balance.

According to the electronic camera 1 of this embodiment that carries out the AE control described above, the exposure evaluation values on the exposure control are calculated by the exposure evaluation value detector upon picking up an image of a subject. Using these exposure evaluation values, the exposure amount is controlled by the exposure amount controller based on the photoelectric conversion characteristic of the image sensor, and the dynamic range is controlled by the dynamic range controller based on the photoelectric conversion characteristic of the image sensor. In this way, the exposure amount control by the exposure amount controller and the dynamic range control by the dynamic range controller are carried out while being related to the photoelectric conversion characteristic of the image sensor provided in the image sensing apparatus, whereby the exposure control for the image sensing apparatus can be carried out. Thus, the image can be picked up with an optimal exposure made for the subject in accordance with the subject luminance and with a specified dynamic range attained.

(Gradation Conversion LUT Setting Step S4)

If the photoelectric conversion characteristic is changed upon setting the control parameters for the AE control and the like as above, a gradation conversion processing is applied to the obtained image signal in accordance with a new gradation conversion LUT conforming to the photoelectric conversion characteristic after the change in the gradation converter 409 of the signal processing unit 40. In other words, the gradation conversion as one element of the image processing is controllably set in accordance with the controls for the image sensing in Steps S1 to S3.

Specifically, in the case of such setting as to change the photoelectric conversion characteristic 601 (inflection point 603) to the new photoelectric conversion characteristic 602 (inflection point 604) in order to increase an exposure amount by the exposure amount control as shown in FIG. 20A or in the case of such setting as to change the photoelectric conversion characteristic 701 (inflection point 703) to the new photoelectric conversion characteristic 702 (inflection point 704) to widen the dynamic range by the dynamic range control as shown in FIG. 20B, the gradation converter 409 carries out a gradation conversion conforming to the photoelectric conversion characteristic 602, 702 after the change.

More specifically, in the case of a change of the photoelectric conversion characteristic as described above, the photoelectric conversion characteristic set value after this change is saved in the photoelectric conversion characteristic information storage 516 (see FIG. 4) provided in the main controller 50. When a new set value is saved in the photoelectric conversion characteristic information storage 516 in this way, the inflection point change information receiver 4095 (see FIG. 5) of the gradation converter 409 extracts the set value information of this photoelectric conversion characteristic and sends it to the gradation conversion information rewriting section 4094. The gradation conversion information rewriting section 4094 in turn rewrites the gradation conversion LUT saved in the gradation conversion LUT storage 4092 to a new gradation conversion LUT in accordance with the new photoelectric conversion characteristic (inflection point).

When the AE control is completed only by the exposure amount control shown in FIG. 20A, the luminance for obtaining the sensor output Vtarget decreases from Lt2 to Lt1, but the sensor output Vth corresponding to the inflection point does not change. Accordingly, the gradation conversion LUT saved in the gradation conversion LUT storage 4092 may not be rewritten in this case. Since sensitivity corresponding to the incident luminance changes in this case as well, a LUT pattern in conformity with this sensitivity change may be saved in the LUT pattern storage 4093 and may be rewritten into a new gradation conversion LUT.

Figure 26:
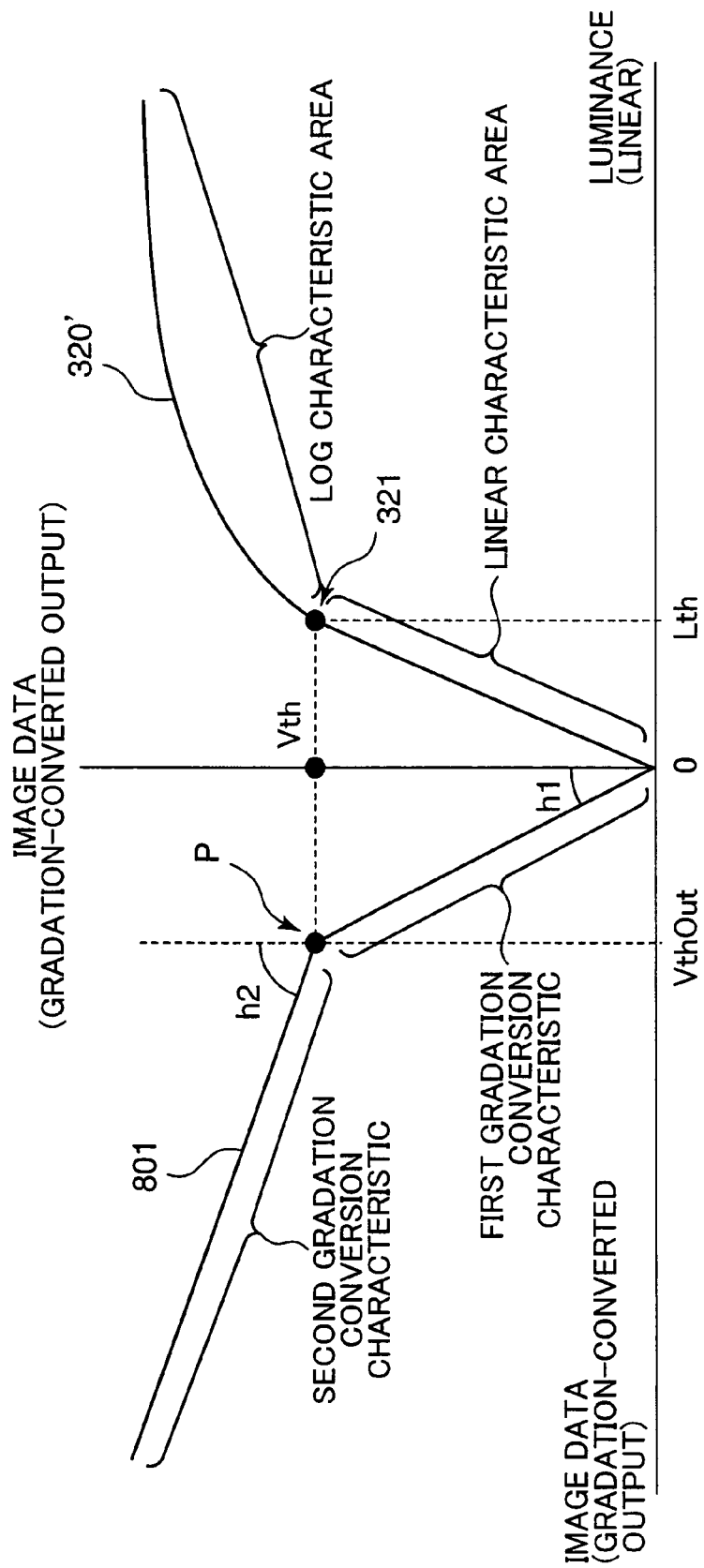
FIG. 26 is a graph showing the output (photoelectric conversion characteristic) of the image sensor and a gradation conversion characteristic in the gradation converter in relation to each other.

Next, a specific example of the gradation conversion LUT control is described. FIG. 26 is a graph showing an output (photoelectric conversion characteristic 320') of the image sensor 30 and the gradation conversion characteristic in the gradation converter 409 while relating them to each other. In FIG. 26, the photoelectric conversion characteristic 320' is shown in linear scale (graphic representation at the right side of FIG. 26) different from the other graphs. This photoelectric conversion characteristic 320' is comprised of a linear characteristic area at a lower luminance side and a logarithmic characteristic area at a higher luminance side with an inflection point 321 (where the sensor output is Vth) as a boundary. On the other hand, a gradation conversion LUT 801 (graphic representation at the left side of FIG. 26) is such that a first gradation conversion characteristic in the linear characteristic area is a linear characteristic having an inclination h1 and a second gradation conversion characteristic in the logarithmic characteristic area is a linear characteristic having an inclination h2 larger than the inclination h1. A point of the gradation-converted output (gradation-converted output VthOut corresponding to the incident luminance at the inflection point 321) corresponding to the output level Vth at the inflection point 321 is a switching point P of the first and second gradation conversion characteristics. The inclinations h1, h2 are set such that h1<h2 because image signals in the logarithmic characteristic area that were picked up while having the gradation thereof more compressed than image signals in the linear characteristic area can be outputted while having the gradation thereof expanded as already described with reference to FIG. 6.

If the AE control or the like causes such setting as to change the photoelectric conversion characteristic 320', e.g., if the inflection point 321 is changed, the gradation conversion LUT 801 is rewritten into a new gradation conversion LUT having a changed switching point P in conformity with such a change by the gradation conversion information rewriting section 4092, and the gradation conversion LUT after this rewriting is saved in the gradation conversion LUT storage 4092. The gradation conversion calculator 4091 applies a gradation conversion to the image signals inputted from the 3×3 corrector 408 by referring to the new gradation conversion LUT. The gradation conversion LUT may be a fixed one. However, the rewriting of the gradation conversion LUT into an optimal one in conformity with the change of the inflection point 321 as in this embodiment is preferable since an optimal gradation conversion conforming to the subject luminance can be constantly carried out.

Figure 27:
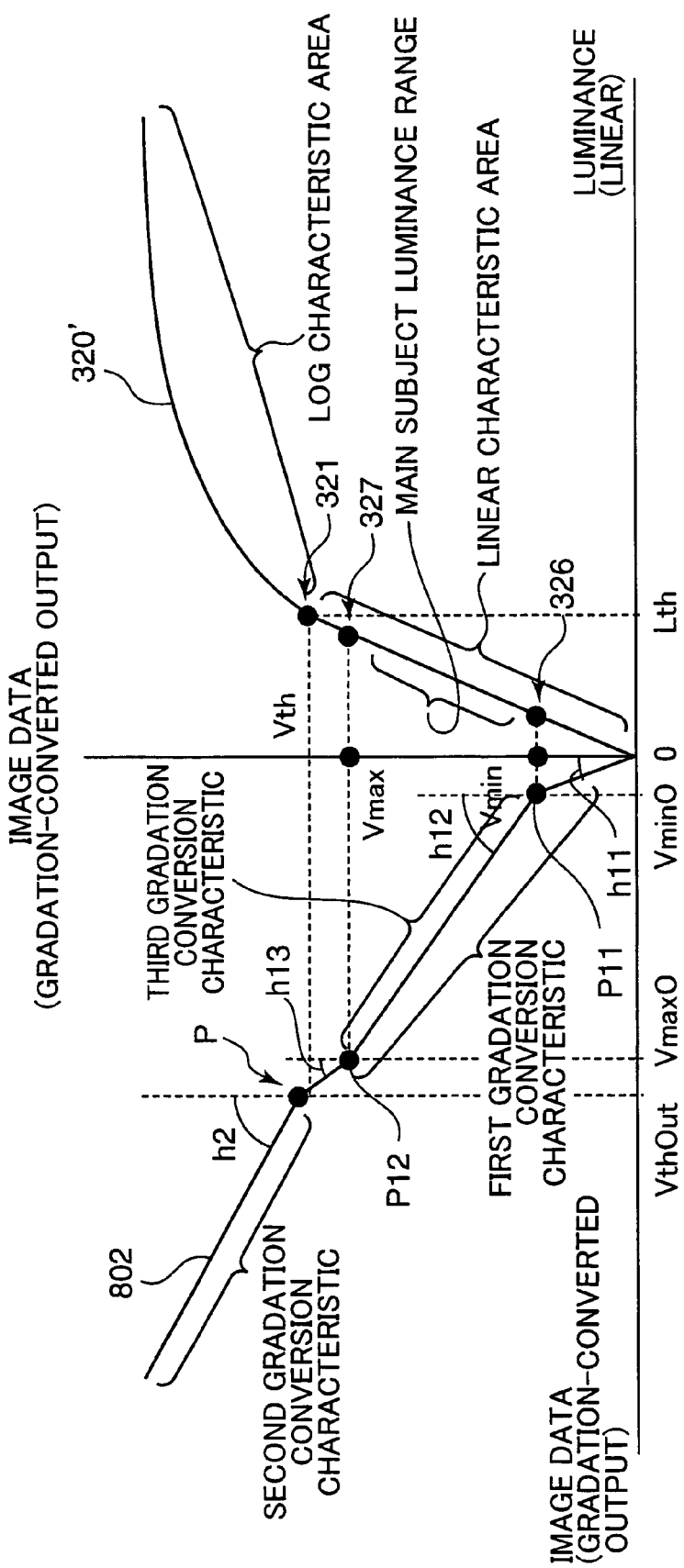
FIG. 27 is another graph showing the output (photoelectric conversion characteristic) of the image sensor and the gradation conversion characteristic in the gradation converter in relation to each other.

FIG. 27 is a graph showing another specific example of the gradation conversion LUT control. In this example, the first gradation conversion characteristic corresponding to the linear characteristic area is partly differed (third gradation conversion characteristic) to emphasize the contrast within the luminance range of the main subject. For example, the aforementioned AE control is so executed as to pick up an image within the luminance range of the image subject in the linear characteristic area of the image sensor 30 in order to sense the main subject with rich gradation. In order to more emphasize the contrast of the main subject, a part of the first gradation conversion characteristic is replaced by the third gradation conversion characteristic to convert the gradation of sensor outputs corresponding to the luminance range of the main subject in the linear characteristic area by the third gradation conversion characteristic having a relatively high degree of gradation conversion. A gradation conversion LUT 802 shown in FIG. 27 has such a feature.

More specifically, it is now assumed that Vmin, Vmax denote an output level at point 326 corresponding to the lower limit of the luminance range of the main subject (see FIG. 18) calculated in the maximum/minimum luminance calculator 4054 (see FIG. 16) of the histogram calculating section 4052, and an output level at point 327 corresponding to the upper limit of this luminance range. Sensor outputs within a range defined between Vmin and Vmax, i.e., those corresponding to the luminance range of the main subject are gradation-converted by the third gradation conversion characteristic having a relatively high degree of gradation conversion. In other words, the first gradation conversion characteristic is not a monotonous linear characteristic, but is divided into a gradation conversion characteristic part having an inclination $h11$, a gradation conversion characteristic part having an inclination $h12$ (third gradation conversion characteristic) and a gradation conversion characteristic part having an inclination $h13$ in this order from a lower output-level side. Switching points of these three gradation conversion characteristics are a switching point P11 (where the gradation-converted output is VminO) corresponding to Vmin (point 326) and a switching point P12 (where the gradation-converted output is VmaxO) corresponding to Vmax (point 327).

In the example shown in FIG. 27, the inclinations $h11$ to $h13$ and $h2$ are set to satisfy the following condition in order to attach importance to the contrast of the main subject:

$h12 > h2 > h13 > Yh11$ ($h13$ may be equal to $h11$).

If the gradation expansion of the logarithmic characteristic part is prioritized, the condition may be set:

$H2 > h12 > h13 > h1$ ($h3$ may be equal to $h11$).

These inclinations can be suitably set.

The gradation conversion LUT 802 as above may be a fixed one, but it is preferable to enable the rewriting at any time as the luminance range of the main subject changes. Specifically, the luminance range of the main subject is calculated based on the AE evaluation values detected by the evaluation value detector 405. In such a case, the inflection point information receiver 4095 is so constructed as to read the information on the change of the main subject luminance range together with the set value information of the photoelectric conversion characteristic from the main controller 50 and to send these pieces of information to the gradation conversion information rewriting section 4094. A LUT pattern corresponding to the third gradation conversion characteristic is saved in the LUT pattern storage 4093.

In the case of causing such setting as to change the photoelectric conversion characteristic 320' and in the case of causing a change of the luminance range of the main subject by the AE control or the like, the switching point P is changed in conformity with such a change by the gradation conversion information rewriting section 4094, and the switching points P11, P12 defining the third gradation conversion characteristic are rewritten into the new gradation conversion LUT and the gradation conversion LUT after this rewriting is saved in the gradation conversion LUT storage 4092. Thus, the gradation conversion calculator 4091 applies a gradation conversion to the image signals inputted from the 3×3 corrector 408 by referring to the new gradation conversion LUT. By rewriting the gradation conversion LUT into an optimal one as the inflection point 321 is changed and the luminance range of the main subject is changed as in this embodiment, an optimal gradation conversion conforming to the subject luminance can be carried out while emphasizing the contrast of the main subject.

The luminance range of the main subject is set based on the luminance range obtained by the maximum/minimum luminance calculator 4054 in the above description. However, a specific range centered on the average luminance of the main subject calculated in the average luminance calculator 4053 of the histogram calculating section 4052 may be determined as the luminance range of the main subject, and the output levels within a range corresponding to this luminance range may be gradation-converted by the third gradation conversion characteristic.

Figure 28:
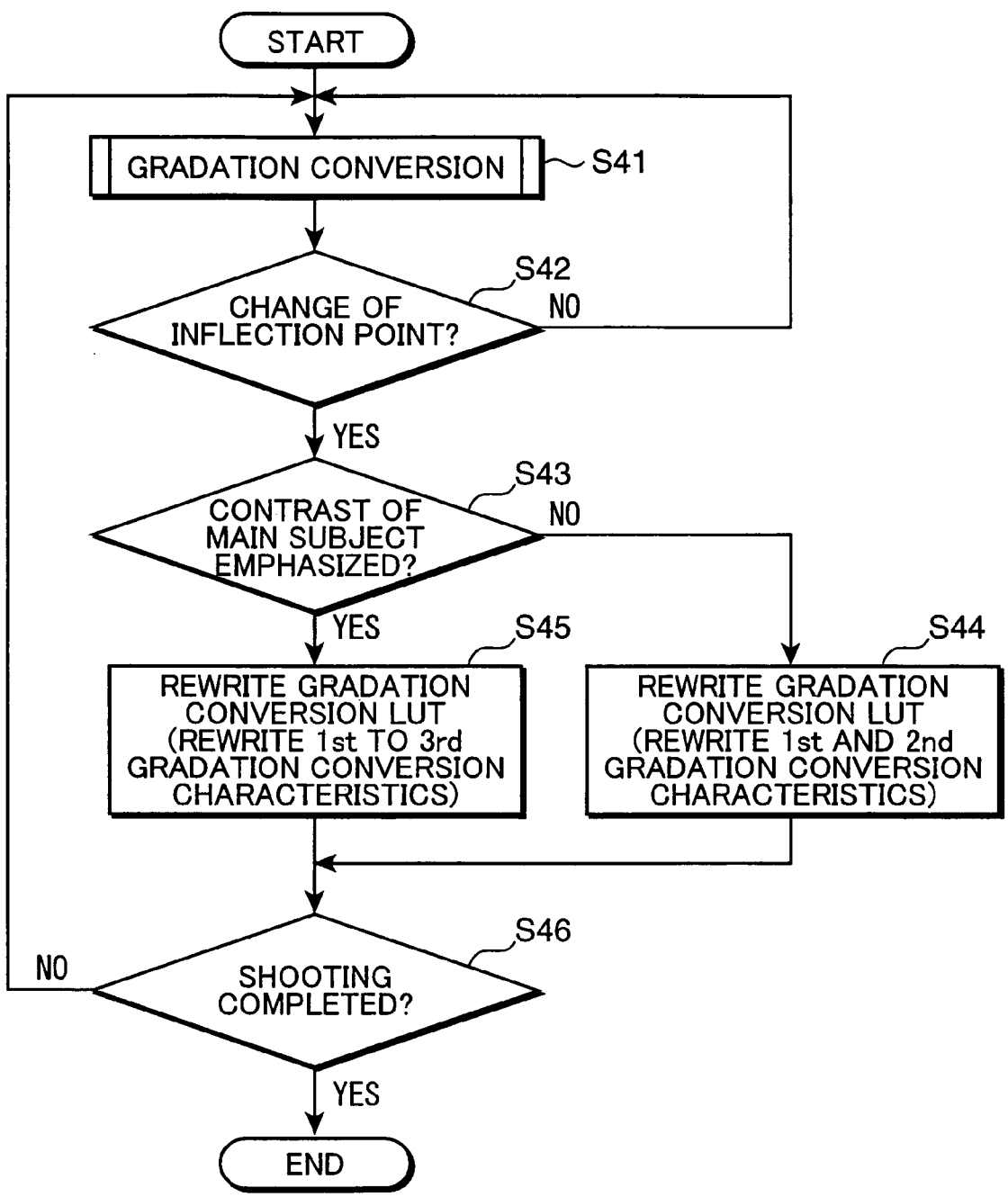
FIG. 28 is a flowchart showing the operation of the gradation converter.

Such an operation of the gradation converter 409 is described with reference to a flowchart shown in FIG. 28. It is assumed that an image signal obtained by the image sensing operation of the image sensor 30 is gradation-converted in accordance with a gradation conversion LUT corresponding to a specific photoelectric conversion characteristic (Step S41). In this state, whether or not the photoelectric conversion characteristic has been changed (inflection point has been changed) by the AE control or the like is confirmed (Step S42). If there has been no particular change in the photoelectric conversion characteristic (NO in Step S42), the gradation conversion using the gradation conversion LUT saved in the gradation conversion LUT storage 4092 is continued by the gradation conversion calculator 4091 without rewriting this gradation conversion LUT.

On the other hand, if there has been a change in the photoelectric conversion characteristic (YES in Step S42), the gradation conversion LUT is rewritten by the gradation conversion information rewriting section 4094. Prior to this rewriting, whether or not such setting as to emphasize the contrast of the main subject has been made is confirmed (Step S43). Unless such setting has been made (NO in Step S43), a new gradation conversion LUT whose switching pint between the first and second gradation conversion characteristics corresponds to an inflection point after the change is generated by the gradation conversion information rewriting section 4094 and saved in the gradation conversion LUT storage 4092 (Step S44). As long as no command to terminate the shooting operation is given (NO in Step S46), the gradation conversion is carried using this new gradation conversion LUT (Step S41).

If such setting as to emphasize the contrast of the main subject has been made (YES in Step S43), the gradation conversion information rewriting section 4094 generates a new gradation conversion LUT in which a switching point between the first and second gradation conversion characteristics and the range of the third gradation conversion characteristic corresponding to the luminance range of the main subject are so set as to correspond to the inflection point after the change of the photoelectric conversion characteristic and the luminance range of the main subject after the change, and saves it in the gradation conversion LUT storage 4092 (Step S45). As long as no command to terminate the shooting operation is given (NO in Step S46), the gradation conversion is carried using this new gradation conversion LUT (Step S41).

After the signal processing including the gradation conversion as above is carried out, the processed image signal is temporarily saved in the image memory or in the memory card 412. Alternatively, this pressed image signal is displayed as a monitor image on the LCD device 106. In this way, the image sensing operation by the electronic camera 1 is completed.

(Embodiment as an Image Sensing System)

The present invention is realized as a single image sensing apparatus such as an electronic camera in the above description. Next, description is given on an embodiment in which the present invention is realized as an image sensing system by linking an electronic camera or the like with a personal computer or the like. Although the image sensing system is described below, an operating program for operating this image sensing system is also described.

Figure 29:
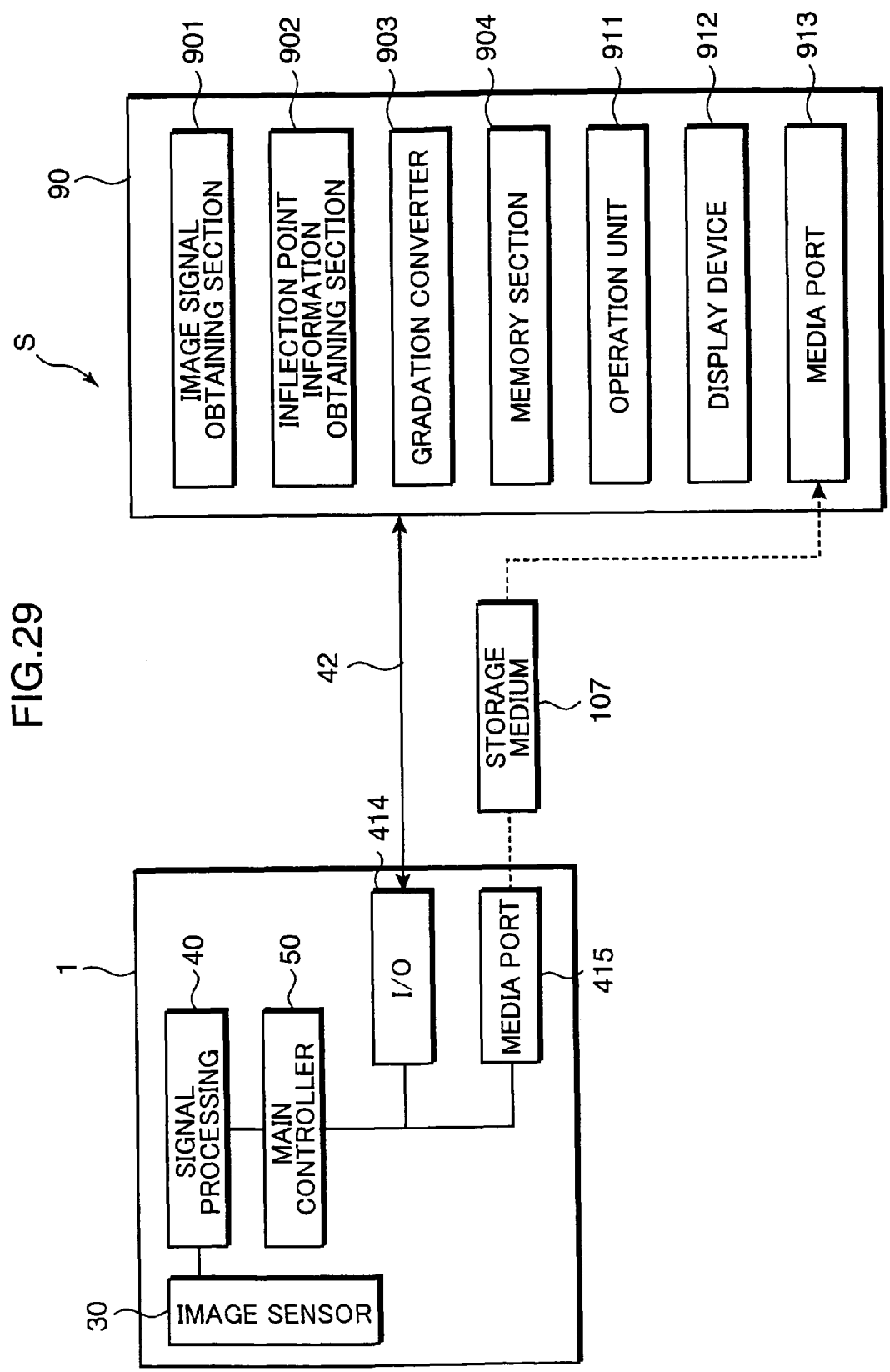
FIG. 29 is a block diagram showing one example of an image sensing system according to this embodiment.

FIG. 29 is a block diagram showing one example of an image sensing system S according to this embodiment. This image sensing system is comprised of an electronic camera 1 as an image sensing apparatus described in the foregoing embodiment, a host (image signal getter) 90 for obtaining an image signal or the like from the electronic camera 1 and displaying and recording image information, and an information transmitter 42 for transmitting information between the electronic camera 1 and the host 90.

In addition to the image sensor 30, the signal processing unit 40, the main controller 50 and the like described above, the electronic camera 1 is provided with an input/output (I/O) device 414 serving as a communication terminal with external apparatuses and a media port 415 in which an information recording medium such as a storage medium 107 is mountable. A command signal from the host 90 is transmitted to the main controller 50 via the I/O device 414, and image signals having various signal processing applied thereto in the signal processing unit 40 and information on the photoelectric conversion characteristic (inflection point) of the image sensor 30 saved in the photoelectric conversion characteristic information storage 516 (see FIG. 4) of the main controller 50 are transmitted to the host 90 via the I/O device 414. The images and the information on the photoelectric conversion characteristic (inflection point) information can be recorded in the storage medium 107 mounted in the media port 415. The signal processing unit 40 may include the aforementioned gradation converter 409. However, in the case that the electronic camera 1 operates as a constituting item of this image sensing system, the gradation conversion is not carried out in the gradation converter 409.

The host 90 is a PC (Personal Computer), a PDA (Personal Digital Assistance) or the like, and includes an image signal obtaining section 901, an inflection point information obtaining section 902, a gradation converter 903, a memory section 904, an operating unit 911, a display device 912 and a media port 913.

The image signal obtaining section 901 obtains an image signal generated by the electronic camera 1. The image signal obtained by this image signal obtaining section 901 has its format converted such as in a compressed image obtained by compressing an image signal having no gradation conversion applied thereto and stored in the image memory 411 by the JPEG (joint photographic coding experts group) method (hereinafter, JPEG image) or by the MPEG (moving picture experts group) method by the main controller 50, or has a raw format by recording the image data obtained from the image sensor 30 as it is (in this case, the host 90 is caused to possess the same functions as the signal processing unit 40).

The inflection point information obtaining section 902 obtains the information on the photoelectric conversion characteristic (inflection point) of the image sensor 30, i.e., the photoelectric conversion characteristic information saved (set) in the photoelectric conversion characteristic information storage 516 of the main controller 50. The photoelectric conversion characteristic information obtained by this inflection point information obtaining section 901 is any of the followings.

(1) Output level Vth corresponding to the inflection point between the linear characteristic area and the logarithmic characteristic area, (2) Mode number of the photoelectric conversion characteristic if a plurality of predetermined patterns are prepared as photoelectric conversion characteristics and a suitable photoelectric conversion characteristic is selected in accordance with the AE control or the like, (3) Variables a, b, α, β in approximation equations since the photoelectric conversion characteristic can be, for example, expressed by an approximation equation: y=a(x)+b in the linear characteristic area and by an approximation equation: y=αlog10(x)+β in the logarithmic characteristic area, and (4) Internal information of the electronic camera 1 such as the value of the reset voltage ΔVPS, the value of the exposure period or the aperture value shown in FIG. 11.

The gradation converter 903 applies a specified gradation conversion to the image signal obtained by the image signal obtaining section 901. This gradation converter 903 may have a construction similar to that of the gradation converter 409 of the signal processing unit 40 described with reference to FIG. 5. In other words, the gradation converter 903 generates a specified gradation conversion LUT based on the photoelectric conversion characteristic information obtained by the inflection point information obtaining section 902, and applies the gradation conversion to the image signal obtained by the host 90 using this gradation conversion LUT.

Here, if the photoelectric conversion characteristic information obtained by the inflection point information obtaining section 902 is the output level Vth (1), a gradation conversion LUT having first and second gradation conversion characteristics as shown in FIG. 26 is generated based on the output level Vth. In the case of the contrast emphasis considering the luminance range of the main subject, a gradation conversion LUT additionally having a third gradation conversion characteristic as shown in FIG. 27 is generated. In the case of the mode number of the photoelectric conversion characteristic (2) (in this case, photoelectric conversion characteristic patterns administered by similar mode-numbers are saved in the host 90), a gradation conversion LUT corresponding to the photoelectric conversion characteristic conforming to this mode number is generated. In the case of the approximation equations (3), a gradation conversion LUT as shown in FIG. 26 is generated while setting an intersection of the photoelectric conversion characteristic $y=a(x)+b$ in the linear characteristic area and the photoelectric conversion characteristic $y=a\log 10(x)+B$ in the logarithmic characteristic area as Vth. Further in the case of the internal information of the electronic camera 1 (4), the variable "a" is obtained from the variables a, b of the above approximation equations obtained beforehand, the exposure period and the aperture area of the diaphragm, and B is obtained from $\Delta$VPS, and a gradation conversion LUT in which Vth is similarly set at the intersection of the approximation equations is generated.

The memory section 904 includes a ROM, a RAM or the like for saving the gradation-converted image signal. The operating unit 911 includes operation keys, a mouse and the like for inputting an instruction to cause the image signal obtaining section 901 and the inflection point information obtaining section 902 to obtain the image signal and the inflection point information, and inputting an instruction to write the image signal in the memory section 904 or display an image on the display device 912. The display device 912 includes an LCD display or the like for displaying an image based on the image signal after the gradation conversion (or before the gradation conversion). The media port 913 is a terminal in which the storage medium 107 or the like is mountable to receive the image signal recorded in the storage medium 107.

The information transmitter 42 is a wire or wireless communication medium for communicably connecting the electronic camera 1 and the host 90. In the case of directly connecting the electronic camera 1 and the host 90, a USB (Universal Serial Bus) interface, a Bluetooth (registered trademark) interface or the like is used. In the case of network-connecting them, the Ethernet (registered trademark), a wireless LAN or the like is used. Accordingly, the information transmitter 42 includes a signal transmission medium such as a USB cable and an optical fiber for realizing the above communication and the interface therefore, or a wireless equipment or the like.

A technique of transmitting the information on the photoelectric conversion characteristic (inflection point) from the electronic camera 1 to the host 90 may be as follows. For example, in the case of transmitting an image signal representing a still image, the inflection point information can be transmitted together with the image signal by being added to a header of an image file. Specifically, the header of the image file where the internal information of the camera is normally recorded is used to write the inflection point information and to simultaneously transmit it. In the case of transmitting image signals representing moving images, e.g., in the case of Motion-JPEG images, moving images can be outputted while writing the inflection point information in the headers of the respective frame images similar to the case of the still image since the JPEG images are outputted as they are from the electronic camera 1. On the other hand, in the case of MPEG images, the inflection point information cannot be written in the headers as above and is, therefore, transmitted from the electronic camera 1 to the host 90 separately from an image signal file.

In addition to the direct connection and the network connection, an information storage medium such as the storage medium 107 can also be used as the "information transmitter" of the present invention. In such a case, the storage medium 107 is mounted in the media port 415 of the electronic camera 1 and the image signals representing the still images or the moving images and the inflection point information are written in the mounted storage medium 107. Thereafter, the storage medium 107 is detached from the electronic camera 1 and mounted in the media port 913 of the host 90, and the image signal obtaining section 901 and the inflection point information obtaining section 902 are caused to obtain the image signals and the inflection point information by outputting read instructions by means of the operating unit 911.

Figure 31:
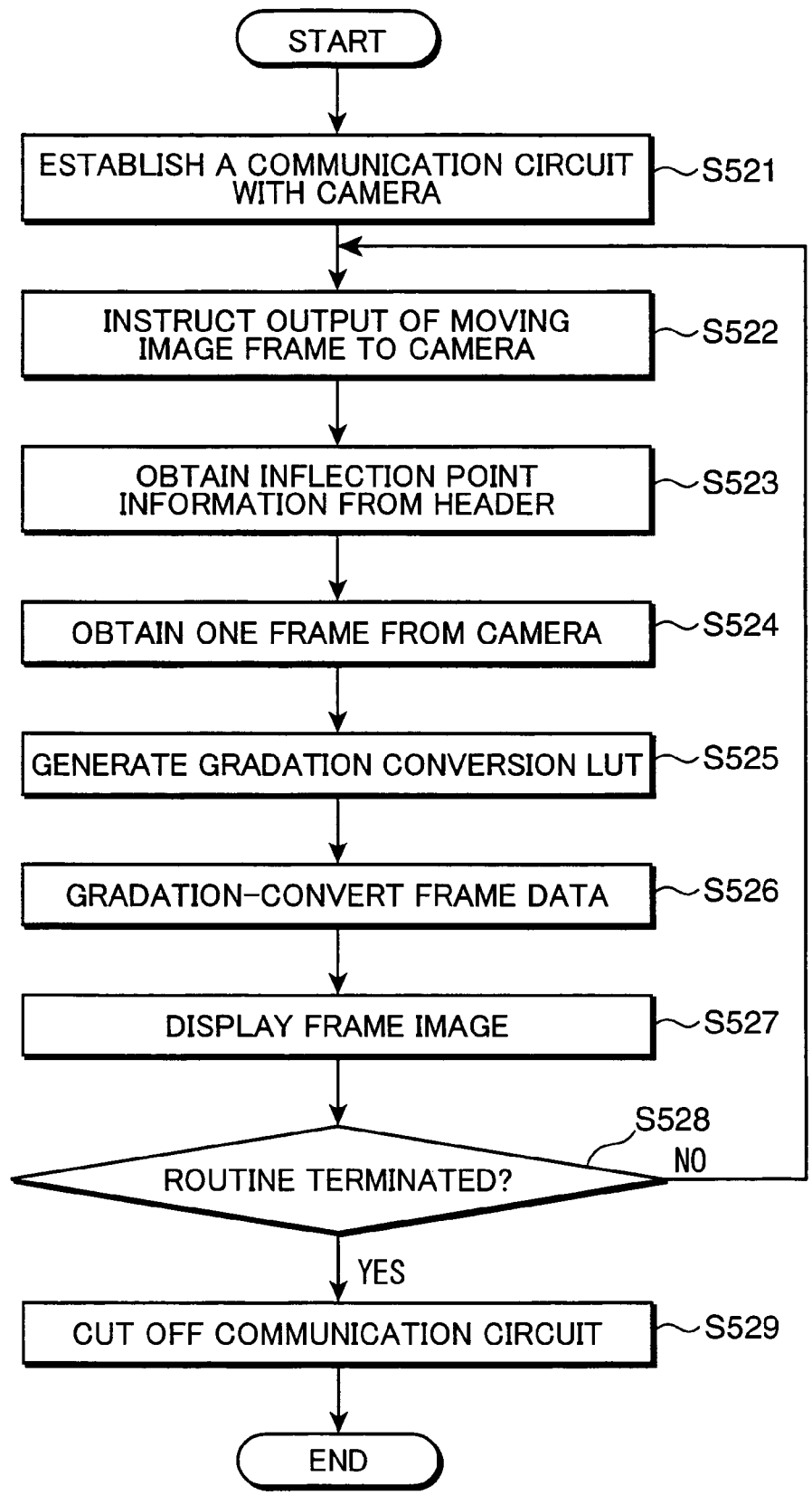
FIG. 31 is a flowchart showing another exemplary operation of the image sensing system.
Figure 32:
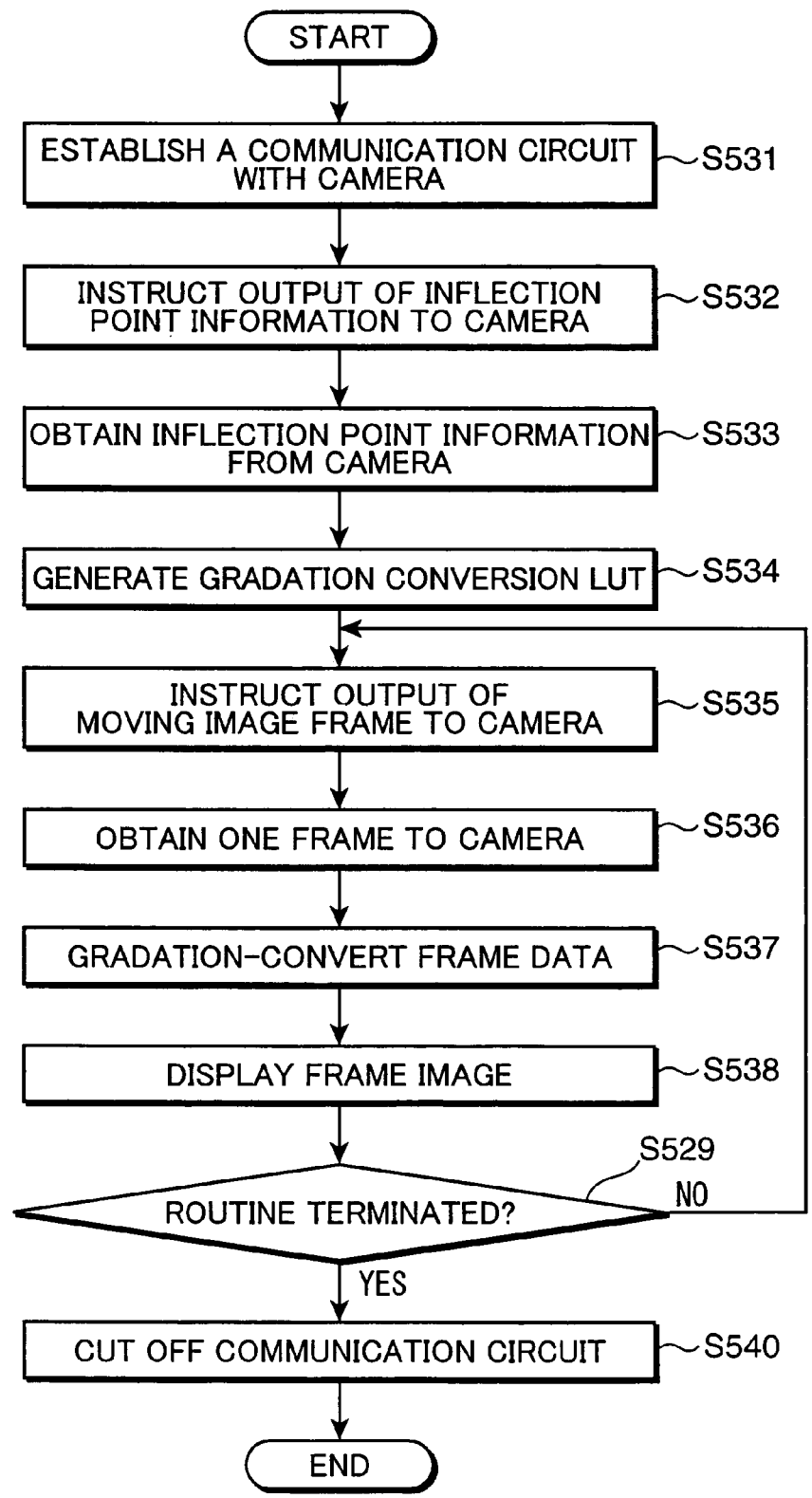
FIG. 32 is a flowchart showing still another exemplary operation of the image sensing system.
Figure 33:
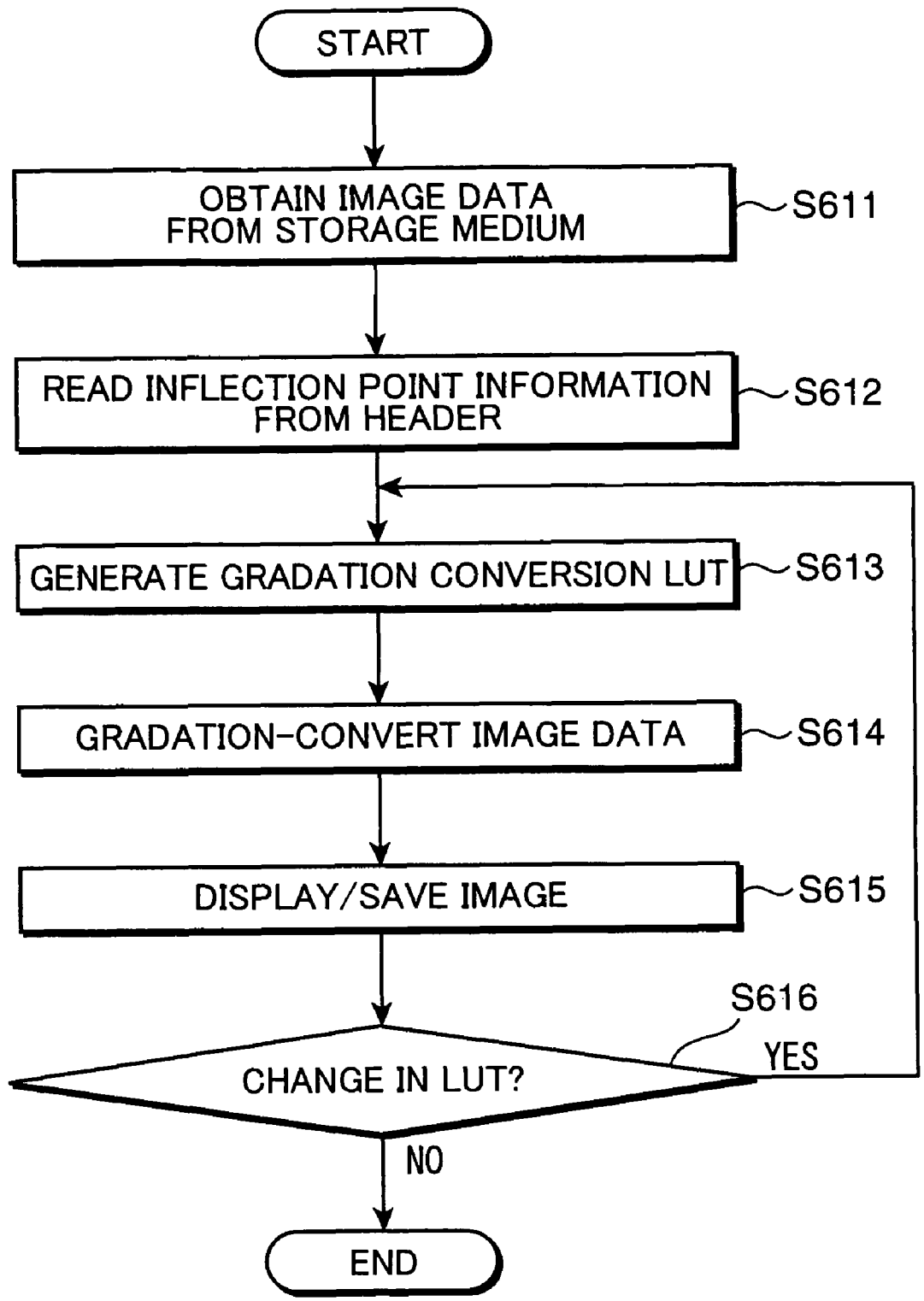
FIG. 33 is a flowchart showing further another exemplary operation of the image sensing system.
Figure 34:
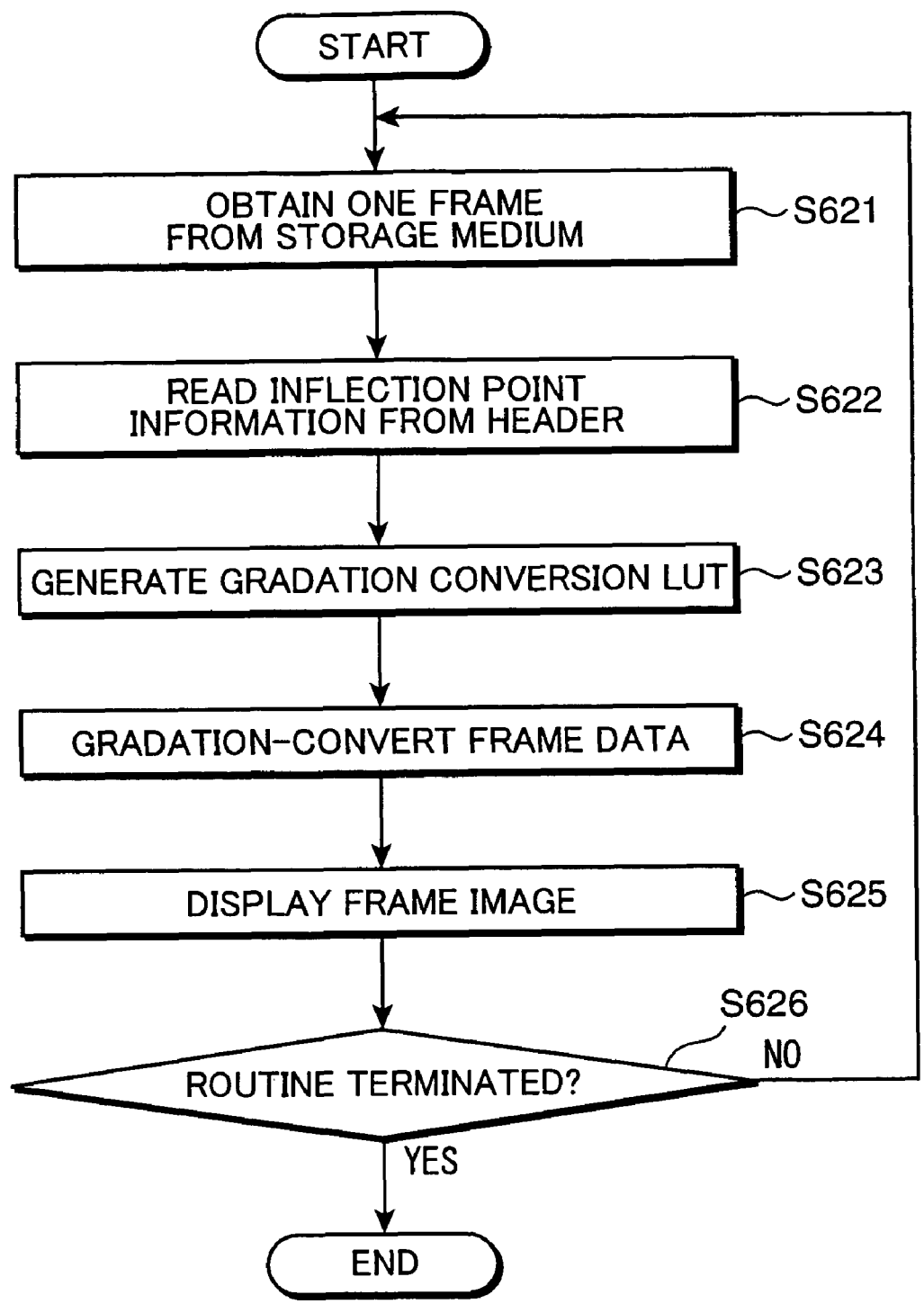
FIG. 34 is a flowchart showing still further another exemplary operation of the image sensing system.

The operation of the image sensing system (image sensing system operating program) according to this embodiment described above is described with reference to flowcharts shown in FIGS. 30 to 35. Out of these flowcharts, those shown in FIGS. 30 to 32 are examples of the operation flow in the case that the electronic camera 1 and the host 90 are directly connected or network-connected, and those shown in FIGS. 33 to 35 are examples of the operation flow in the case that the information is transmitted between the electronic camera 1 and the host 90 by means of the storage medium 107.

Figure 30:
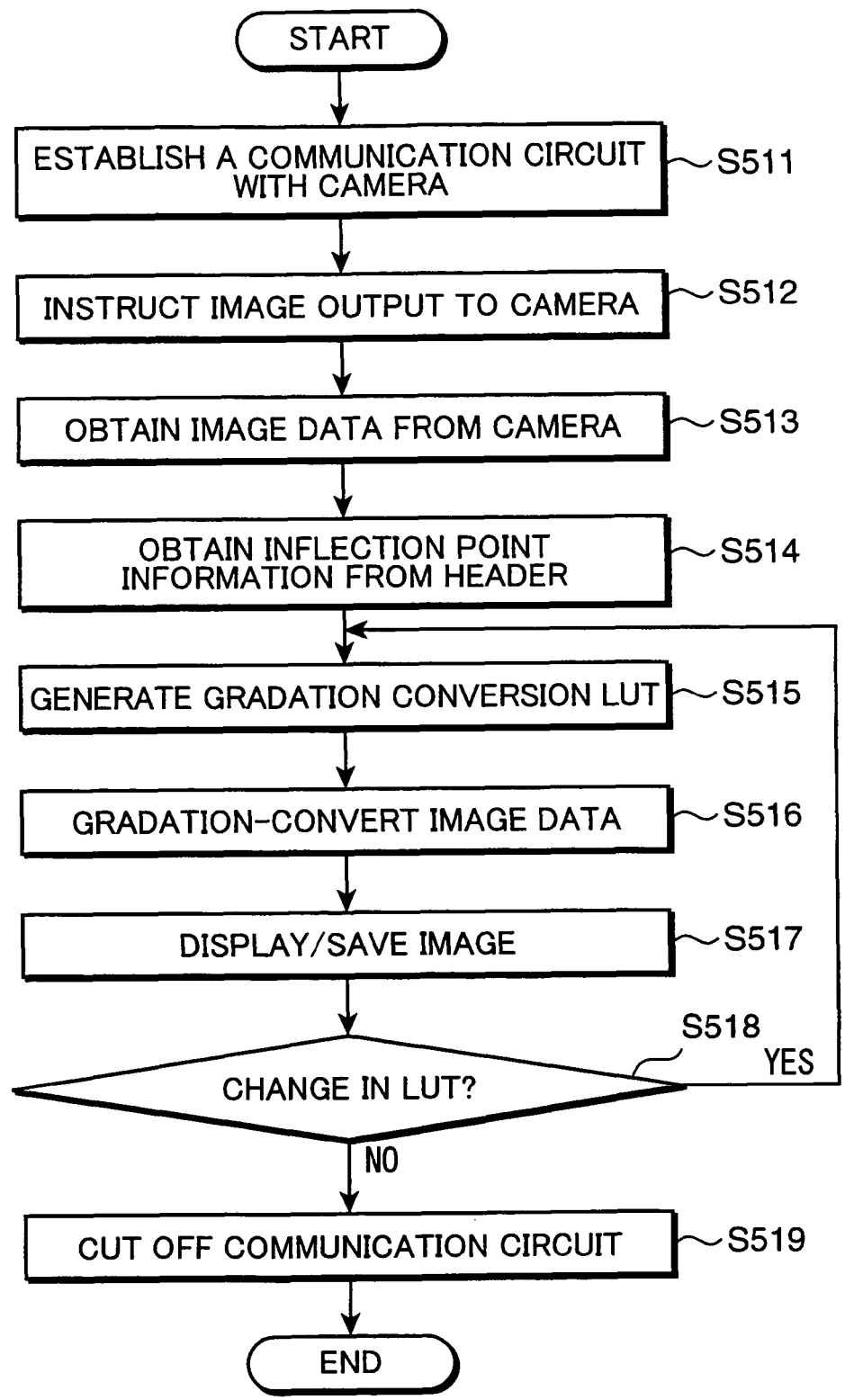
FIG. 30 is a flowchart showing one exemplary operation of the image sensing system.

FIG. 30 shows an exemplary operation flow in the case of obtaining a still image from the electronic camera 1. Upon the issuance of an instruction to obtain the image data by means of the operating unit 911 of the host 90, a communication circuit between the electronic camera 1 and the host 90 is established (Step S511) and an instruction to output a specified image signal is given to the main controller 50 of the electronic camera 1 (Step S512). Upon receiving this output instruction, the main controller 50 configures an image signal of the still image saved in the image memory 411 (see FIG. 2) into an image file and reads the information on the photoelectric conversion characteristic (inflection point information) when the still image was picked up from photoelectric conversion characteristic information storage 516 and writes it in the header of the image file. The image file attached with the inflection point information is transmitted to the host 90 via the I/O device 414 and is obtained by the host 90 via the information transmitter 42 (Step S513).

The image signal of the image file is extracted in the image signal obtaining section 901 of the host 90, and the inflection point information recorded in the header of the image file is read in the inflection point information obtaining section 902 (Step S514). In accordance with this inflection point information, the gradation converter 903 generates a gradation conversion LUT having a first and a second gradation conversion characteristics as shown in FIG. 26 or a gradation conversion LUT additionally having a third gradation conversion characteristic as shown in FIG. 27 by the aforementioned technique (Step S515). Then, the gradation conversion is carried out by a gradation conversion calculator of the gradation converter 903 (Step S516), and an image based on the image signal after the gradation conversion is displayed on the display device 912 or stored (saved) in the memory section 904 in response to an instruction from the operating unit 911 (Step S517). Upon displaying or saving the image, a user of the host 90 may change the gradation conversion LUT at his will to generate a new gradation converted output.

Subsequently, the inflection point information obtaining section 902 confirms whether or not the inflection point has been changed for a still image (image file) to be sent next (Step S518). If there has been a change (YES in Step S518), this routine returns to Step S515 to generate a gradation conversion LUT corresponding to the inflection point after the change, and the gradation conversion is carried out in accordance with this new gradation conversion LUT. The above operations are continued until the communication circuit between the electronic camera 1 and the host 90 is cut off (Step S519).

FIG. 31 shows an exemplary operation flow in the case of obtaining moving images (Motion-JPEG images). In this case, after the communication circuit between the electronic camera 1 and the host 90 is established as above (Step S521), an instruction to output the images frame by frame is given to the main controller 50 of the electronic camera 1 (Step S522). Upon receiving this output instruction, the main controller 50 reads the inflection point information when the moving images were picked up from the photoelectric conversion characteristic information storage 516 and writes it in the headers of the respective frame image files. The frame image file attached with the inflection point information is transmitted to the host 90 via the I/O device 414 and obtained by the host 90 via the information transmitter 42 (Step S523).

The image signal of the image file is extracted in the image signal obtaining section 901 of the host 90, and the inflection point information recorded in the header of the image file is read in the inflection point information obtaining section 902 (Step S524). In accordance with this inflection point information, the gradation converter 903 similarly generates a gradation conversion LUT having a first and a second gradation conversion characteristics as shown in FIG. 26 or a gradation conversion LUT additionally having a third gradation conversion characteristic as shown in FIG. 27 by the aforementioned technique (Step S525). Then, the gradation converter 903 applies a gradation conversion to the frame image (Step S526), and an image based on the image signal after the gradation conversion is displayed on the display device 912 (live-view display in some cases) or stored (saved) in the memory section 904 (Step S527) in response to an instruction from the operating unit 911.

Subsequently, whether or not there is an instruction to terminate this routine (terminate the image signal obtaining operation by the host 90) is confirmed (Step S528). If there is no such instruction (NO in Step S528), this routine returns to Step S522 to perform a similar processing to the next frame image. At this time, if there is a change in the inflection point information written in the header of the frame image file, a new gradation conversion LUT corresponding to the inflection point after the change is generated in Step S525 and the gradation conversion is carried out in accordance with this new gradation conversion LUT. Such operations are continued until the communication circuit between the electronic camera 1 and the host 90 is cut off (Step S529).

FIG. 32 shows an exemplary operation flow in the case of obtaining moving images (MPEG images). In this case, after a communication circuit is established between the electronic camera 1 and the host 90 similar to the above (Step S531), an instruction to output the inflection point information is first given to the main controller 50 of the electronic camera 1 (Step S532). Upon receiving this, the main controller 50 reads the inflection point information saved in the photoelectric conversion information storage 516 and sends it to the host 90, whereby the inflection point information obtaining section 902 obtains the inflection point information (Step S533). It should be noted that the inflection point information is saved while being related to the addresses of the frame images and the like. In accordance with this inflection point information, the gradation converter 903 generates a gradation conversion LUT having a first and a second gradation conversion characteristics as shown in FIG. 26 or a gradation conversion LUT additionally having a third gradation conversion characteristic as shown in FIG. 27 (Step S534).

After completing the above preparation, an instruction to output the image signals frame by frame is given to the main controller 50 of the electronic camera 1 (Step S535), the main controller 50 transmits the frame image file to the host 90 via the I/O device 414 and the host 90 obtains this frame image file via the information transmitter 42 (Step S536). In accordance with the gradation conversion LUT generated beforehand, the gradation converter 903 applies a gradation conversion to the frame images (Step S537). An image based on the output image signal after the gradation conversion is displayed on the display device 912 (live-view display in some cases) or stored (saved) in the memory section 904 (Step S538) in response to an instruction from the operating unit 911.

Subsequently, whether or not there is an instruction to terminate this routine (terminate the image signal obtaining operation by the host 90) is confirmed (Step S539). If there is no such instruction (NO in Step S539), this routine returns to Step S535 to perform a similar processing to the next frame image. At this time, if there is a change in the inflection point information, a new gradation conversion LUT corresponding to the inflection point after the change is generated. Thus, the gradation conversion in accordance with the new gradation conversion LUT is carried out in Steps S535 to S538. Such operations are continued until the communication circuit between the electronic camera 1 and the host 90 is cut off (Step S540).

Next, an operation flow in the case of transmitting information between the electronic camera 1 and the host 90 by means of the storage medium 107 is described with reference to FIGS. 33 to 35. FIG. 33 shows an exemplary operation flow in the case of obtaining an image signal from the storage medium 107 having a still image picked up by the electronic camera 1 saved therein. When the storage medium 107 is mounted in the media port 913 of the host 90 and an instruction to obtain an image data is given by the operating unit 911, an image file of the still image saved in the storage mecum 107 is obtained (Step S611). It should be noted that information on the photoelectric conversion characteristic (inflection point information) when the still image was picked up is written in a header of this image file.

The image signal of the image file is obtained in the image signal obtaining portion 901 of the host 90, and the inflection point information saved in the header of the image file is read in the inflection point information obtaining section 902 (Step S612). In accordance with this inflection point information, the gradation converter 903 generates a gradation conversion LUT having a first and a second gradation conversion characteristics as shown in FIG. 26 or a gradation conversion LUT additionally having a third gradation conversion characteristic as shown in FIG. 27 by the aforementioned technique (Step S613). Then, a gradation conversion is applied by the gradation conversion calculator of the gradation converter 903 (Step S614), and an image based on the output image signal after the gradation conversion is displayed on the display device 912 or stored (saved) in the memory section 904 (Step S615) in response to an instruction from the operating unit 911. It should be noted that, upon displaying or saving the image, a user of the host 90 may arbitrarily change the gradation conversion LUT to generate a new gradation-converted output.

Subsequently, the inflection point information obtaining section 902 confirms whether or not the inflection point has been changed for a still image (image file) to be read next (Step S616). If there has been a change (YES in Step S616), this routine returns to Step S613 to generate a gradation conversion LUT corresponding to the inflection point after the change, and the gradation conversion is carried out in accordance with this new gradation conversion LUT. The above operations are continued, for example, as many times as the image files recorded in the storage medium 107.

FIG. 34 shows an exemplary operation flow in the case of obtaining moving images (Motion-JPEG images). In this case, after frame image files of the moving images saved in the storage medium 107 are similarly obtained as above (Step S621). The image signal of the image file is obtained in the image signal obtaining section 901, and the inflection point information recorded in a header of the image file is read in the inflection point information obtaining section 902 (Step S622). In accordance with this inflection point information, the gradation converter 903 generates a gradation conversion LUT having a first and a second gradation conversion characteristics as shown in FIG. 26 or a gradation conversion LUT additionally having a third gradation conversion characteristic as shown in FIG. 27 (Step S623). Then, the gradation converter 903 applies a gradation conversion to the frame image (Step S624), and an image based on the output image signal after the gradation conversion is displayed on the display device 912 or stored (saved) in the memory section 904 (Step S625) in response to an instruction from the operating unit 911.

Subsequently, whether or not there is an instruction to terminate this routine (terminate the image signal obtaining operation by the host 90) is confirmed (Step S626). If there is no such instruction (NO in Step S626), this routine returns to Step S621 to perform a similar processing to the next frame image. At this time, if there is a change in the inflection point information written in the header of the frame image file, a new gradation conversion LUT corresponding to the inflection point after the change is generated in Step S623 and the gradation conversion is carried out in accordance with this new gradation conversion LUT. Such operations are continued until the routine is terminated (YES in Step S626).

FIG. 35 shows an exemplary operation flow in the case of obtaining moving images (MPEG images). In this case, when the storage medium 107 is mounted in the media port 913 of the host 90, the inflection point information saved in the storage medium 107 is first read and the inflection point information obtaining section 902 obtains the inflection point information (Step S631). It should be noted that the inflection point information is saved while being related to the addresses of the frame images. In accordance with this inflection point information, the gradation converter 903 generates a gradation conversion LUT having a first and a second gradation conversion characteristics as shown in FIG. 26 or a gradation conversion LUT additionally having a third gradation conversion characteristic as shown in FIG. 27 (Step S632).

After completing the above preparation, the image signals are read frame by frame from the storage medium 107 (Step S633), and the gradation converter 903 applies a gradation conversion to the frame image in accordance with the gradation conversion LUT generated beforehand (Step S634). An image based on the output image signal after the gradation conversion is displayed on the display device 912 or stored (saved) in the memory section 904 in response to an instruction from the operating unit 911 (Step S635).

Subsequently, whether or not there is an instruction to terminate this routine (terminate the moving image signal obtaining operation from the storage medium 107) is confirmed (Step S636). If there is no such instruction (NO in Step S636), this routine returns to Step S633 to perform a similar processing to the next frame image. At this time, if there is a change in the inflection point information written in the header of the frame image file, a new gradation conversion LUT corresponding to the inflection point after the change is generated. Thus, the gradation conversion in accordance with the new gradation conversion LUT is carried out in Steps S633 to S635. Such operations are continued until the routine is terminated (YES in Step S636).

The operations of the image sensing system S according to this embodiment are described above. An image sensing system operating program enabling such operations may be prepared and stored in a CD-ROM or the like. For example, the operations of the image sensing system S may be enabled by downloading this program from the CD-ROM or the like to a personal computer used as the aforementioned host 90.

As described above, an image sensing apparatus comprises an image sensor adapted to generate an electrical signal corresponding to an amount of incident light and having a photoelectric conversion characteristic comprised of a first area where the electrical signal is outputted after being converted according to a first characteristic in relation to the amount of the incident light and a second area where the electrical signal is outputted after being converted according to a second characteristic different from the first characteristic in relation to the amount of the incident light; a gradation conversion information storage device storing at least two kinds of pieces of gradation conversion information including a first gradation conversion characteristic as gradation conversion information for the first area and a second gradation conversion characteristic as gradation conversion information for the second area, the first and second gradation conversion characteristics having a switching point at an inflection point between the first area and the second area of the image sensor; and a gradation converter for applying a gradation conversion to an image signal picked up by the image sensor in accordance with the gradation conversion information stored in the gradation conversion information storage device. Also, it may be appreciated that the electric signal is outputted after being linearly converted in relation to the amount of the incident light in the first area, and the electric signal is outputted after being logarithmically converted in relation to the amount of the incident light in the second area.

With this construction, the gradation conversion is carried out for the first area of the image sensor using the first gradation conversion characteristic stored in the gradation conversion information storage device while being carried out for the second area using the second gradation conversion characteristic. Thus, a suitable gradation conversion corresponding to the subject luminance can be carried out by determining the first and second gradation conversion characteristics in accordance with the respective characteristic areas of the image sensor.

By determining the first and second gradation conversion characteristics in accordance with the respective characteristic areas of the image sensor, image signals picked up in the respective characteristic areas can be outputted after being converted into image signals having optimal gradation conversions conforming to the subject luminance or being converted into image signals having arbitrary gradation conversions making the most of the features of the respective characteristic areas even in an image sensing apparatus including an image sensor provided with a first area and a second area so that image sensing operations having different gradations are carried out in accordance with an incident luminance. In other words, various gradation conversions in consideration of the features of the first area and the second area are made possible, thereby presenting an effect of being able to provide an image sensing apparatus having a higher degree of freedom in gradation conversion.

Preferably, the second gradation conversion characteristic as the gradation conversion information for the second area may have a higher degree of gradation conversion than the first gradation conversion characteristic as the gradation conversion information for the first area. With this construction, image signals in the second area, which are picked up by having the gradation more compressed as compared to the first area, can be outputted while having the gradation expanded. Thus, the gradation can be restored by as much as being compressed. Therefore, a gradation conversion true to the gradation of the subject luminance can be carried out for a subject luminance range sensed in the second area.

Preferably, the first gradation conversion characteristic as the gradation conversion information for the first area may include a high gradation conversion characteristic part having a higher degree of gradation conversion than the other part. With this construction, as compared to a case where, for example, a monotonous linear characteristic is set as the first gradation conversion characteristic, an image signal whose luminance range part desired to have the contrast emphasized (e.g., the luminance range part of a main subject) is rich in gradation can be obtained by allotting the high gradation conversion characteristic part as such a luminance range part. Therefore, it becomes possible to generate an image signal whose contrast is weighted for an arbitrary luminance range part of the subject, thereby presenting an advantage of improving the degree of freedom in gradation conversion.

The image sensing apparatus preferably may further comprise an inflection point controller for controlling the inflection point between the first area and the second area of the image sensor; and a gradation conversion information rewriter for rewriting the gradation conversion information stored in the gradation conversion information storage device into the new one having a switching point changed in conformity with the inflection point after a change in the case that the inflection point is changed by the inflection point controller. With this construction, even if the inflection point between the first area and the second area of the image sensor is changed, the gradation conversion information stored in the gradation conversion information storage device can be rewritten into the new gradation conversion information in conformity with the inflection point after the change by the gradation conversion information rewriter. Therefore, even if the inflection point is changed in accordance with the incident luminance or for various controls, the gradation conversion information is accordingly renewed to the new one at any necessary time. Hence, even if the inflection point is constantly changed, the gradation conversion can be constantly carried out in accordance with an optimal or intended gradation conversion characteristic.

Preferably, the inflection point controller may be an exposure controller for controlling the inflection point such that an output of the image sensor corresponding to a subject luminance for an exposure control can be obtained from the first area. With this construction, the gradation conversion information stored in the gradation conversion information storage device can be rewritten into the new gradation conversion information by the gradation conversion information rewriter if the photoelectric conversion characteristic (inflection point) of the image sensor is changed by an exposure control. Thus, it is also possible, for example, to change the inflection point between the first and second gradation conversion characteristics in accordance with the photoelectric conversion characteristic (inflection point) varying as a result of the exposure control. Therefore, there is an effect of being able to obtain an optimal gradation-converted output following up the exposure control, i.e., a gradation-converted output precisely following up the subject luminance.

The image sensing apparatus may preferably further comprise a luminance detector for detecting the luminance of a subject while dividing it into a main subject luminance and a peripheral subject luminance, and the gradation conversion information rewriter preferably rewrites a part of the gradation conversion information stored in the gradation conversion information storage device corresponding to a main subject luminance range part into a third gradation conversion characteristic having a relatively higher degree of gradation conversion in accordance with the luminance information of a main subject detected by the luminance detector. With this construction, there can be generated an image signal whose part corresponding to the main subject luminance range part has a higher contrast by the third gradation conversion characteristic having a relatively higher degree of gradation conversion. Thus, a gradation-converted output having particular importance for the contrast of the main subject can be obtained.

Preferably, the inflection point controller may be an exposure controller for controlling the inflection point such that an output of the image sensor corresponding to the luminance of a subject for an exposure control can be obtained from the first area, a main subject being sensed in the first area of the image sensor by setting the subject luminance for the exposure control as a main subject luminance range part; and the gradation conversion information rewriter rewrites at least a part of the first gradation conversion characteristic as the gradation conversion information for the first area corresponding to the main subject luminance range part into the third gradation conversion characteristic. With this construction, the main subject is sensed in the first area originally having a better contrast and is gradation-converted at a higher degree of gradation conversion by the third gradation conversion characteristic. Thus, there can be obtained an image signal in which the contrast of the main subject is even more emphasized.

The exposure controller may be an exposure amount controller for controlling an amount of exposure made to the image sensor. As the exposure period, the aperture area of the diaphragm, the shutter speed and the like of the image sensor are controlled in accordance with the photoelectric conversion characteristic of the image sensor for an exposure amount control, the gradation conversion information is rewritten at any necessary time. Therefore, an optimal gradation-converted output following up the exposure amount control can be obtained.

Further, the exposure controller may be a dynamic range controller for controlling the photoelectric conversion characteristic of the image sensor. As the photoelectric conversion characteristic of the image sensor is controlled for the dynamic range control, the gradation conversion information is rewritten at any necessary time. Therefore, an optimal gradation-converted output following up the dynamic range control can be obtained.

An image sensing system comprises an image sensing apparatus including an image sensor adapted to generate an electrical signal corresponding to an amount of incident light and having a photoelectric conversion characteristic comprised of a first area where the electrical signal is outputted after being converted according to a first characteristic in relation to the amount of the incident light and a second area where the electrical signal is outputted after being converted according to a second characteristic different from the first characteristic in relation to the amount of the incident light, and an inflection point controller for controlling the inflection point between the first area and the second area of the image sensor; an information transmitter for transmitting an image signal picked up by the image sensor and inflection point information controlled by the inflection point controller to the outside; and an image signal getter for obtaining the image signal and the inflection point information from the information transmitter and applying a specified gradation conversion to the obtained image signal to generate an image signal to be reproduced, wherein the image signal getter includes a gradation conversion information storage section storing at least two kinds of pieces of gradation conversion information including a first gradation conversion characteristic as gradation conversion information for the first area and a second gradation conversion characteristic as gradation conversion information for the second area, the first and second gradation conversion characteristics having a switching point at an inflection point between the first area and the second area of the image sensor; and a gradation converting section for applying a gradation conversion to the obtained image signal in accordance with the gradation conversion information stored in the gradation conversion information storage.

With this construction, the image can be, for example, displayed or recorded after a specified gradation conversion is applied thereto by the image signal getter externally connected with the image sensing apparatus via the information transmitter such as a network. In other words, the image signal picked up by the image sensing apparatus is inputted to the image signal getter such as a personal computer via a network or the like, and a suitable gradation conversion can be applied thereto in the image signal getter. Thus, an extended system can be built using the image sensor of the image sensing apparatus as the image signal getter. Further, even if the image sensing apparatus does not comprise the gradation conversion information storage device storing at least two kinds of pieces of gradation conversion information, there is also an advantage of obtaining a desired gradation-converted output in the image signal getter.

Preferably, the image signal getter may further include a gradation conversion information rewriting section for rewriting the gradation conversion information stored in the gradation conversion information storage section into new gradation conversion information having a switching point changed in conformity with the inflection point after a change in the case that the inflection point is changed by the inflection point controller provided in the image sensing apparatus and the changed inflection point information is obtained by the image signal getter. With this construction, even if the inflection point between the first area and the second area of the image sensor is changed, the gradation conversion information stored in the gradation conversion information storage section of the image signal getter can be rewritten into the new gradation conversion information in conformity with the inflection point after the change by the gradation conversion information rewriter. Thus, even if the inflection point is changed in accordance with the incident luminance or for various controls, the gradation conversion information is accordingly renewed to the new one at any necessary time. Hence, even if the inflection point is constantly changed, the gradation conversion can be constantly carried out in accordance with an optimal (intended) gradation conversion characteristic.

Preferably, the information transmitter may include a communication cable, or a wire or wireless communication network. Then, it becomes possible to input a still image signal or a live-view image signal obtained by the image sensing apparatus to the image signal getter in real time and to display the image or the like after applying a specified gradation conversion thereto.

Alternatively, an information storage medium such as a storage medium mountable in and detachable from the image sensing apparatus and the image signal getter. Then, it becomes possible to freely carry the image signal and the inflection point information around by temporarily saving them in the storage medium or the like. Therefore, the convenience of a user can be improved.

An image sensing system operating program product is adapted for enabling the operation of an image sensing system comprising an image sensing apparatus including an image sensor adapted to generate an electrical signal corresponding to an amount of incident light and having a photoelectric conversion characteristic comprised of a first area where the electrical signal is outputted after being linearly converted in relation to the amount of the incident light and a second area where the electrical signal is outputted after being logarithmically converted in relation to the amount of the incident light, an inflection point controller for controlling the inflection point between the first area and the second area of the image sensor; an information transmitter for transmitting an image signal picked up by the image sensor and inflection point information controlled by the inflection point controller to the outside; and an image signal getter for obtaining the image signal and the inflection point information from the information transmitter and applying a specified gradation conversion to the obtained image signal to generate an image signal to be reproduced, the image signal getter including a gradation conversion information storage section storing at least two kinds of pieces of gradation conversion information including a first gradation conversion characteristic as gradation conversion information for the first area and a second gradation conversion characteristic as gradation conversion information for the second area, the first and second gradation conversion characteristics having a switching point at an inflection point between the first area and the second area of the image sensor; and a gradation converting section for applying a gradation conversion to the obtained image signal in accordance with the gradation conversion information stored in the gradation conversion information storage. The program causes the image signal getter to obtain the inflection point information from the image sensing apparatus via the information transmitter, and causes the gradation conversion information stored in the gradation conversion information storage section to be rewritten into new gradation conversion information having a switching point changed in accordance with the inflection point information obtained by the image signal getter.

According to this program, even if the inflection point between the first area and the second area of the image sensor is changed, the gradation conversion information stored in the gradation conversion information storage section of the image signal getter can be rewritten into the new one in conformity with the inflection point after the change by the gradation conversion information rewriter. Thus, even if the inflection point is changed in accordance with the incident luminance or for various controls, the image sensing system can be so operated as to renew the gradation conversion information to the new one at any necessary time. Therefore, even if the inflection point is constantly changed, there can be operated the image sensing system in which the gradation conversion is constantly carried out in accordance with an optimal (intended) gradation conversion characteristic in the image signal getter.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image sensing apparatus for a digital camera, comprising:
an image sensor which generates an electrical signal corresponding to an amount of incident light and having a photoelectric conversion characteristic comprised of a first area where the electrical signal is outputted after being converted according to a first characteristic in relation to the amount of the incident light, and a second area where the electrical signal is outputted after being converted according to a second characteristic different from the first characteristic in relation to the amount of the incident light;
a gradation converter which applies a gradation conversion to an image signal picked up by the image sensor;
a gradation conversion information storage device contained in the gradation converter, configured to store at least two kinds of gradation conversion information including a first gradation conversion characteristic as gradation conversion information for the first area, and a second gradation conversion characteristic as gradation conversion information for the second area, the first and second gradation conversion characteristics having a switching point at an inflection point between the first area and the second area of the image sensor;
the gradation converter configured to apply the gradation conversion based on the gradation conversion information stored in the gradation conversion information storage device;
an inflection point controller which controls the inflection point between the first area and the second area of the image sensor such that an output of the image sensor corresponding to a subject luminance for an exposure control can be obtained from the first area; and
a gradation conversion information rewriter contained in the gradation converter, configured to rewrite the gradation conversion information stored in the gradation conversion information storage device into new gradation conversion information having a switching point changed in accordance with the inflection point after the inflection point is inspected or changed by the inflection point controller;
an exposure controller configured to set an exposure setting value based upon an average luminance of an image of received by a plurality of pixels of the image sensor;
wherein the exposure controller is configured to control the exposure in such a manner that an output of the image sensor corresponding to the exposure setting value is obtained from the first area of the photoelectric conversion characteristic of the image sensor as defined by the inflection point of the image sensor with respect to any amount of subject luminance;
the exposure controller further including:
an exposure amount controller configured to control an exposure amount;
a dynamic range controller configured to control the photoelectric conversion characteristic of the image sensor, wherein the dynamic range controller preferentially controls the photoelectric conversion characteristic, and
wherein if the subject luminance for an exposure setting is lower than a predetermined value, the exposure amount controller controls the exposure amount in combination with the control of the photoelectric conversion characteristic by the dynamic range controller.

2. An image sensing apparatus according to claim 1, wherein the electric signal is outputted after being linearly converted in relation to the amount of the incident light in the first area, and the electric signal is outputted after being logarithmically converted in relation to the amount of the incident light in the second area.

3. An image sensing apparatus according to claim 2, wherein the second gradation conversion characteristic as the gradation conversion information for the second area has a higher degree of gradation conversion than the first gradation conversion characteristic as the gradation conversion information for the first area.

4. An image sensing apparatus according to claim 2, wherein the first gradation conversion characteristic as the gradation conversion information for the first area includes a high gradation conversion characteristic part having a higher degree of gradation conversion than the other part.

5. An image sensing apparatus according to claim 1, wherein the inflection point controller is an exposure controller which controls the inflection point such that an output of the image sensor corresponding to a subject luminance for an exposure control can be obtained from the first area.

6. An image sensing apparatus according to claim 5, wherein the exposure controller is an exposure amount controller for controlling an amount of exposure made to the image sensor.

7. An image sensing apparatus according to claim 5, wherein the exposure controller is a dynamic range controller for controlling the photoelectric conversion characteristic of the image sensor.

8. An image sensing apparatus according to claim 1, further comprising a luminance detector which detects the luminance of a subject while dividing it into a main subject luminance and a peripheral subject luminance, wherein the gradation conversion information rewriter rewrites a part of the gradation conversion information stored in the gradation conversion information storage device corresponding to a main subject luminance range part into a third gradation conversion characteristic having a relatively higher degree of gradation conversion in accordance with the luminance information of a main subject detected by the luminance detector.

9. An image sensing apparatus according to claim 8, wherein:
the inflection point controller is an exposure controller which controls the inflection point such that an output of the image sensor corresponding to the luminance of a subject for an exposure control can be obtained from the first area, a main subject being sensed in the first area of the image sensor by setting the subject luminance for the exposure control as a main subject luminance range part; and
the gradation conversion information rewriter rewrites at least a part of the first gradation conversion characteristic as the gradation conversion information for the first area corresponding to the main subject luminance range part into the third gradation conversion characteristic.

10. An image sensing apparatus according to claim 9, wherein the exposure controller is an exposure amount controller for controlling an amount of exposure made to the image sensor.

11. An image sensing apparatus according to claim 9, wherein the exposure controller is a dynamic range controller for controlling the photoelectric conversion characteristic of the image sensor.

12. An image sensing apparatus according to claim 2, further comprising:
- an inflection point controller which controls the inflection point between the first area and the second area of the image sensor; and
- a gradation conversion information rewriter which rewrites the gradation conversion information stored in the gradation conversion information storage device into the new one having a switching point changed in conformity with the inflection point after a change in the case that the inflection point is changed by the inflection point controller.

13. An image sensing system for a digital camera, comprising:
- an image sensing apparatus including an image sensor which generates an electrical signal corresponding to an amount of incident light and having a photoelectric conversion characteristic comprised of:
- a first area where the electrical signal is outputted after being converted according to a first characteristic in relation to the amount of the incident light; and
- a second area where the electrical signal is outputted after being converted according to a second characteristic different from the first characteristic in relation to the amount of the incident light;
- wherein the second gradation conversion characteristic as the gradation conversion information for the second area has a higher degree of gradation conversion than the first gradation conversion characteristic as the gradation conversion information for the first area;
- an inflection point controller which controls the inflection point between the first area and the second area of the image sensor such that an output of the image sensor corresponding to a subject luminance for an exposure control can be obtained from the first area;
- an information transmitter which transmits an image signal picked up by the image sensor and inflection point information controlled by the inflection point controller to the outside; and
- an image signal getter which obtains the image signal and the inflection point information from the information transmitter and applies a specified gradation conversion to the obtained image signal to generate an image signal to be reproduced,
- wherein the image signal getter circuit includes:
  - a gradation conversion information storage section which stores at least two kinds of gradation conversion information including a first gradation conversion characteristic as gradation conversion information for the first area, and a second gradation conversion characteristic as gradation conversion information for the second area, the first and second gradation conversion characteristics having a switching point at an inflection point between the first area and the second area of the image sensor,
  - a gradation converting section which applies a gradation conversion to the obtained image signal in accordance with the gradation conversion information stored in the gradation conversion information storage;
  - wherein the gradation conversion information storage section and the gradation converting section are housed in the image signal getter, and the image signal getter is a single circuit;
- an exposure controller configured to set an exposure setting value based upon an average luminance of an image of received by a plurality of pixels of the image sensor;
- wherein the exposure controller is configured to control the exposure such that an output of the image sensor corresponding to the exposure setting value is obtained from the first area of the photoelectric conversion characteristic of the image sensor as defined by the inflection point of the image sensor with respect to any amount of subject luminances;
- the exposure controller further including:
  - an exposure amount controller configured to control an exposure amount;
  - a dynamic range controller configured to control the photoelectric conversion characteristic of the image sensor, wherein the dynamic range controller preferentially controls the photoelectric conversion characteristic, and
  - wherein if the subject luminance for an exposure setting is lower than a predetermined value, the exposure amount controller controls the exposure amount in combination with the control of the photoelectric conversion characteristic by the dynamic range controller.

14. An image sensing system according to claim 13, wherein the image signal getter further includes a gradation conversion information rewriting section which rewrites the gradation conversion information stored in the gradation conversion information storage section into new gradation conversion information having a switching point changed in conformity with the inflection point after a change in the case that the inflection point is changed by the inflection point controller provided in the image sensing apparatus and the changed inflection point information is obtained by the image signal getter.

15. An image sensing system according to claim 13, wherein the information transmitter includes a communication cable, or a wire or wireless communication network.

16. An image sensing system according to claim 13, wherein the information transmitter includes an information storage medium mountable in and detachable from the image sensing apparatus and the image signal getter.

* * * * *

UNITED STATES PATENT AND TRADEMARK OFFICE
CERTIFICATE OF CORRECTION

| | |
|---|---|
| PATENT NO. | : 8,213,063 B2 |
| APPLICATION NO. | : 11/142037 |
| DATED | : July 3, 2012 |
| INVENTOR(S) | : Koichi Kamon et al. |

It is certified that error appears in the above-identified patent and that said Letters Patent is hereby corrected as shown below:

In the Claims

In column 58, claim 13, line 24, after "subject" replace "luminances;" with --luminance;--.

Signed and Sealed this
Ninth Day of October, 2012

David J. Kappos
*Director of the United States Patent and Trademark Office*